US008370043B2

(12) United States Patent
Kidokoro et al.

(10) Patent No.: US 8,370,043 B2
(45) Date of Patent: Feb. 5, 2013

(54) APPARATUS FOR DETERMINING AN AIR-FUEL RATIO IMBALANCE AMONG CYLINDERS OF AN INTERNAL COMBUSTION ENGINE

(75) Inventors: Toru Kidokoro, Hadano (JP); Hiroshi Sawada, Gotenba (JP); Yasushi Iwazaki, Ebina (JP); Fumihiko Nakamura, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 42 days.

(21) Appl. No.: 13/146,354

(22) PCT Filed: Feb. 3, 2009

(86) PCT No.: PCT/JP2009/052123
§ 371 (c)(1), (2), (4) Date: Jul. 26, 2011

(87) PCT Pub. No.: WO2010/089887
PCT Pub. Date: Aug. 12, 2010

(65) Prior Publication Data
US 2011/0288739 A1 Nov. 24, 2011

(51) Int. Cl.
*G06F 19/00* (2011.01)

(52) U.S. Cl. .......................................................... 701/99

(58) Field of Classification Search .................... 701/99, 701/109; 123/691–692
See application file for complete search history.

(56) References Cited

U.S. PATENT DOCUMENTS

| | | | |
|---|---|---|---|
| 5,950,606 | A | 9/1999 | Iida et al. |
| 2007/0017210 | A1 | 1/2007 | Hirata et al. |
| 2008/0040018 | A1 | 2/2008 | Katoch |

FOREIGN PATENT DOCUMENTS

| | | |
|---|---|---|
| DE | 198 31 310 A1 | 1/1999 |
| DE | 10 2006 000 347 A1 | 2/2007 |
| JP | A-6-101545 | 4/1994 |
| JP | A-8-284713 | 10/1996 |
| JP | A-11-72473 | 3/1999 |
| JP | A-2000-65782 | 3/2000 |
| JP | A-2000-220489 | 8/2000 |
| JP | A-2002-266682 | 9/2002 |
| JP | A-2004-69547 | 3/2004 |
| JP | A-2004-278542 | 10/2004 |
| JP | A-2007-23917 | 2/2007 |

(Continued)

OTHER PUBLICATIONS

Japanese Office Action dated Feb. 28, 2012 issued in Japanese Patent Application No. 2010-549324 (with partial translation).

(Continued)

*Primary Examiner* — James Trammell
*Assistant Examiner* — Michael D Lang
(74) *Attorney, Agent, or Firm* — Oliff & Berridge, PLC

(57) ABSTRACT

An apparatus for determining an air-fuel ratio imbalance among cylinders including an upstream air-fuel ratio sensor, a catalytic converter, and a downstream air-fuel ratio sensor disposed at positions downstream of an exhaust gas aggregated portion, calculates a sub feedback amount to have an output value of the downstream air-fuel ratio sensor coincides with a value corresponding to the stoichiometric air-fuel ratio, and performs an air-fuel ratio feedback control to have an air-fuel ratio of a mixture supplied to an engine based on the sub feedback amount and the output value of the upstream air-fuel ratio sensor.

7 Claims, 13 Drawing Sheets

FOREIGN PATENT DOCUMENTS

| | | |
|---|---|---|
| JP | A-2007-154840 | 6/2007 |
| JP | A-2008-38785 | 2/2008 |
| JP | A-2008-303857 | 12/2008 |
| JP | A-2009-13967 | 1/2009 |
| JP | A-2009-30455 | 2/2009 |

OTHER PUBLICATIONS

U.S. Appl. No. 12/083,879, filed Apr. 21, 2008 in the name of Yusuke Suzuki.
U.S. Appl. No. 12/213,064, filed Jun. 13, 2008 in the name of Yusuke Suzuki et al.
U.S. Appl. No. 12/668,467, filed Jan. 11, 2010 in the name of Keiichiro Aoki.
U.S. Appl. No. 12/663,783, filed Dec. 9, 2009 in the name of Yasushi Iwazaki.
International Search Report issued in International Application No. PCT/JP2009/052123 on Apr. 7, 2009 (with translation).
Written Opinion of the International Searching Authority issued in International Application No. PCT/JP2009/052123 on Apr. 7, 2009 (with translation).

APPARATUS FOR DETERMINING AN AIR-FUEL RATIO IMBALANCE AMONG CYLINDERS OF AN INTERNAL COMBUSTION ENGINE

TECHNICAL FIELD

The present invention relates to "an apparatus for determining an air-fuel ratio imbalance among cylinders of an internal combustion engine", which is applied to the internal combustion engine which is a multi-cylinder engine, the apparatus being able to determine (or monitor, detect) whether or not an imbalance of an air-fuel ratio of an air-fuel mixture supplied to each of cylinders (i.e., an air-fuel ratio imbalance among the cylinders, variation in air-fuel ratios among the cylinders, or air-fuel ratio non-uniformity among the cylinders) becomes excessively large.

BACKGROUND ART

Conventionally, an air-fuel ratio control apparatus has been widely known, which comprises a three-way catalytic converter disposed in an exhaust passage (exhaust gas passage) of an internal combustion engine, and an upstream air-fuel ratio sensor and a downstream air-fuel ratio sensor disposed, in the exhaust passage, upstream and downstream of the three-way catalytic converter, respectively. The air-fuel ratio control apparatus performs a feedback control on an air-fuel ratio (an air-fuel ratio of the engine) of a mixture supplied to the engine based on the output value of the upstream air-fuel ratio sensor and the output value of the downstream air-fuel ratio sensor in such a manner that the air-fuel ratio of the engine coincides with (becomes equal to) a stoichiometric air-fuel ratio.

This type of air-fuel ratio control apparatus controls the air-fuel ratio of the engine utilizing a control amount (an air-fuel ratio feedback amount) common to all of the cylinders. That is, the air-fuel ratio feedback control is performed in such a manner that an average (value) of the air-fuel ratio of the mixture supplied to the entire engine coincides with the stoichiometric air-fuel ratio.

For example, when a measured value or an estimated value of an intake air amount of the engine deviates from "a true intake air amount", each of the air-fuel ratios of each of the cylinders deviates from the stoichiometric air-fuel ratio toward "a rich side or a lean side" with respect to the stoichiometric air-fuel ratio without exception. In this case, the conventional air-fuel ratio control changes the air-fuel ratio of the air-fuel mixture supplied to the engine to "a leaner side or a richer side". Consequently, the air-fuel ratio of the mixture supplied to each of the cylinders is adjusted so as to be in the vicinity of the stoichiometric air-fuel ratio. Accordingly, a combustion in each of the cylinders comes close to a perfect combustion (a combustion occurring when the air-fuel ratio of the mixture is equal to the stoichiometric air-fuel ratio), and an air-fuel ratio of an exhaust gas flowing into the three-way catalytic converter coincides with the stoichiometric air-fuel ratio or with an air-fuel ratio close to the stoichiometric air-fuel ratio. As a result, a deterioration of emission can be avoided.

Meanwhile, an electronic control fuel injection type internal combustion engine typically comprises one fuel injector in each of the cylinders or in each of intake ports, each communicating with each of the cylinders. Accordingly, when a property (characteristic) of the fuel injector for a specific cylinder becomes "a property that the fuel injector injects fuel in an amount larger (more excessive) than an instructed fuel injection amount", only an air-fuel ratio (air-fuel-ratio-of-the-specific-cylinder) of an air-fuel mixture supplied to the specific cylinder shifts to an extremely richer side. That is, a non-uniformity among air-fuel ratios of the cylinders (a variation in air-fuel ratios among the cylinders, air-fuel ratio imbalance among the cylinders) becomes high (prominent). In other words, there arises an imbalance among air-fuel ratios, each of which is an air-fuel ratio of a mixture supplied to each of a plurality of the cylinders (i.e., air-fuel ratios of individual cylinders).

In this case, the average of the air-fuel ratios of the mixtures supplied to the engine becomes an air-fuel ratio richer (smaller) than the stoichiometric air-fuel ratio. Accordingly, the feedback amount commonly used to all of the cylinders causes the air-fuel ratio of the specific cylinder to shift to a leaner (larger) air-fuel ratio so that the air-fuel ratio of the specific cylinder is made closer to the stoichiometric air-fuel ratio. Further, each of the air-fuel ratios of the other cylinders is caused to shift to a leaner (larger) air-fuel ratio so that the air-fuel ratios of the other cylinders are caused to deviate more from the stoichiometric air-fuel ratio. At this time, since the number of the other cylinders is larger than the number (which is one) of the specific cylinder, the air-fuel ratio of the specific cylinder is still considerably richer (smaller) than the stoichiometric air-fuel ratio, and each of the air-fuel ratios of the other cylinders is slightly leaner (larger) than the stoichiometric air-fuel ratio. As a result, the average of the air-fuel ratios of the entire mixtures supplied to the engine is caused to become roughly equal to the stoichiometric air-fuel ratio.

However, the air-fuel ratio of the specific cylinder is still richer (smaller) than the stoichiometric air-fuel ratio, and the air-fuel ratios of the other cylinders are still leaner (larger) than the stoichiometric air-fuel ratio, and therefore, a combustion condition of the mixture in each of the cylinders is different from the perfect combustion condition. As a result, an amount of emissions (an amount of unburnt substances and/or an amount of nitrogen oxides) discharged from each of the cylinders increases. Accordingly, even though the average of the air-fuel ratios of the mixtures supplied to the engine coincides with the stoichiometric air-fuel ratio, the three-way catalytic converter may not be able to purify the increased emissions, and thus, there is a possibility that the emissions become worse. It is therefore important to detect whether or not the air-fuel ratio non-uniformity among cylinders becomes excessively large, since an appropriate measure can be taken in order not to worsen the emissions.

One of such conventional apparatuses (apparatuses for determining an air-fuel ratio imbalance among cylinders) that determine "whether or not the non-uniformity of the air-fuel ratios among cylinders (the air-fuel ratio imbalance among cylinders, an imbalance among air-fuel ratios of individual cylinders) becomes excessively large" obtains an estimated air-fuel ratio representing each of the air-fuel ratios of each of the cylinders by analyzing an output of a single air-fuel ratio sensor disposed at an exhaust gas aggregated portion. The conventional apparatus determines whether or not "the non-uniformity of the air-fuel ratios among cylinders" becomes excessively large based on the estimated air-fuel ratio of each of the cylinders (refer to, for example, Japanese Patent Application Laid-Open (kokai) No. 2000-220489).

SUMMARY OF THE INVENTION

However, the conventional apparatus needs to detect, within a short time, the air-fuel ratio of the exhaust gas which varies in accordance with an engine rotation. This requires an air-fuel ratio sensor having an extremely high responsibility.

Further, there arises a problem that the apparatus can not estimate the air-fuel ratio of each of the cylinders with high accuracy, when the air-fuel ratio sensor is deteriorated, because the responsibility of the deteriorated air-fuel ratio sensor becomes low. In addition, it is not easy to separate a noise from the variation in the air-fuel ratio. Furthermore, a high-speed data sampling technique and a high-performance CPU having a high processing ability are required. As described above, the conventional apparatus has a number of problems to be solved.

One of objects of the present invention is to provide "a practical apparatus for determining an air-fuel ratio imbalance among cylinders of an internal combustion engine" which can determine whether or not the "air-fuel ratio imbalance (non-uniformity) among cylinders" becomes excessive with high accuracy.

The apparatus for determining an air-fuel ratio imbalance among cylinders according to the present invention obtains "a parameter for imbalance determination" which is used to determine whether or not the air-fuel ratio imbalance among cylinders is occurring, based on an output of "a downstream air-fuel ratio sensor, disposed at a position downstream of a catalytic converter, and outputting the output (value) corresponding an air-fuel ratio of a gas which has passed through the catalytic converter". As described later in detail, the parameter for imbalance determination varies in accordance with a degree of the air-fuel ratio imbalance among cylinders.

However, the present inventors have found that, when an evaporated fuel gas generated in a fuel tank is being introduced into an intake passage (i.e., "during an evaporated fuel gas purge"), the output value of the downstream air-fuel ratio sensor may sometimes be affected by the evaporated fuel gas, and thus, the parameter for imbalance determination in such a case may not be able to represent/indicate "the degree of the air-fuel ratio imbalance among cylinders" with high accuracy. In view of the above, another object of the present invention is to provide "the apparatus for determining an air-fuel ratio imbalance among cylinders" which is unlikely to make an erroneous determination that "the air-fuel ratio imbalance among cylinders is excessive" due to the evaporated fuel gas.

The apparatus for determining an air-fuel ratio imbalance among cylinders according to the present invention is applied to a multi-cylinder internal combustion engine having a plurality of cylinders. The apparatus for determining an air-fuel ratio imbalance among cylinders comprises a catalytic converter, injectors, a purge passage section, purge amount control means, an upstream air-fuel ratio sensor, a downstream air-fuel ratio sensor, air-fuel ratio feedback control means, and imbalance determining means.

The catalytic converter is disposed in an exhaust (gas) passage at a position downstream of an exhaust gas aggregated portion into which gases discharged from combustion chambers of at least two or more (preferably, three or more) of a plurality of the cylinders merge (aggregate). The catalytic converter is a catalytic unit which oxidizes at least hydrogen among components included in the exhaust gas. Therefore, the catalytic converter may be a three-way catalytic converter, an oxidation catalytic converter, or a catalytic element which is provided to cover the downstream air-fuel ratio sensor.

Each of the fuel injectors is provided (disposed) to correspond to each of the at least two or more of the cylinders. Each of the fuel injectors injects a fuel to be contained in a mixture supplied to each of the combustion chambers of the two or more of the cylinders.

The purge passage section forms (constitutes) a passage which allows an evaporated fuel gas generated in "a fuel tank for storing the fuel supplied to the fuel injectors" to be introduced into "an intake passage of the engine".

The purge amount control means controls "an evaporated fuel gas purge amount" which is "an amount of the evaporated fuel gas introduced (flowed) into the intake passage of the engine through the purge passage section".

The upstream air-fuel ratio sensor includes a diffusion resistance layer with which an exhaust gas which has not passed through (before passing through) the catalytic converter contacts, and an air-fuel ratio detecting element which is covered with the diffusion resistance layer and outputs an output value according to an air-fuel ratio of an exhaust gas which has reached the air-fuel ratio detecting element after passing through the diffusion resistance layer. The upstream air-fuel ratio sensor is disposed at the exhaust gas aggregated portion in the exhaust passage, or between the exhaust gas aggregated portion and the catalytic converter in the exhaust passage.

One example of the upstream air-fuel ratio sensor is "a wide range air-fuel ratio sensor having a diffusion resistance layer", described in, for example, Japanese Patent Application Laid-Open (kokai) No. Hei 11-72473, Japanese Patent Application Laid-Open No. 2000-65782, and Japanese Patent Application Laid-Open No. 2004-69547, etc. That is, the example of the upstream air-fuel ratio sensor includes a solid electrolyte layer, an exhaust-gas-side electrode layer, an atmosphere-side electrode layer exposed in a chamber (room) into which an air is introduced, and a diffusion resistance layer, wherein the exhaust-gas-side electrode layer and the atmosphere-side electrode layer are respectively formed on each of both surfaces of the solid electrolyte layer in such a manner that they face (oppose) to each other via the solid electrolyte layer sandwiched therebetween, and the exhaust-gas-side electrode layer is covered with the diffusion resistance layer. In this case, "the air-fuel ratio detecting element" comprises the solid electrolyte layer, the exhaust-gas-side electrode layer, and the atmosphere-side electrode layer.

This type of the air-fuel ratio sensor outputs an output value in accordance with "a concentration of oxygen at the exhaust-gas-side electrode layer" of a gas which has reached the exhaust-gas-side electrode layer (the air-fuel ratio detecting element) through the diffusion resistance layer, when an air-fuel ratio of a gas to be detected is leaner than (in the lean side with respect to) the stoichiometric air-fuel ratio. Further, this type of the air-fuel ratio sensor outputs an output value in accordance with "a concentration of unburnt substances at the exhaust-gas-side electrode layer" of a gas which has reached the exhaust-gas-side electrode layer (the air-fuel ratio detecting element) through the diffusion resistance layer, when an air-fuel ratio of a gas to be detected is richer than (in the rich side with respect to) the stoichiometric air-fuel ratio. That is, the air-fuel ratio sensor outputs the output value corresponding to an air-fuel ratio of the gas which has reached the air-fuel ratio detecting element through the diffusion resistance layer, in either a case when the air-fuel ratio of the gas to be detected is lean or a case when the air-fuel ratio of the gas to be detected is rich.

The downstream air-fuel ratio sensor outputs an output value corresponding to an air-fuel ratio of a gas which has passed through the catalytic converter. The downstream air-fuel ratio sensor is disposed, for example, at a position downstream of the catalytic converter in the exhaust passage.

The air-fuel ratio feedback control means performs a feedback control on "a fuel injection amount" which is an amount injected from each of the fuel injectors" in such a manner that "an air-fuel ratio represented by the output value of the upstream air-fuel ratio sensor" coincides with "the stoichiometric air-fuel ratio (target upstream-side air-fuel ratio)".

The imbalance determining means performs (executes) "determination of an air-fuel ratio imbalance among cylinders" as to whether or not an imbalance (non-uniformity) among "individual cylinder air-fuel ratios", each of which is an air-fuel ratio of mixture supplied to each of the at least two or more of the cylinders" is occurring.

As described above, the air-fuel ratio feedback control means performs the feedback control on the air-fuel ratios of mixtures supplied to the combustion chambers of the two or more of the cylinders (i.e., fuel injection amounts injected from each of the fuel injectors) in such a manner that the air-fuel ratio represented by the output value of the upstream air-fuel ratio sensor coincides with the stoichiometric air-fuel ratio. Accordingly, if "the air-fuel ratio represented by the output value of the upstream air-fuel ratio sensor" coincides with "a true average (true average of the air-fuel ratio with respect to time) of the air-fuel ratios of the mixtures supplied to the combustion chambers of the two or more of the cylinders", "the true average of the air-fuel ratios of the mixtures supplied to the combustion chambers of the two or more of the cylinders" coincides with the target upstream-side air-fuel ratio. It should be noted that "the mixtures supplied to the combustion chambers of the two or more of the cylinders" is referred to as "the mixture supplied to the entire engine", for convenience.

However, in practice, when the air-fuel ratio imbalance (non-uniformity) among the cylinders becomes excessively large, the true average (true temporal average of the air-fuel ratio) of the air-fuel ratio of the mixture supplied to the entire engine may sometimes be controlled to be an air-fuel ratio leaner than the stoichiometric air-fuel ratio. The reason for this will next be described.

The fuel supplied to the engine is a chemical compound of carbon and hydrogen. Accordingly, when the air-fuel ratio of the mixture for the combustion is richer than the stoichiometric air-fuel ratio, "carbon hydride HC, carbon monoxide CO, and hydrogen $H_2$, and so on" are generated as intermediate products. A probability that the intermediate products meet and bind with oxygen greatly decreases during the combustion, as the air-fuel ratio of the mixture for the combustion deviates more from the stoichiometric air-fuel ratio in the richer side than the stoichiometric air-fuel ratio. As a result, an amount of the unburnt substances (HC, CO, and $H_2$) drastically (e.g., in a quadratic function fashion) increases as the air-fuel ratio of the mixture supplied to the cylinder becomes richer (refer to FIG. 8).

Here, it is assumed that the only an air-fuel ratio of a specific cylinder greatly deviates to (becomes) the richer side. This assumption occurs, for example, when the fuel injection property (characteristic) of the fuel injector provided for the specific cylinder becomes "a property (characteristic) that the fuel injector injects the fuel in an amount which is considerably larger (more excessive) than the instructed fuel injection amount".

In the case described above, the air-fuel ratio (the air-fuel ratio of the specific cylinder) of the mixture supplied to the specific cylinder greatly changes (shifts) to a richer air-fuel ratio (smaller air-fuel ratio), compared with the air-fuel ratio (the air fuel ratio of the other cylinders) of the mixture supplied to the rest of the cylinders. That is, the air-fuel ratio imbalance among cylinders occurs. At this time, an extremely large amount of the unburnt substances (HC, CO, and $H_2$) are discharged from the specific cylinder.

In the mean time, hydrogen $H_2$ is a small molecule, compared with carbon hydride HC and carbon monoxide CO. Accordingly, hydrogen $H_2$ rapidly diffuses through the diffusion resistance layer of the upstream air-fuel ratio sensor, compared to the other unburnt substances (HC, CO). Therefore, when a large amount of the unburnt substances including HC, CO, and $H_2$ are generated, a preferential diffusion of hydrogen $H_2$ occurs in the diffusion resistance layer. That is, hydrogen $H_2$ reaches the surface of the air-fuel ratio detecting element in a larger amount compared with "the other unburnt substances (HC, CO)". As a result, a balance between a concentration of hydrogen $H_2$ and a concentration of the other unburnt substances (HC, CO) is lost. In other words, a fraction of hydrogen $H_2$ to all of the unburnt substances included in the exhaust gas reaching the air-fuel ratio detecting element of the upstream air-fuel ratio sensor becomes larger than a fraction of hydrogen $H_2$ to all of the unburnt substances included in the exhaust gas discharged from the engine.

This causes the air-fuel ratio represented by the output value of the upstream air-fuel ratio sensor to be richer than the true average of the air-fuel ratio of the mixture supplied to the entire engine (i.e. the true average of the air-fuel ratio of the exhaust gas discharged from the engine) due to the preferential diffusion of hydrogen $H_2$.

For example, it is assumed that an air-fuel ratio A0/F0 is equal to the stoichiometric air-fuel ratio (e.g., 14.5), when the intake air amount (weight) introduced into each of the cylinders of the 4-cylinder engine is A0, and the fuel amount (weight) supplied to each of the cylinders is F0.

Under the assumption, it is further assumed that an amount of fuel supplied (injected) to each of the cylinders is uniformly excessive in 10%. That is, it is assumed that the fuel of 1.1·F0 is supplied to each of the cylinder. Here, a total amount of the intake air supplied to the four cylinders (an intake amount supplied to the entire engine during a period in which each and every cylinder completes one combustion stroke) is equal to 4·A0, and a total amount supplied to the four cylinders (a fuel amount supplied to the entire engine during the period in which each and every cylinder completes one combustion stroke) is equal to 4.4·F0 (=1.1·F0+1.1·F0+1.1·F0+1.1·F0). Accordingly, a true average of the air-fuel ratio of the mixture supplied to the entire engine is 4·A0/(4.4·F0)=A0/(1.1·F0). At this time, the output value of the upstream air-fuel ratio sensor becomes an output value corresponding to the air-fuel ratio A0/(1.1·F0). The air-fuel ratio of the mixture supplied to the entire engine is therefore caused to coincide with the stoichiometric air-fuel ratio which is the target upstream-side air-fuel ratio by the air-fuel ratio feedback control. In other words, the fuel amount supplied to each of the cylinders is decreased in 10% by the air-fuel ratio feedback control. That is, the fuel of 1·F0 is again supplied to each of the cylinders, and the air-fuel ratio of each of the cylinders coincides with the stoichiometric air fuel ratio A0/F0.

Next, it is assumed that an amount of fuel supplied to one certain specific cylinder is excessive in 40% (i.e., 1.4·F0), and an amount of fuel supplied to each of the other three cylinders is an appropriate amount (a fuel amount required to obtain the stoichiometric air-fuel ratio, here 1.0·F0). Under this assumption, a total amount of the intake air supplied to the four cylinders is equal to 4·A0. A total amount of the fuel supplied to the four cylinders is equal to 4.4·F0 (=1.4·F0+F0+F0+F0). Accordingly, the true average of the air-fuel ratio of the mixture supplied to the entire engine is 4·A0/(4.4·F0)=A0/(1.1·F0). That is, in this case, the true average of the air-fuel ratio of the mixture supplied to the entire engine is the same as the value (air-fuel ratio) obtained "when the amount of fuel supplied to each of the cylinders is uniformly excessive in 10%" as described above.

However, as described above, the amount of the unburnt substances (HC, CO, and $H_2$) in the exhaust gas drastically increases as the air-fuel ratio of the mixture supplied to the cylinder becomes richer. Further, the exhaust gas into which the exhaust gases from the cylinders are mixed reaches the upstream air-fuel ratio sensor. Accordingly, "the amount of hydrogen $H_2$ included in the exhaust gas in the above described case in which only the amount of fuel supplied to the specific cylinder becomes excessive in 40%" is considerably greater than "the amount of hydrogen $H_2$ included in the exhaust gas in the case in which the amount of fuel supplied to each of the cylinders uniformly becomes excessive in 10%".

As a result, due to "the preferential diffusion of hydrogen $H_2$" described above, the air-fuel ratio represented by the output value of the upstream air-fuel ratio sensor becomes richer than "the true average ($A0/(1.1 \cdot F0)$) of the air-fuel ratio of the mixture supplied to the entire engine". That is, even when the average of the air-fuel ratio of the exhaust gas is the same rich air-fuel ratio, the concentration of hydrogen $H_2$ in the exhaust gas reaching the air-fuel ratio detecting element of the upstream air-fuel ratio sensor when the air-fuel ratio imbalance among cylinders is occurring becomes greater than when the air-fuel ratio imbalance among cylinders is not occurring. Accordingly, the output value of the upstream air-fuel ratio sensor becomes a value indicating an air-fuel ratio richer than the true average of the air-fuel ratio of the mixture.

Consequently, by the air-fuel ratio feedback control which causes the air-fuel ratio represented by the output value of the upstream air-fuel ratio sensor to coincide with the stoichiometric air-fuel ratio, the true average of the air-fuel ratio of the mixture supplied to the entire engine is controlled (shifted) to be leaner than the stoichiometric air-fuel ratio. This is the reason why the true average of the air-fuel ratio is controlled to be leaner when the non-uniformity of the air-fuel ratio among cylinders becomes excessive.

On the other hand, hydrogen $H_2$ included in the exhaust gas discharged from the engine is oxidized (purified) together with the other unburnt substances (HC, CO) in the catalytic converter. Further, the exhaust gas which has passed through the catalytic converter reaches the downstream air-fuel ratio sensor. Accordingly, the output value of the downstream air-fuel ratio sensor becomes a value corresponding to the average of the true air-fuel ratio of the mixture supplied to the engine. Therefore, when only the air-fuel ratio of the specific cylinder greatly deviates to the richer side, the output value of the downstream air-fuel ratio sensor becomes a value corresponding to the true air-fuel ratio which is excessively corrected so as to be the leaner side by the air-fuel ratio feedback control. That is, as the air-fuel ratio of the specific cylinder deviates to the richer side, "the true air-fuel ratio of the mixture supplied to the engine" is controlled to be leaner due to "the preferential diffusion of hydrogen $H_2$" and "the air-fuel ratio feedback control", and the resultant appears in the output value of the downstream air-fuel ratio sensor. In other words, the output value of the downstream air-fuel ratio sensor varies depending upon a degree of the air-fuel ratio imbalance among cylinders.

In view of the above, the imbalance determining means includes parameter for determination obtaining means, and determination executing means.

The parameter for determination obtaining means is configured so as to obtain "a parameter for imbalance determination" based on "the output value of the downstream air-fuel ratio sensor while the feedback control is (being) performed". The parameter for imbalance determination is a value varying in accordance with "the true air-fuel ratio (an average air-fuel ratio) of the air-fuel mixture supplied to the entire engine" which varies due to the air-fuel ratio feedback control, and is the value which increases as a difference between "an amount of hydrogen included in the exhaust gas which has not passed through the catalytic converter" and "an amount of hydrogen included in the exhaust gas which has passed through the catalytic converter" becomes larger.

The determination executing means is configured so as to determine whether or not the obtained parameter for imbalance determination is equal to or larger than an abnormality determination threshold, and so as to determine that there is a non-uniformity among individual cylinder air-fuel ratios (that is, an air-fuel ratio imbalance among cylinders is occurring) when the determination executing means determines that the parameter for imbalance determination is equal to or larger than the abnormality determination threshold. Accordingly, the apparatus for determining an air-fuel ratio imbalance among cylinders of the present invention can determine whether or not the air-fuel ratio imbalance among cylinders is occurring with high accuracy.

Meanwhile, when the evaporated fuel gas generated in the fuel tank is introduced (flowed) into the intake passage to thereby be supplied to the combustion chambers (i.e., so-called evaporated fuel gas purge is performed), the air-fuel ratio of the mixture supplied to the engine greatly varies (fluctuates) due to the evaporated fuel gas, and therefore, "the output value of the downstream sensor" may be affected by the evaporated fuel gas. For example, when a concentration of the evaporated fuel gas is extremely high, such as when the engine is started after a parking in the hot sun, "the output value of the downstream sensor" may easily be affected by the evaporated fuel gas. Therefore, if the air-fuel ratio imbalance determination among cylinders is carried out with using "the parameter for imbalance determination" which is obtained based on the output value of the downstream air-fuel ratio sensor, it is likely that the determination may not be accurate.

In view of the above, the imbalance determining means further includes evaporated fuel gas effect occurrence determination means, and determination prohibiting means.

The evaporated fuel gas effect occurrence determination means is configured so as to determine whether or not "a state in which the evaporated fuel gas introduced into the intake passage varies/affects the parameter for imbalance determination" is occurring. That is, the evaporated fuel gas effect occurrence determination means determines whether or not "an evaporated fuel gas effect occurrence state" is occurring.

The determination prohibiting means is configured so as to prohibit the determination executing means to execute the determination (determination of an air-fuel ratio imbalance among cylinders) based on the parameter for imbalance determination when it is determined that "the evaporated fuel gas effect occurrence state is occurring" by the evaporated fuel gas effect occurrence determination means.

Consequently, the apparatus for determining an air-fuel ratio imbalance among cylinders of the present invention can determine whether or not an air-fuel ratio imbalance among cylinders is occurring, with high accuracy and without being affected by the evaporated fuel gas.

In one of aspects of the apparatus for determining an air-fuel ratio imbalance among cylinders of the present invention, the air-fuel ratio feedback control means is configured so as to update (change) "a value relating to a concentration of the evaporated fuel gas (i.e., an evaporated fuel gas concentration learning value) based on "at least the output value of the upstream air-fuel ratio sensor" every time "a predetermined evaporated fuel gas concentration learning value updating condition including a condition that an evaporated fuel gas purge amount is not zero (i.e., while the evaporated fuel gas purge is being carried out)" is satisfied; and control the fuel injection amount further based on the evaporated fuel gas concentration learning value.

According to the above aspect, the fuel injection amount is corrected (controlled) further by "the evaporated fuel gas concentration learning value". When the evaporated fuel gas concentration learning value is an accurate (appropriate) value, the fuel injection amount can be corrected with high accuracy, and therefore, it is unlikely that the output value of the downstream air-fuel ratio sensor is affected by the evaporated fuel gas even when the evaporated fuel gas purge is being performed. That is, if the evaporated fuel gas concentration learning value is an accurate (appropriate) value, the evaporated fuel gas effect occurrence state does not occur.

Meanwhile, the evaporated fuel gas concentration learning value is updated (changed) every time "the predetermined evaporated fuel gas concentration learning value updating condition" is satisfied, the learning value updating condition including the condition that an evaporated fuel gas purge amount is not zero (e.g. a condition that the evaporated fuel gas purge amount is not zero, and a predetermined time elapses). Accordingly, when the number of times of update opportunity for concentration learning value (i.e., the number of times the evaporated fuel gas concentration learning value updating condition is satisfied) after a start of the engine is equal to or larger than a predetermined first opportunity number of times threshold, the evaporated fuel gas concentration learning value has reached an accurate value. In contrast, when the number of times of update opportunity for concentration learning value is smaller than the first opportunity number of times threshold, the evaporated fuel gas concentration learning value is in an insufficient state, and thus, has not reached the accurate value. Accordingly, when the evaporated fuel gas purge is carried out under such a state, the evaporated fuel gas effect occurrence state occurs.

In view of the above, the evaporated fuel gas effect occurrence determination means is configured so as to determine whether or not "the number of times of update opportunity for concentration learning value" is smaller than "the first opportunity number of times threshold", and so as to determine that "the evaporated fuel gas effect occurrence state" is occurring when "the number of times of update opportunity for concentration learning value" is determined to be smaller than "the first opportunity number of times threshold". According to this aspect, when "the number of times of update opportunity for concentration learning value" is smaller than "the first opportunity number of times threshold", the determination (determination of an air-fuel ratio imbalance among cylinders) based on the parameter for imbalance determination by the determination executing means is prohibited. As a result, the determination of an air-fuel ratio imbalance among cylinders with high accuracy can be executed (carried out).

In this case, the purge amount control means may be configured so as to control the evaporated fuel gas purge amount in such a manner that the evaporated fuel gas purge amount when the number of times of update opportunity for concentration learning value is equal to or smaller than "a second threshold of the opportunity number of times smaller than the first opportunity number of times threshold" is equal to or smaller than the evaporated fuel gas purge amount when the number of times of update opportunity for concentration learning value is equal to or larger than the first opportunity number of times threshold;

the evaporated fuel gas effect occurrence determination means may be configured so as to determine whether or not the number of times of update opportunity for concentration learning value is equal to or smaller than the second threshold of the opportunity number of times, and so as to determine that "the evaporated fuel gas effect occurrence state is not occurring" when the number of times of update opportunity for concentration learning value is determined to be equal to or smaller than the second threshold of the opportunity number of times; and the determination prohibiting means may be configured so as to allow the determination executing means to execute the determination based on the parameter for imbalance determination when it is determined that the evaporated fuel gas effect occurrence state is not occurring by the evaporated fuel gas effect occurrence determination means.

According to the aspect described above, the evaporated fuel gas purge amount is set at a small amount when the number of times of update opportunity for concentration learning value is equal to or smaller than "the second threshold of the opportunity number of times smaller than the first opportunity number of times threshold". In other words, when it is likely that a learning state of the evaporated fuel gas concentration learning value is insufficient (i.e., it is likely that the evaporated fuel gas concentration learning value deviates (is) away from the appropriate value), the evaporated fuel gas purge amount is set at a small amount. Accordingly, even if the evaporated fuel gas concentration learning value is away from the appropriate value, the effect by the evaporated fuel gas can be compensated (corrected) by the air-fuel ratio feedback control based on the output value of the upstream air-fuel ratio sensor, and therefore, it is unlikely that the output value of the downstream air-fuel ratio sensor is affected by the evaporated fuel gas. In view of the above, in the case described above, the determination based on the parameter for imbalance determination by the determination executing means is allowed to be executed (performed). Consequently, the determination of an air-fuel ratio imbalance among cylinders can be executed more frequently.

In another aspect of the present invention, the air-fuel ratio feedback control means may includes sub feedback amount updating means, and fuel injection amount control means.

The sub feedback amount updating means is configured so as to change (update) "a sub feedback amount for having the output value of the downstream air-fuel ratio sensor coincide with a value corresponding to the stoichiometric air-fuel ratio" based on "the output value of the downstream air-fuel ratio sensor" every time a first updating timing arrives.

The fuel injection amount control means is configured so as to determine "a base fuel injection amount for having the air-fuel ratio of the mixture supplied to the combustion chambers of the at least two or more of the cylinders coincide with the stoichiometric air-fuel ratio" based on "a cylinder intake air amount which is an amount of air introduced into each of the combustion chambers of the cylinders" every time a second updating timing arrives.

Further, the fuel injection amount control means is configured so as to update (change) a main feedback amount to correct the base fuel injection amount based on at least "the output value of the upstream air-fuel ratio sensor and the sub feedback amount", and so as to have the injectors inject a fuel injection amount obtained by correcting the base fuel injection amount by the main feedback amount from the injectors.

In this case, the (imbalance) parameter for determination obtaining means includes learning value of sub feedback amount learning means, and parameter calculating means for calculating the parameter for imbalance determination.

The learning value of sub feedback amount learning means updates (changes) "the learning value of sub feedback amount" based on the sub feedback amount every time a third timing arrives. That is, the learning value of sub feedback amount learning means updates (renews) the learning value of sub feedback amount in such a manner that the learning value of sub feedback amount comes close to a steady-state component of the sub feedback amount. It should be noted that the learning value of sub feedback amount is used to correct the fuel injection amount when the sub feedback amount can not be calculated, or the like.

The parameter calculating means is configured so as to calculate the parameter for imbalance determination based on the learning value of sub feedback amount. For example, the parameter calculating means may calculate, as the parameter for imbalance determination, a value obtained by low-pass filtering the learning value of sub feedback amount (e.g., a value obtained by first order lag filtering the learning value), or an average of updated learning values of sub feedback amount.

The air-fuel ratio feedback control means performs the feedback control on (feedback controls) the fuel injection amount in such a manner that the air-fuel ratio represented by the output value of the upstream air-fuel ratio sensor coincides with the stoichiometric air-fuel ratio. Therefore, when the air-fuel ratio represented by the output value of the upstream air-fuel ratio sensor coincides with the true average of the air-fuel ratio of the mixture supplied to the entire engine, the true average of the air-fuel ratio of the mixture supplied to the entire engine substantially coincides with the stoichiometric air-fuel ratio by the control of the air-fuel ratio feedback control means.

However, as described above, when the air-fuel ratio imbalance among cylinders is occurring, the output value of the upstream air-fuel ratio sensor is affected by "the preferential diffusion of hydrogen $H_2$". Therefore, the air-fuel ratio represented by the output value of the upstream air-fuel ratio sensor becomes richer than the true average of the air-fuel ratio of the mixture supplied to the entire engine. Consequently, by the air-fuel ratio feedback control based on the output value of the upstream air-fuel ratio sensor, the true average of the air-fuel ratio of the mixture supplied to the entire engine is adjusted (corrected) to an air-fuel ratio leaner then the stoichiometric air-fuel ratio.

On the other hand, hydrogen $H_2$ is oxidized (purified) in the catalytic converter, and therefore, the downstream air-fuel ratio sensor outputs the output value corresponding to "the true average of the air-fuel ratio of the mixture supplied to the entire engine". Accordingly, when the air-fuel ratio imbalance among cylinders occurs, the sub feedback amount changes to "a value which corrects the air-fuel ratio of the mixture supplied to the entire engine toward the richer air-fuel ratio". In other words, when the air-fuel ratio imbalance among cylinders occurs, the sub feedback amount changes to a value which causes the air-fuel ratio to shift to the richer air-fuel ratio by an amount corresponding to the degree of the imbalance.

Further, learning value of sub feedback amount is changed (updated) so as to come closer to the steady-state component of the sub feedback amount. The steady-state component of the sub feedback amount (e.g., an integral term) can represent (indicate) "a deviation (error) of the true air-fuel ratio of the mixture supplied to the entire engine from the stoichiometric air-fuel ratio" with higher accuracy among components included in the sub feedback. Therefore, the learning value of the sub feedback amount is also a value representing (indicating) "the deviation (error) of the true air-fuel ratio of the mixture supplied to the entire engine from the stoichiometric air-fuel ratio" with high accuracy.

In view of the above, the imbalance parameter for determination obtaining means calculates the parameter for imbalance determination based on the learning value of the sub feedback amount. Therefore, the parameter for imbalance determination is also become a value representing (indicating) "the deviation (error) of the true air-fuel ratio of the mixture supplied to the entire engine from the stoichiometric air-fuel ratio" with high accuracy. Accordingly, based on the parameter for imbalance determination, it is possible to determine whether or not the air-fuel ratio imbalance among cylinders is occurring with high accuracy.

Further, the air-fuel ratio feedback control means which updates (changes) the evaporated fuel gas concentration learning value is configured so as to update (change) the evaporated fuel gas concentration learning value, when an average of the main feedback amount (e.g., a weighted average of the main feedback amount, or a temporal average of the main feedback amount in a predetermined time period) while the evaporated fuel gas purge amount is not set at zero by the purge amount control means is equal to or smaller than a first threshold which is smaller than "a reference (basic) value of the main feedback amount" which "does not correct the base fuel injection amount"; and when the average of the main feedback amount while the evaporated fuel gas purge amount is not set at zero by the purge amount control means is equal to or larger than a second threshold which is larger than the reference value.

When the average of the main feedback amount while the evaporated fuel gas purge amount is not set at zero is equal to or smaller than the first threshold, or is equal to or larger than the second threshold, it is indicated that the fuel injection amount is not sufficiently corrected since the evaporated fuel gas concentration learning value is not an appropriate value. Accordingly, by updating (changing) the evaporated fuel gas concentration learning value, the evaporated fuel gas concentration learning value can be obtained easily and with high accuracy.

DESCRIPTION OF THE BEST EMBODIMENT TO CARRYOUT THE INVENTION

An embodiment of an apparatus (hereinafter, simply referred to as "a determining apparatus") for determining an air-fuel ratio imbalance among cylinders according to the present invention will next be described with reference to the drawings. The determining apparatus is a portion of an air-fuel ratio control apparatus for controlling an air-fuel ratio of an internal combustion engine. Further, the air-fuel ratio control apparatus is a fuel injection amount control apparatus for controlling a fuel injection amount.

<Structure>

Figure 1:
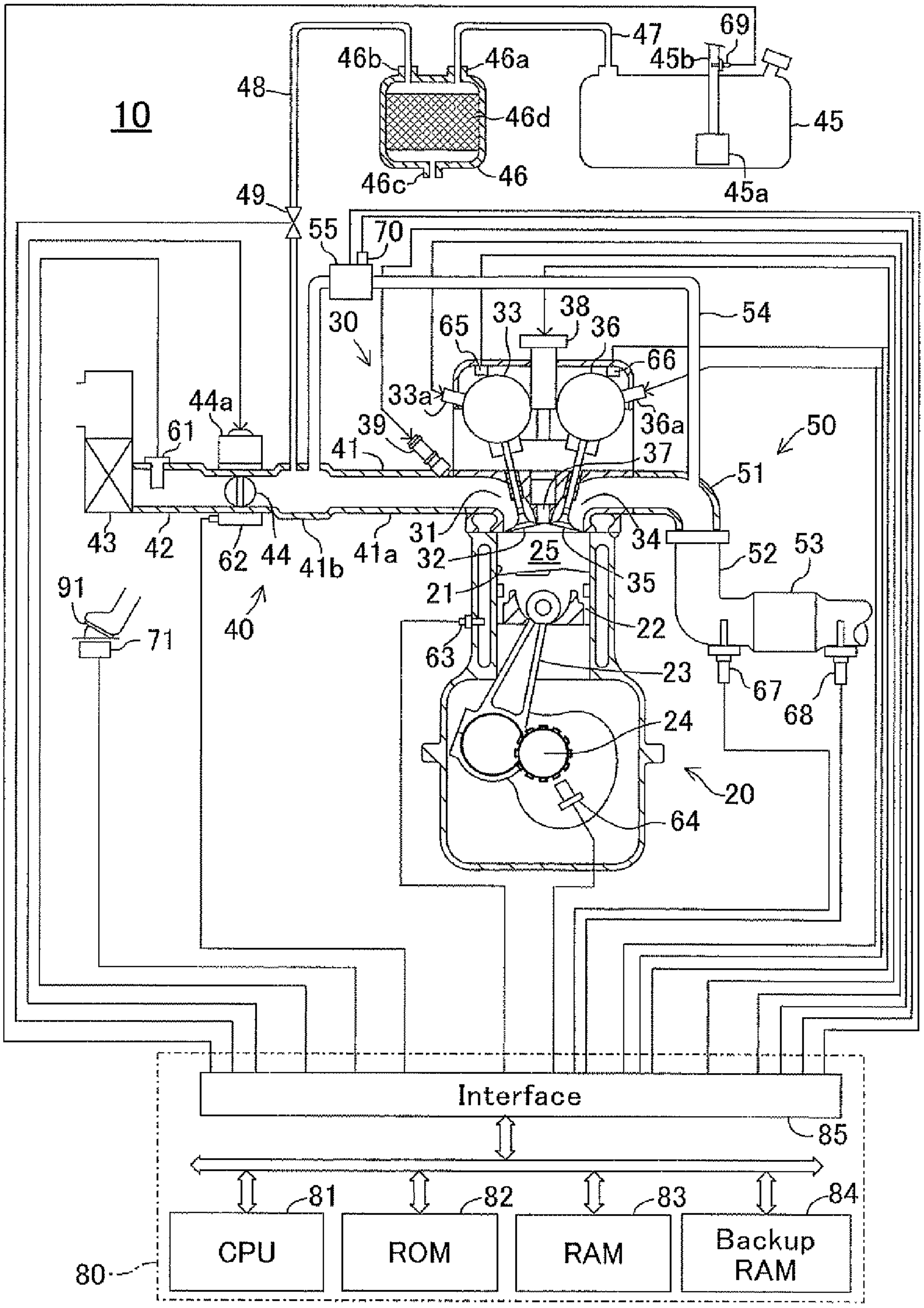
FIG. 1 is a schematic view of an internal combustion engine to which an apparatus for determining an air-fuel ratio imbalance among cylinders according to an embodiment of the present invention is applied.

FIG. 1 shows a schematic configuration of a system in which the determining apparatus is applied to an internal combustion engine 10 which is 4 cycle, spark-ignition, multi-cylinder (in the present example, in-line 4 cylinder) engine. FIG. 1 shows a section of a specific cylinder only, but other cylinders also have a similar configuration.

The internal combustion engine 10 includes a cylinder block section 20 including a cylinder block, a cylinder block lower-case, an oil pan, and so on; a cylinder head section 30 fixed on the cylinder block section 20; an intake system 40 for supplying a gasoline mixture to the cylinder block section 20; and an exhaust system 50 for discharging an exhaust gas from the cylinder block section 20 to the exterior of the engine.

The cylinder block section 20 includes cylinders 21, pistons 22, connecting rods 23, and a crankshaft 24. The piston 22 reciprocates within the cylinder 21, and the reciprocating motion of the piston 22 is transmitted to the crankshaft 24 via the connecting rod 23, thereby rotating the crankshaft 24. The bore wall surface of the cylinder 21, the top surface of the piston 22, and the bottom surface of a cylinder head section 30 form a combustion chamber 25.

The cylinder head section 30 includes intake ports 31, each communicating with the combustion chamber 25; intake valves 32 for opening and closing the intake ports 31; a variable intake timing unit 33 including an intake cam shaft to drive the intake valves 32 for continuously change the phase angle of the intake cam shaft; an actuator **33*a* of the variable intake timing unit 33; exhaust ports 34, each communicating with the combustion chamber 25; exhaust valves 35 for opening and closing the exhaust ports 34; a variable exhaust timing unit 36 including an exhaust cam shaft to drive the exhaust valves 35 for continuously change the phase angle of the exhaust cam shaft; an actuator 36*a* of the variable exhaust timing unit 36; spark plugs 37; igniters 38, each including an ignition coil for generating a high voltage to be applied to the spark plug 37; and fuel injectors (fuel injection means, fuel supply means) 39 each of which injects a fuel into the intake port 31**.

Each of the fuel injectors 39 is provided for each of the combustion chambers 25 of each of the cylinders one by one. Each of the fuel injectors 39 is fixed at each of the intake ports 31. Each of the fuel injector 39 is configured so as to inject, in response to an injection instruction signal, "a fuel of an instructed injection amount included in the injection instruction signal" into the corresponding intake port 31, when the fuel injector 39 is normal. In this way, each of the plurality of the cylinders comprises the fuel injector 39 for supplying the fuel independently from the other cylinders.

The intake system 40 includes an intake manifold 41, an intake pipe 42, an air filter 43, and a throttle valve 44. The intake manifold 41 includes a plurality of branch portions **41*a*, and a surge tank 41*b*. An end of each of a plurality of the branch portions 41*a* is connected to each of the intake ports 31. The other end of each of a plurality of the branch portions 41*a* is connected to the surge tank 41*b*. An end of the intake pipe 42 is connected to the surge tank 41*b*. The air filter 43 is disposed at the other end of the intake pipe 42. The throttle valve 44 is provided in the intake pipe 42, and is configured so as to adjust/vary an opening sectional area of an intake passage. The throttle valve 44 is configured so as to be rotatably driven by the throttle valve actuator 44*a*** including a DC motor.

Further, the internal combustion engine 10 includes a fuel tank 45 for storing liquid gasoline fuel; a canister 46 which is capable of adsorbing and storing an evaporated fuel (gas) generated in the fuel tank 45; a vapor collection pipe 47 for introducing a gas containing the evaporated fuel into the canister 46 from the fuel tank 45; a purge passage pipe 48 for introducing, as "an evaporated fuel gas", an evaporated fuel which is desorbed from the canister 46 into the surge tank **41*b*; and a purge control valve 49 disposed in the purge passage pipe 48. The fuel stored in the fuel tank 45 is supplied to the fuel injectors through a fuel pump 45*a*, a fuel supply pipe 45*b*, and the like. The vapor collection pipe 47 and the purge passage pipe 48** forms (constitutes) a purge passage (purge passage section).

The purge control valve 49 is configured so as to vary a cross-sectional area of a passage formed by the purge passage pipe 48 by adjusting an opening degree (opening period) of the valve 49 based on a drive signal representing a duty ratio DPG which is an instruction signal. The purge control valve 49 fully/completely closes the purge passage pipe 48 when the duty ratio DPG is "0". That is, the purge control valve 49 is configured in such a manner that it is disposed in the purge passage, and its opening degree is varied in response to the instruction signal.

The canister 46 is a well-known charcoal canister. The canister 46 includes a housing which has a tank port **46*a* connected to the vapor collection pipe 47, a purge port 46*b* connected to the purge passage pipe 48, an atmosphere port 46*c* exposed to atmosphere. The canister 46 accommodates, in the housing, adsorbents 46*d* for adsorbing the evaporated fuel. The canister 46 adsorbs and stores the evaporated fuel generated in the fuel tank 45 while (or during a period for which) the purge control valve 49 is completely closed. The canister 46 discharges the adsorbed/stored evaporated fuel, as the evaporated fuel gas, into the surge tank 41***b* (i.e., into the intake passage at a position downstream of the throttle valve 44) through the purge passage pipe 48 while (or during a period for which) the purge control valve 49 is opened. This allows the evaporated fuel gas to be supplied to each of the combustion chambers 25 through the intake passage of the engine 10. That is, by opening the purge control valve 49, an evaporated fuel gas purge (or an evapo-purge for short) is carried out.

The exhaust system 50 includes an exhaust manifold 51 having a plurality of branch portions having ends each of which communicates with each of the exhaust ports 34 of each of the cylinders; an exhaust pipe 52 communicating with an aggregated portion (an exhaust gas aggregated portion of the exhaust manifold 51) into which the other ends of the plurality branch portions of the exhaust manifold 51 merge (aggregate); an upstream-side catalytic converter 53 disposed in the exhaust pipe 52; and a downstream-side catalytic converter (not shown) disposed in the exhaust pipe 52 at a position downstream of the upstream-side catalytic converter 53. The exhaust ports 34, the exhaust manifold 51, and the exhaust pipe 52 form (constitute) an exhaust passage. In this way, the upstream-side catalytic converter 53 is disposed in the exhaust passage at "a position downstream of the exhaust gas aggregated portion into which exhaust gases discharged from all of the combustion chambers 25 (or at least two or more of the combustion chambers) merge/aggregate.

Each of the upstream-side catalytic converter 53 and the downstream-side catalytic converter is so-called a three-way catalytic unit (exhaust gas purifying catalyst) which supports active components formed of noble (precious) metals such as Platinum. Each catalytic converter has a function for oxidizing unburnt substances (HC, CO, $H_2$, and so on) and reducing nitrogen oxide (NOx) simultaneously, when an air-fuel ratio of a gas flowing into the catalytic converter is equal to the stoichiometric. This function is referred to as a catalytic function. Further, each catalytic converter has an oxygen storage function for storing oxygen. The oxygen storage function allows the catalytic converter to purify unburnt substances and nitrogen oxide, even when the air-fuel ratio deviates from the stoichiometric air-fuel ratio. The oxygen storage function is given by ceria ($CeO_2$) supported in the catalytic converter.

Further, the engine 10 includes an exhaust gas recirculation system. The exhaust gas recirculation system includes exhaust gas recirculation pipe 54 forming an external EGR passage, and an EGR valve 55.

One end of the exhaust gas recirculation pipe 54 is connected to the aggregated portion of the exhaust manifold 51. The other end of the exhaust gas recirculation pipe 54 is connected to the surge tank 41*b*.

The EGR valve 55 is disposed in the exhaust gas recirculation pipe 54. The EGR valve 55 includes a DC motor as a drive source. The EGR valve 55 changes valve opening (degree) in response to a duty ratio DEGR which is an instruction signal to the DC motor, to thereby vary a cross-sectional area of the exhaust gas recirculation pipe 54. The EGR valve 55 fully/completely closes the exhaust gas recirculation pipe 54 when the duty ratio DEGR is "0". That is, the EGR valve 55 is configured in such a manner that it is disposed in the external EGR passage, and its opening degree is varied in response to the instruction signal so as to control an amount of exhaust gas recirculation (hereinafter, referred to as "an external EGR amount").

The system includes a hot-wire air flowmeter 61, a throttle position sensor 62; a water temperature sensor 63; a crank position sensor 64, an intake cam position sensor 65, an exhaust cam position sensor 66, an upstream air-fuel ratio sensor 67, a downstream air-fuel ratio sensor 68, an alcohol concentration sensor 69, an EGR valve opening degree sensor (EGR valve lift sensor) 70, and an accelerator opening sensor 71.

The air flowmeter 61 outputs a signal indicative of a mass flow rate (intake air flow rate) Ga of an intake air flowing through the intake pipe 42.

The throttle position sensor 62 detects an opening (degree) of the throttle valve 44 to output a signal indicative of the throttle valve opening angle TA.

The water temperature sensor 63 detects a temperature of the cooling water of the internal combustion engine 10 to output a signal indicative of a cooling-water temperature THW.

The crank position sensor 64 outputs a signal which has a narrow pulse every 10° rotation of the crank shaft 24 and a wide pulse every 360° rotation of the crank shaft 24. The signal is converted into an engine rotational speed NE by the electric controller 80 described later.

The intake cam position sensor 65 generates a single pulse signal every time the intake cam shaft rotates by 90 degrees, further 90 degrees, and further 180 degrees from a predetermined angle.

The exhaust cam position sensor 66 generates a single pulse signal every time the exhaust cam shaft rotates by 90 degrees, further 90 degrees, and further 180 degrees from a predetermined angle.

The upstream air-fuel ratio sensor 67 is disposed in either one of "the exhaust manifold 51 and the exhaust pipe 52, and at a position between the aggregated portion of the exhaust manifold 51 and the upstream-side catalytic converter 53 (that is, in the exhaust passage). The upstream air-fuel ratio sensor 67 is "a wide range air-fuel ratio sensor of a limiting current type having a diffusion resistance layer" described in, for example, Japanese Patent Application Laid-Open (kokai) No. Hei 11-72473, Japanese Patent Application Laid-Open No. 2000-65782, and Japanese Patent Application Laid-Open No. 2004-69547, etc.

Figure 2:
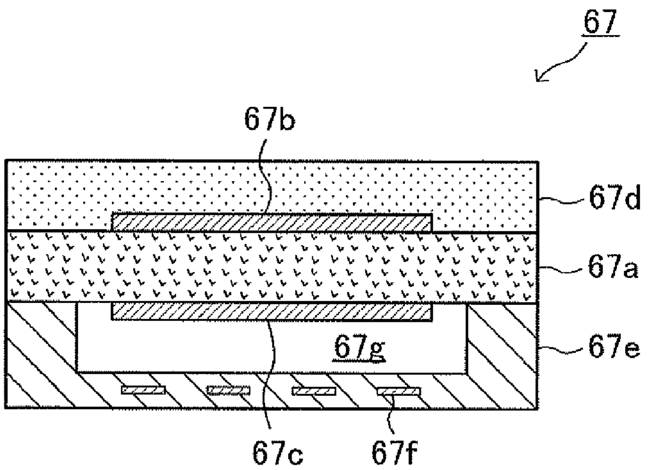
FIG. 2 is a schematic sectional view of an upstream air-fuel ratio sensor shown in FIG. 1.

As shown in FIG. 2, the upstream air-fuel ratio sensor 67 includes a solid electrolyte layer 67*a*, an exhaust-gas-side electrode layer 67*b*, an atmosphere-side electrode layer 67*c*, a diffusion resistance layer 67*d*, a wall section 67*e*, and a heater 67*f*.

The solid electrolyte layer 67*a* is an oxide sintered body having oxygen ion conductivity. In the present example, the solid electrolyte layer 67*a* is "a stabilized zirconia element" in which CaO as a stabilizing agent is solid-solved in $ZrO_2$ (zirconia). The solid electrolyte layer 67*a* exerts a well-known "an oxygen cell characteristic" and "an oxygen pumping characteristic", when a temperature of the solid electrolyte layer 67*a* is equal to or higher than an activation temperature. As described later, these characteristics are to be exerted when the upstream air-fuel ratio sensor 67 outputs an output value corresponding to the air-fuel ratio of the exhaust gas. The oxygen cell characteristic is a characteristic to cause oxygen ion to move from a high oxygen concentration side to a low oxygen concentration side so as to generate an electro motive force. The oxygen pumping characteristic is a characteristic to cause oxygen ion to move from a negative electrode (lower potential side electrode) to a positive electrode (higher potential side electrode) in an amount according to an electric potential difference between these electrodes, when the electric potential difference is applied between both sides of the solid electrolyte layer 67*a*.

The exhaust-gas-side electrode layer 67*b* is made of a precious metal such as Platinum (Pt) which has a high catalytic activity. The exhaust-gas-side electrode layer 67*b* is formed on one of surfaces of the solid electrolyte layer 67*a*. The exhaust-gas-side electrode layer 67*b* is formed by chemical plating and the like in such a manner that it has an adequately high permeability (i.e., it is porous).

The atmosphere-side electrode layer 67*c* is made of a precious metal such as Platinum (Pt) which has a high catalytic activity. The atmosphere-side electrode layer 67*c* is formed on the other one of surfaces of the solid electrolyte layer 67*a* in such a manner that it faces (opposes) to the exhaust-gas-side electrode layer 67*b* to sandwich the solid electrolyte layer 67*a* therebetween. The atmosphere-side electrode layer 67*c* is formed by chemical plating and the like in such a manner that it has an adequately high permeability (i.e., it is porous).

The diffusion resistance layer (diffusion rate limiting layer) 67*d* is made of a porous ceramic (a heat resistant inorganic substance). The diffusion resistance layer 67*d* is formed so as to cover an outer surface of the exhaust-gas-side electrode layer 67*b* by, for example, plasma spraying and the like. A diffusion speed of hydrogen $H_2$ whose diameter is small in the diffusion resistance layer 67*d* is higher than a diffusion speed of "carbon hydride HC, carbon monoxide CO, or the like" whose diameter is relatively large in the diffusion resistance layer 67*d*. Accordingly, hydrogen $H_2$ reaches "exhaust-gas-side electrode layer 67*b*" more promptly than carbon hydride HC, carbon monoxide CO, owing to an existence of the diffusion resistance layer 67*d*. The upstream air-fuel ratio sensor 67 is disposed in such a manner that an outer surface of the diffusion resistance layer 67*d* is "exposed to the exhaust gas (the exhaust gas discharged from the engine 10 contacts with the outer surface of the diffusion resistance layer 67*d*).

The wall section 67*e* is made of a dense alumina ceramics through which gases can not pass. The wall section 67*e* is configured so as to form "an atmosphere chamber 67*g*" which is a space that accommodates the atmosphere-side electrode layer 67*c*. An air is introduced into the atmosphere chamber 67*g*.

The heater 67*f* is buried in the wall section 67*e*. When the heater 67*f* is energized, it generates heat to heat up the solid electrolyte layer 67*a*.

Figure 3:
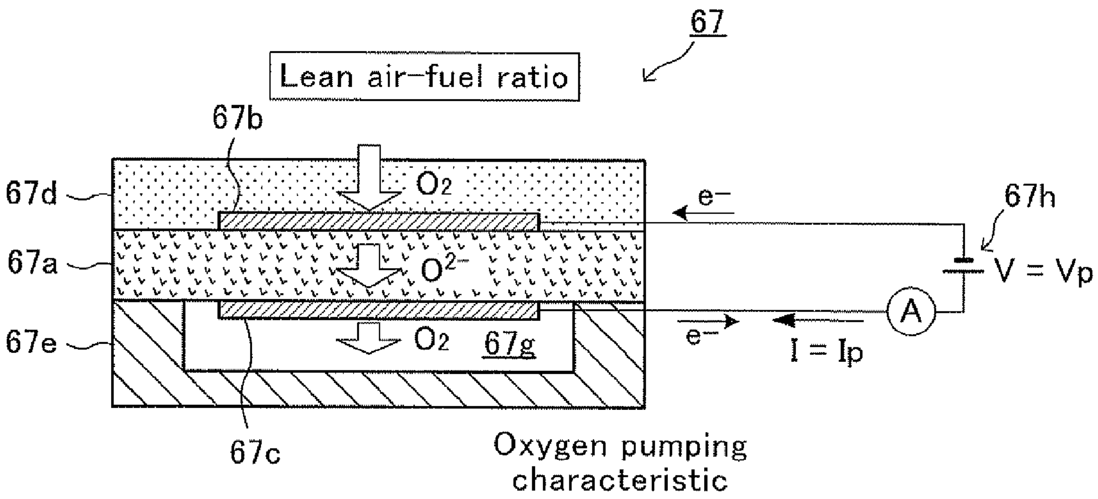
FIG. 3 is a figure for describing an operation of the upstream air-fuel ratio sensor, when an air-fuel ratio of an exhaust gas (gas to be detected) is in a lean side with respect to the stoichiometric air-fuel ratio.

As shown in FIG. 3, the upstream air-fuel ratio sensor 67 uses an electric power supply 67*h*. The electric power supply 67*h* applies an electric voltage V in such a manner that an electric potential of the atmosphere-side electrode layer 67*c* is higher than an electric potential of the exhaust-gas-side electrode layer 67*b*.

As shown in FIG. 3, when the air-fuel ratio of the exhaust gas is in the lean side with respect to the stoichiometric air-fuel ratio, the oxygen pumping characteristic is utilized so as to detect the air-fuel ratio. That is, when the air-fuel ratio of the exhaust gas is leaner than the stoichiometric air-fuel ratio, a large amount of oxygen molecules included in the exhaust gas reach the exhaust-gas-side electrode layer 67*b* after passing through the diffusion resistance layer 67*d*. The oxygen molecules receive electrons to change to oxygen ions. The oxygen ions pass through the solid electrolyte layer 67*a*, and release the electrons to change to oxygen molecules at the atmosphere-side electrode layer 67*c*. As a result, a current I flows from the positive electrode of the electric power supply 67*h* to the negative electrode of the electric power supply 67*h*, thorough the atmosphere-side electrode layer 67*c*, the solid electrolyte layer 67*a*, and the exhaust-gas-side electrode layer 67*b*.

Figure 4:
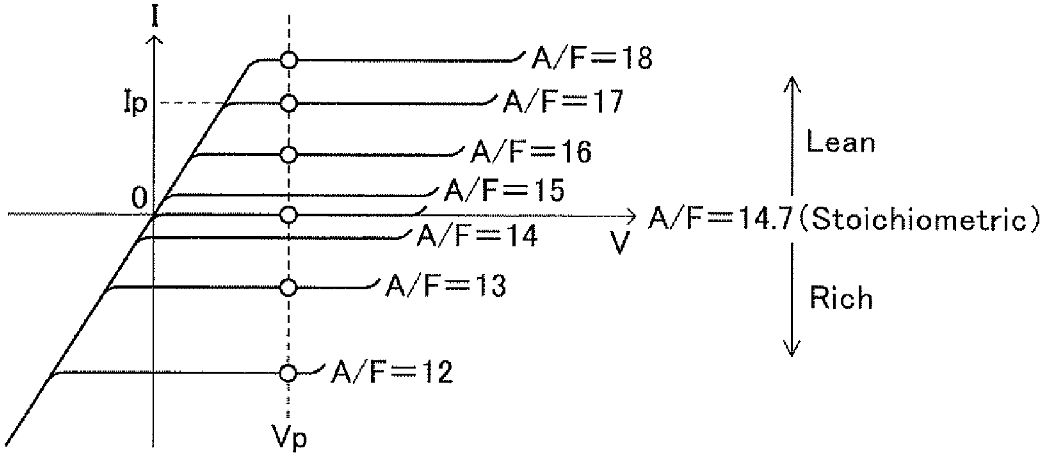
FIG. 4 is a graph showing a relationship between the air-fuel ratio of the exhaust gas and a limiting current value of the upstream air-fuel ratio sensor.

When the magnitude of the electric voltage V is set to be equal to or higher than a predetermined value VP, the magnitude of the electrical current I varies according to an amount of "the oxygen molecules reaching the exhaust-gas-side electrode layer 67*b* after passing through the diffusion resistance layer 67*d* by the diffusion" out of the oxygen molecules included in the exhaust gas reaching the outer surface of the diffusion resistance layer 67*d*. That is, the magnitude of the electrical current I varies depending upon a concentration (partial pressure) of oxygen at the exhaust-gas-side electrode layer 67*b*. The concentration of oxygen at the exhaust-gas-side electrode layer 67*b* varies depending upon the concentration of oxygen of the exhaust gas reaching the outer surface of the diffusion resistance layer 67*d*. The current I, as shown in FIG. 4, does not vary when the voltage V is set at a value equal to or higher than the predetermined value Vp, and therefore, is referred to as a limiting current Ip. The upstream air-fuel ratio sensor 67 outputs the value corresponding to the air-fuel ratio based on the limiting current Ip.

Figure 5:
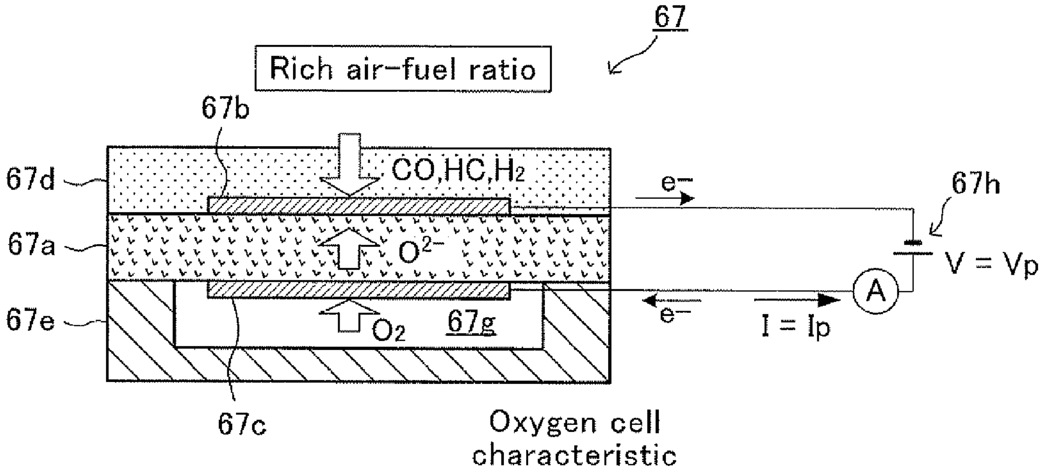
FIG. 5 is a figure for describing an operation of the upstream air-fuel ratio sensor, when the air-fuel ratio of the exhaust gas (gas to be detected) is in a rich side with respect to the stoichiometric air-fuel ratio.

On the other hand, as shown in FIG. 5, when the air-fuel ratio of the exhaust gas is in the rich side with respect to the stoichiometric air-fuel ratio, the oxygen cell characteristic described above is utilized so as to detect the air-fuel ratio. More specifically, when the air-fuel ratio of the exhaust gas is richer than the stoichiometric air-fuel ratio, a large amount of unburnt substances (HC, CO, and $H_2$ etc.) included in the exhaust gas reach the exhaust-gas-side electrode layer 67*b* through the diffusion resistance layer 67*d*. In this case, a difference (oxygen partial pressure difference) between the concentration of oxygen at the atmosphere-side electrode layer 67*c* and the concentration of oxygen at the exhaust-gas-side electrode layer 67*b* becomes large, and thus, the solid electrolyte layer 67*a* functions as an oxygen cell. The applied voltage V is set at a value lower than the elective motive force of the oxygen cell.

Accordingly, oxygen molecules existing in the atmosphere chamber 67*g* receive electrons at the atmosphere-side electrode layer 67*c* so as to change into oxygen ions. The oxygen ions pass through the solid electrolyte layer 67*a*, and move to the exhaust-gas-side electrode layer 67*b*. Then, they oxidize the unburnt substances at the exhaust-gas-side electrode layer 67*b* to release electrons. Consequently, a current I flows from the negative electrode of the electric power supply 67*h* to the positive electrode of the electric power supply 67*h*, thorough the exhaust-gas-side electrode layer 67*b*, the solid electrolyte layer 67*a*, and the atmosphere-side electrode layer 67*c*.

The magnitude of the electrical current I varies according to an amount of the oxygen ions reaching the exhaust-gas-side electrode layer 67*b* from the atmosphere-side electrode layer 67*c* through the solid electrolyte layer 67*a*. As described above, the oxygen ions are used to oxidize the unburnt substances at the exhaust-gas-side electrode layer 67*b*. Accordingly, the amount of the oxygen ions passing through the solid electrolyte layer 67*a* becomes larger, as an amount of the unburnt substances reaching the exhaust-gas-side electrode layer 67*b* through the diffusion resistance layer 67*d* by the diffusion becomes larger. In other words, as the air-fuel ratio is smaller (as the air-fuel ratio is richer, and thus, an amount of the unburnt substances becomes larger), the magnitude of the electrical current I becomes larger. Meanwhile, the amount of the unburnt substances reaching the exhaust-gas-side electrode layer 67*b* is limited owing to the existence of the diffusion resistance layer 67*d*, and therefore, the current I becomes a constant value Ip varying depending upon the air-fuel ratio. The upstream air-fuel ratio sensor 67 outputs the value corresponding to the air-fuel ratio based on the limiting current Ip.

Figure 6:
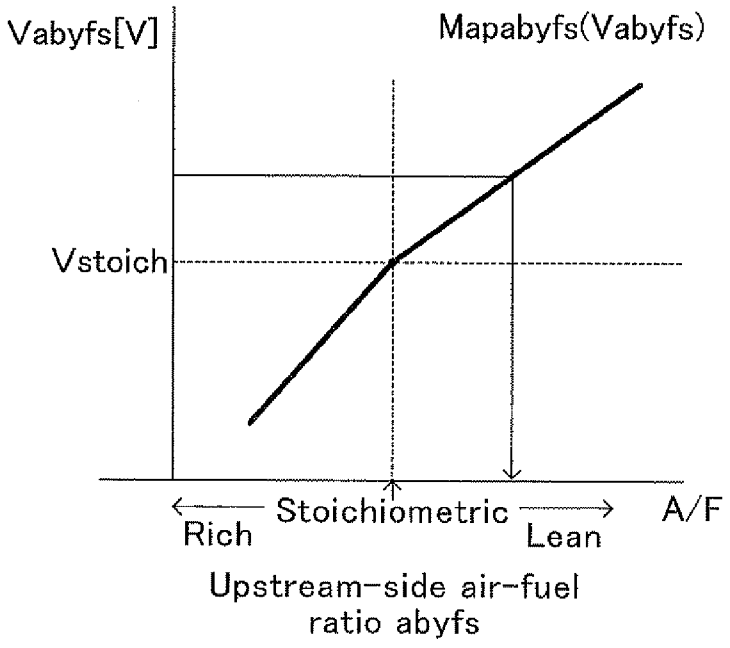
FIG. 6 is a graph showing a relationship between the air-fuel ratio of the exhaust gas and an output value of the upstream air-fuel ratio sensor.

As shown in FIG. 6, the upstream air-fuel ratio sensor 67, utilizing the above described detecting principle, outputs the output value Vabyfs according to the air-fuel ratio (upstream-side air-fuel ratio abyfs) of the exhaust gas flowing through the position at which the upstream air-fuel ratio sensor 67 is disposed. The output value Vabyfs is obtained by converting the limiting current Ip into a voltage. The output value Vabyfs increases, as the air-fuel ratio of the gas to be detected becomes larger (leaner). The electric controller 80, described later, stores an air-fuel ratio conversion table (map) Mapabyfs shown in FIG. 6, and detects an actual upstream-side air-fuel ratio abyfs by applying an actual output value Vabyfs to the air-fuel ratio conversion table Mapabyfs. The air-fuel ratio conversion table Mapabyfs is made in consideration of the preferential diffusion of hydrogen. In other words, the table Mapabyfs is made based on an actual output value Vabyfs of the upstream air-fuel ratio sensor 6T when the air-fuel ratio of the exhaust gas reaching the upstream air-fuel ratio sensor 67 is set at a value X by setting each of the air-fuel ratios of each of the cylinders at the same air-fuel ratio X to each other. Hereinafter, the air-fuel ratio obtained based on the output value Vabyfs of the upstream air-fuel ratio sensor and the table Mapabyfs may be referred to as an upstream air-fuel ratio abyfs or a detected air-fuel ratio abyfs.

The downstream air-fuel ratio sensor 68 is disposed in the exhaust passage, and at a position downstream of the upstream-side catalytic converter 53 and upstream of the downstream-side catalytic converter (that is, at a position between the upstream-side catalytic converter 53 and the downstream-side catalytic converter). The downstream air-fuel ratio sensor 68 is a well-known oxygen-concentration sensor of an electro motive force type (a well-known concentration cell type oxygen-concentration sensor using a stabilized zirconia). The downstream air-fuel ratio sensor 68 outputs an output value Voxs in accordance with an air-fuel ratio of the exhaust gas (to be detected) passing through the position at which the downstream air-fuel ratio sensor 68 is disposed in the exhaust passage (i.e., the air-fuel ratio of a gas flowing out from the upstream-side catalytic converter 53 and flowing into the downstream-side catalytic converter, and thus, a temporal average of the air-fuel ratio of the mixture supplied to the engine).

Figure 7:
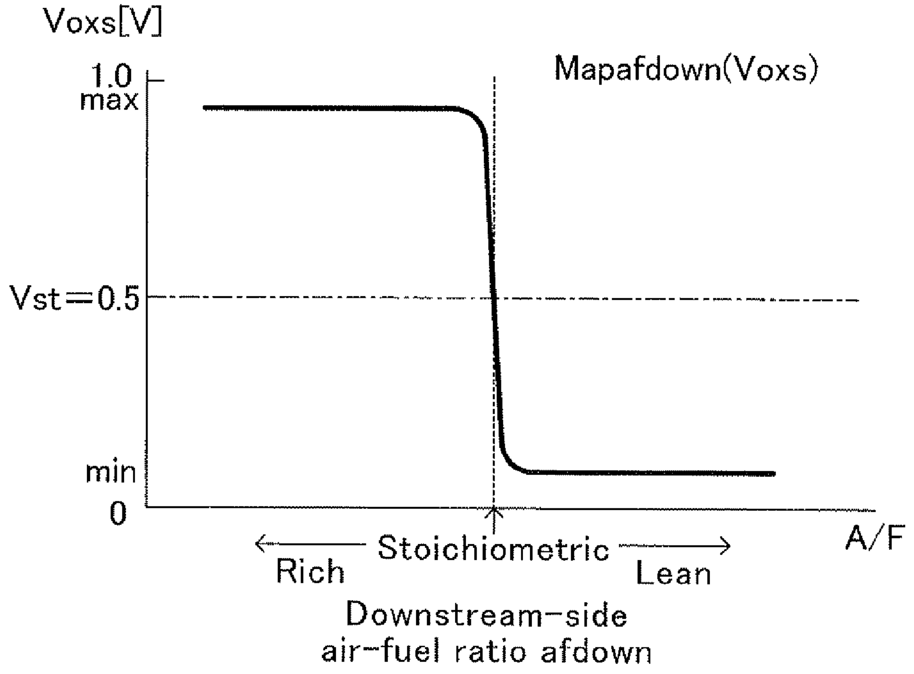
FIG. 7 is a graph showing a relationship between an air-fuel ratio of the exhaust gas and an output value of the downstream air-fuel ratio sensor.

As shown in FIG. 7, the output value Voxs becomes equal to a maximum output value max (e.g., about 0.9 V) when the air-fuel ratio of the gas to be detected is richer than the stoichiometric air-fuel ratio, becomes equal to a minimum output value min (e.g., about 0.1 V) when the air-fuel ratio of the gas to be detected is leaner than the stoichiometric air-fuel ratio, and becomes equal to a voltage Vst which is about a middle value between the maximum output value max and the minimum output value min (the middle voltage Vst, e.g., about 0.5 V) when the air-fuel ratio of the gas to be detected is equal to the stoichiometric air-fuel ratio. Further, the output value Voxs varies rapidly from the maximum output value max to the minimum output value min when the air-fuel ratio of the gas to be detected varies from the air-fuel ratio richer than the stoichiometric air-fuel ratio to the air-fuel ratio leaner than the stoichiometric air-fuel ratio, and the output value Voxs varies rapidly from the minimum output value min to the maximum output value max when the air-fuel ratio of the gas to be detected varies from the air-fuel ratio leaner than the stoichiometric air-fuel ratio to the air-fuel ratio richer than the stoichiometric air-fuel ratio.

Referring back to FIG. 1, the alcohol concentration sensor 69 detects a concentration of an alcohol (ethanol) included in the fuel, and outputs a signal EtOh according to the alcohol concentration.

The EGR valve opening degree sensor 70 detects an opening degree of the EGR valve (i.e., a lift amount of a valve included in the EGR valve), and outputs a signal indicative of the opening degree AEGRVact.

The accelerator opening sensor 71 outputs a signal indicative of an operation amount Accp of an accelerator pedal 91 operated by a driver.

An electric controller 80 is a well-known microcomputer including "a CPU 81; a ROM 82 in which programs to be executed by the CPU 81, tables (look-up tables, maps), constants, and the like are stored in advance; a RAM 83 in which the CPU 81 stores data temporarily as needed; a backup RAM 84; an interface 85 including an AD converter; and so on", that are connected to each other through bus.

The backup RAM 84 is supplied with an electric power from a battery mounted on a vehicle on which the engine 10 is mounted, regardless of a position of an unillustrated ignition key switch (off-position, start position, on-position, and so on) of the vehicle. Data is stored in (written into) the backup RAM 84 according to an instruction of the CPU 81 while the electric power is supplied to the backup RAM 84, and the backup RAM holds (retains, stores) the data in such a manner that the data can be read out. When the electric power supply to the backup RAM 84 is stopped due to a removal of the battery from the vehicle, or the like, the backup RAM 84 can not hold the data. Therefore, when the electric power supply to the backup RAM 84 is resumed, the CPU 81 initializes the data (or sets the data at default values) to be stored in the backup RAM 84.

The interface 85 is connected to the sensors 61 to 71 and is configured in such a manner that the interface 85 supplies signals from the sensors 61 to 71 to the CPU 81. The interface 85 is configured so as to send drive signals (instruction signals), in response to instructions from the CPU 81, to the actuator 33*a* of the variable intake timing unit 33, the actuator 36*a* of the variable exhaust timing unit 36, each of the igniters 38 of each cylinder, each of the fuel injectors 39 provided so as to correspond to each of the cylinders, the throttle valve actuator 44*a*, the purge control valve 49, the EGR valve 55, and so on. It should be noted that the electric controller 80 sends the instruction signal to the throttle valve actuator 44*a*, in such a manner that the throttle valve opening angle TA is increased as the obtained accelerator pedal operation amount Accp becomes larger.

(Principle of a Determination of an Air-Fuel Ratio Imbalance Among Cylinders)

Next will be described the principle of "the determination of an air-fuel ratio imbalance among cylinders", adopted by the determining apparatus. The determination of an air-fuel ratio imbalance among cylinders is determining whether or not the air-fuel ratio imbalance among cylinders becomes larger than a warning value, in other words, is determining whether or not a non-uniformity among individual cylinder air-fuel-ratios (which can not be permissible in view of the emission) (i.e., the air-fuel ratio imbalance among cylinders) is occurring.

The fuel of the engine 10 is a chemical compound of carbon and hydrogen. Accordingly, "carbon hydride HC, carbon monoxide CO, and hydrogen $H_2$, and so on" are generated as intermediate products, while the fuel is burning so as to change to water $H_2O$ and carbon dioxide $CO_2$.

Figure 8:
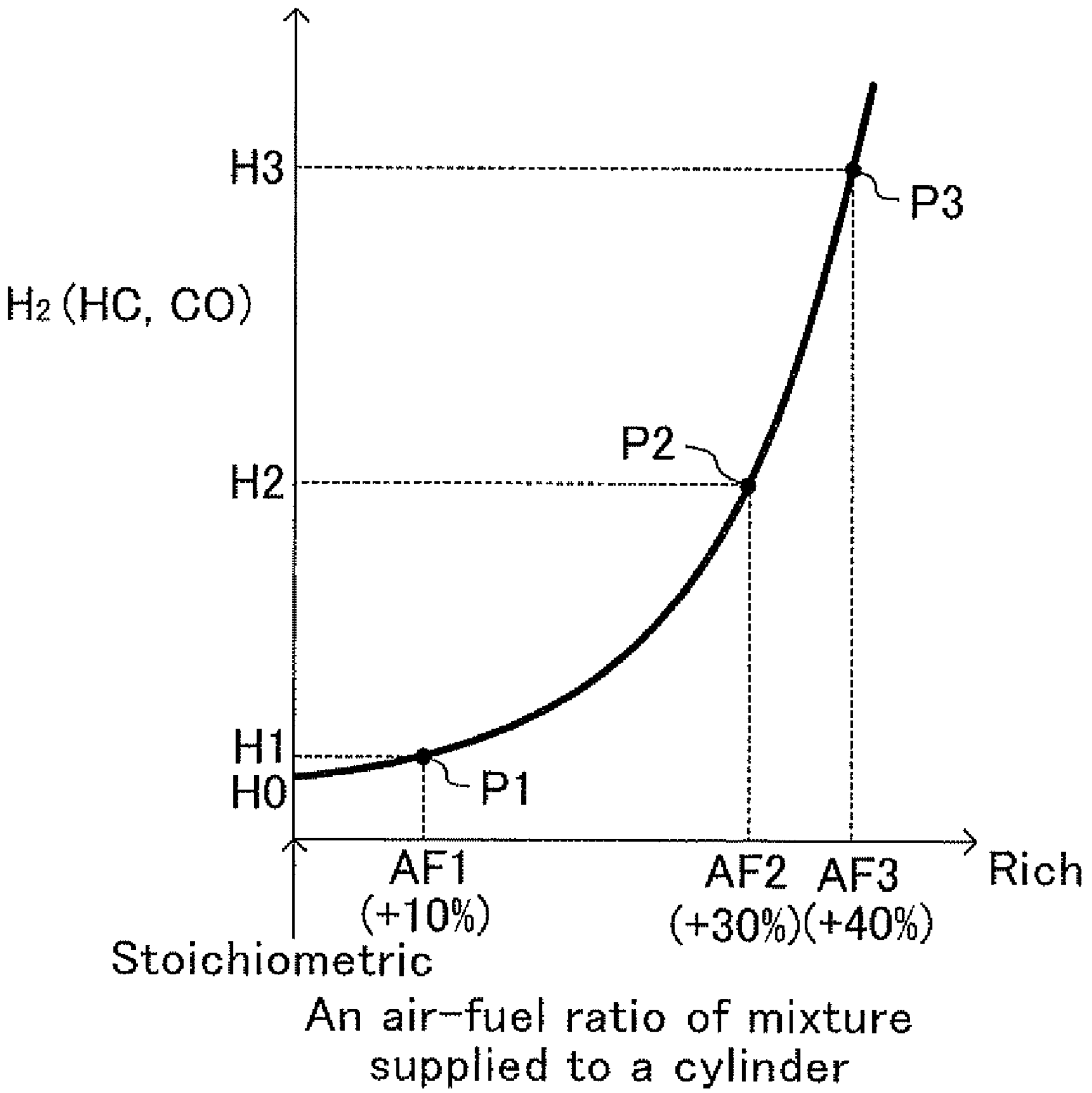
FIG. 8 is a graph showing a relationship between an air-fuel ratio of a mixture supplied to a cylinder and an amount of unburnt substances discharged from the cylinder.

As the air-fuel ratio of the mixture for the combustion becomes smaller than the stoichiometric air-fuel ratio (i.e., as the air-fuel ratio becomes richer than the stoichiometric air-fuel ratio), a difference between an amount of oxygen required for a perfect combustion and an actual amount of oxygen becomes larger. In other words, as the air-fuel ratio becomes richer, a shortage amount of oxygen during the combustion increases, and therefore, a concentration of oxygen lowers. Thus, a probability that intermediate products (unburnt substances) meet and bind with oxygen greatly decreases. Consequently, as shown in FIG. 8, an amount of the unburnt substances (HC, CO, and $H_2$) discharged from a cylinder drastically (e.g., in a quadratic function fashion) increases, as the air-fuel ratio of the mixture supplied to the cylinder becomes richer. It should be noted that points P1, P2, and P3 shown in FIG. 8 corresponds to states in which an amount of fuel supplied to a certain cylinder becomes 10% (=AF1) excess, 30% (=AF2) excess, and 40% (=AF3) excess, respectively, with respect to an amount of fuel that causes an air-fuel ratio of the cylinder to coincide with the stoichiometric air-fuel ratio.

In the mean time, hydrogen $H_2$ is a small molecule, compared with carbon hydride HC and carbon monoxide CO. Accordingly, hydrogen $H_2$ rapidly diffuses through the diffusion resistance layer 67*d* of the upstream air-fuel ratio sensor 67, compared to the other unburnt substances (HC, CO). Therefore, when a large amount of the unburnt substances including HC, CO, and $H_2$ are generated, a preferential diffusion of hydrogen $H_2$ considerably occurs in the diffusion resistance layer 67*d*. That is, hydrogen $H_2$ reaches the surface of an air-fuel detecting element (the exhaust-gas-side electrode layer 67*b* formed on the surface of the solid electrolyte layer 67*a*) in a larger mount compared with "the other unburnt substances (HC, CO)". As a result, a balance between a concentration of hydrogen $H_2$ and a concentration of the other unburnt substances (HC, CO) is lost. In other words, a fraction of hydrogen $H_2$ to all of the unburnt substances included in "the exhaust gas reaching the air-fuel ratio detecting element (the exhaust-gas-side electrode layer 67*b*) of the upstream air-fuel ratio sensor 67" becomes larger than a fraction of hydrogen $H_2$ to all of the unburnt substances included in "the exhaust gas discharged from the engine 10".

Meanwhile, the determining apparatus is the portion of the air-fuel ratio control apparatus. The air-fuel ratio control apparatus performs "a feedback control on an air-fuel ratio (main feedback control)" to cause "the upstream-side air-fuel ratio represented by the output value Vabyfs of the upstream air-fuel ratio sensor 67" to coincide with "a target upstream-side air-fuel ratio abyfr". Generally, the target upstream-side air-fuel ratio abyfr is set at (to) the stoichiometric air-fuel ratio.

Further, the air-fuel ratio control apparatus performs "a feedback control on an air-fuel ratio (sub feedback control of an air-fuel ratio)" to cause "the output value Voxs of the downstream air-fuel sensor 68 (or the downstream-side air-fuel ratio afdown represented by the output value Voxs of the downstream air-fuel ratio sensor)" to coincide with "a target downstream-side value Voxsref (or a target downstream-side air-fuel ratio represented by the target downstream-side value Voxsref). Generally, the target downstream-side value Voxsref is set at a value (0.5V) corresponding to the stoichiometric air-fuel ratio.

Here, it is assumed that each of air-fuel ratios of each of cylinders deviates toward a rich side without exception, while the air-fuel ratio imbalance among cylinders is not occurring. Such a state occurs, for example, when "a measured or estimated value of the intake air amount of the engine" which is a basis when calculating a fuel injection amount becomes larger than "a true intake air amount".

In this case, for example, it is assumed that the air-fuel ratio of each of the cylinders is AF2 shown in FIG. 8. When the air-fuel ratio of a certain cylinder is AF2, a larger amount of the unburnt substances (thus, hydrogen $H_2$) are included in the exhaust gas than when the air-fuel ratio of the certain cylinder is AF1 closer to the stoichiometric air-fuel ratio than AF2 (refer the point P1 and the point P2). Accordingly, "the preferential diffusion of hydrogen $H_2$" occurs in the diffusion resistance layer 67*d* of the upstream air-fuel ratio sensor 67.

In this case, a true average of the air-fuel ratio of "the mixture supplied to the engine 10 during a period in which each and every cylinder completes one combustion stroke (a period corresponding to 720° crank angle)" is also AF2. In addition, as described above, the air-fuel ratio conversion table Mapabyfs shown in FIG. 6 is made in consideration of "the preferential diffusion of hydrogen $H_2$". Therefore, the upstream-side air-fuel ratio abyfs represented by the actual output value Vabyfs of the upstream air-fuel ratio sensor 67 (i.e., the upstream-side air-fuel ratio abyfs obtained by applying the actual output value Vabyfs to the air-fuel ratio conversion table Mapabyfs) coincides with "the true average AF2 of the air-fuel ratio".

Accordingly, by the main feedback control, the air-fuel ratio of the mixture supplied to the entire engine 10 is corrected in such a manner that it coincides with "the stoichiometric air-fuel ratio which is the target upstream-side air-fuel ratio abyfr", and therefore, each of the air-fuel ratios of each of the cylinders also roughly coincides with the stoichiometric air-fuel ratio, since the air-fuel ratio imbalance among cylinders is not occurring. Consequently, a sub feedback amount (as well as a learning value of the sub feedback amount described later) does not become a value which corrects the air-fuel ratio in a great amount. In other words, when the air-fuel ratio imbalance among cylinders is not occurring, the sub feedback amount (as well as the learning value of the sub feedback amount described later) does not become the value which corrects the air-fuel ratio in a great amount.

Another description will next be made regarding behaviors of various values, when "the air-fuel ratio imbalance among cylinders" is not occurring.

For example, it is assumed that an air-fuel ratio A0/F0 is equal to the stoichiometric air-fuel ratio (e.g., 14.5), when the intake air amount (weight) introduced into each of the cylinders of the engine 10 is A0, and the fuel amount (weight) supplied to each of the cylinders is F0.

Further, it is assumed that an amount of the fuel supplied (injected) to each of the cylinders becomes uniformly excessive in 10% due to an error in estimating the intake air amount, etc. That is, it is assumed that the fuel of 1.1·F0 is supplied to each of the cylinder. Here, a total amount of the intake air supplied to the engine 10 which is the four cylinder engine (i.e., an intake amount supplied to the entire engine 10 during the period in which each and every cylinder completes one combustion stroke) is equal to 4·A0. A total amount of the fuel supplied to the engine 10 (i.e., a fuel amount supplied to the entire engine 10 during the period in which each and every cylinder completes one combustion stroke) is equal to 4.4·F0 (=1.1·F0+1.1·F0+1.1·F0+1.1·F0). Accordingly, a true average of the air-fuel ratio of the mixture supplied to the entire engine 10 is equal to 4·A0/(4.4·F0)=A0/(1.1·F0). At this time, the output value of the upstream air-fuel ratio sensor becomes equal to an output value corresponding to the air-fuel ratio A0/(1.1·F0).

Accordingly, the amount of the fuel supplied to each of the cylinders is decreased in 10% (the fuel of 1·F0 is supplied to each of the cylinders) by the main feedback control, and therefore, the air-fuel ratio of the mixture supplied to the entire engine 10 is caused to coincide with the stoichiometric air-fuel ratio A0/F0.

In contrast, it is assumed that only the air-fuel ratio of a specific cylinder greatly deviates to (become) the richer side. This state occurs, for example, when the fuel injection characteristic of the fuel injector 39 provided for the specific cylinder becomes “the characteristic that the injector 25 injects the fuel in an amount which is considerable larger (more excessive) than the instructed fuel injection amount”. This type of abnormality of the injector 25 is also referred to as “rich deviation abnormality of the injector”.

Here, it is assumed that an amount of fuel supplied to one certain specific cylinder is excessive in 40% (i.e., 1.4·F0), and an amount of fuel supplied to each of the other three cylinders is a fuel amount required to cause the air-fuel ratio of the other three cylinders to coincide with the stoichiometric air-fuel ratio (i.e., F0). Under this assumption, the air-fuel ratio of the specific cylinder is “AF3” shown in FIG. 8, and the air-fuel ratio of each of the other cylinders is the stoichiometric air-fuel ratio.

At this time, a total amount of the intake air supplied to the engine 10 which is the four cylinder engine (an amount of air supplied to the entire engine 10 during the period in which each and every cylinder completes one combustion stroke) is equal to 4·A0. A total amount of the fuel supplied to the entire engine 10 (an amount of fuel supplied to the entire engine 10 during the period in which each and every cylinder completes one combustion stroke) is equal to 4.4·F0 (=1.4·F0+F0+F0+F0).

Accordingly, the true average of the air-fuel ratio of the mixture supplied to the entire engine 10 is equal to 4·A0/(4.4·F0)=A0/(1.1·F0). That is, the true average of the air-fuel ratio of the mixture supplied to the entire engine 10 is the same as the value obtained “when the amount of fuel supplied to each of the cylinders is uniformly excessive in 10%” as described above.

However, as described above, the amount of the unburnt substances (NC, CO, and $H_2$) drastically increases, as the air-fuel ratio of the mixture supplied to the cylinder becomes richer and richer. Accordingly, “a total amount SH1 of hydrogen $H_2$ included in the exhaust gas in the case in which “only the amount of fuel supplied to the specific cylinder becomes excessive in 40%” is equal to SH1=H3+H0+H0+H0=H3+3 H0, according to FIG. 8. In contrast, “a total amount SH2 of hydrogen $H_2$ included in the exhaust gas in the case in which “the amount of the fuel supplied to each of the cylinders is uniformly excessive in 10%” is equal to SH2=H1+H1+H1+H1=4·H1, according to FIG. 8. The amount H1 is slightly larger than the amount H0, however, both of the amount H1 and the amount H0 are considerably small. That is, the amount H1 and the amount H0, as compared to the amount H3, is substantially equal to each other. Consequently, the total hydrogen amount SH1 is considerably larger than the total hydrogen amount SH2 (SH1>>SH2).

As described above, even when the average of the air-fuel ratio of the mixture supplied to the entire engine 10 is the same, the total amount SH1 of hydrogen included in the exhaust gas when the air-fuel ratio imbalance among cylinders is occurring is considerably larger than the total amount SH2 of hydrogen included in the exhaust gas when the air-fuel ratio imbalance among cylinders is not occurring.

Accordingly, the air-fuel ratio represented by the output value Vabyfs of the upstream air-fuel ratio sensor when only the amount of fuel supplied to the specific cylinder is excessive in 40% becomes richer (smaller) than “the true average of the air-fuel ratio (A0/(1.1·F0)) of the mixture supplied to the engine 10”, due to “the preferential diffusion of hydrogen $H_2$” in the diffusion resistance layer 67*d*. That is, even when the average of the air-fuel ratio of the exhaust gas is the same air-fuel ratio, the concentration of hydrogen $H_2$ at the exhaust-gas-side electrode layer 67*b* of the upstream air-fuel ratio sensor 67 becomes higher when the air-fuel ratio imbalance among cylinders is occurring than when the air-fuel ratio imbalance among cylinders is not occurring. Accordingly, the output value Vabyfs of the upstream air-fuel ratio sensor 67 becomes a value indicating an air-fuel ratio richer than “the true average of the air-fuel ratio”.

Consequently, by the main feedback control, the true average of the air-fuel ratio of the mixture supplied to the entire engine 10 is caused to be leaner than the stoichiometric air-fuel ratio.

On the other hand, the exhaust gas which has passed through the upstream-side catalytic converter 53 reaches the downstream air-fuel ratio sensor 56. The hydrogen $H_2$ included in the exhaust gas is oxidized (purified) together with the other unburnt substances (HC, CO) in the upstream-side catalytic converter 53. Accordingly, the output value Voxs of the downstream air-fuel ratio sensor 56 becomes a value corresponding to the average of the true air-fuel ratio of the mixture supplied to the engine 10. The air-fuel ratio correction amount (the sub feedback amount) calculated according to the sub feedback control becomes a value which compensates for the excessive correction of the air-fuel ratio to the lean side. The sub feedback amount causes the true average of the air-fuel amount of the engine 10 to coincide with the stoichiometric air-fuel ratio.

As described above, the air-fuel ratio correction amount (the sub feedback amount) calculated according to the sub feedback control becomes the value to compensate for “the excessive correction of the air-fuel ratio to the lean side” caused by the rich deviation abnormality of the injector 25 (the air-fuel ratio imbalance among cylinders). In addition, a degree of the excessive correction of the air-fuel ratio to the lean side increases, as the injector 25 which is in the rich deviation abnormality state injects the fuel in larger amount with respect to “the instructed injection amount” (i.e., the air-fuel ratio of the specific cylinder becomes richer).

Therefore, in “a system in which the air-fuel ratio of the engine is corrected to the richer side” as the sub feedback amount is a positive value and the magnitude of the sub feedback amount becomes larger, “a value varying depending upon the sub feedback amount (in practice, for example, a learning value of the sub feedback amount, the learning value obtained from the steady-state component of the sub feedback amount)” is a value representing the degree of the air-fuel ratio imbalance among cylinders.

In view of the above, the present determining apparatus obtains a value (e.g., an average of a learning value of the sub feedback amount) according to a value varying depending upon the sub feedback amount (in the present example, “the sub FB learning value” which is the learning value of the sub feedback amount”), as the parameter for imbalance determination. That is, the parameter for imbalance determination is “a value which becomes larger, as a difference becomes larger between an amount of hydrogen included in the exhaust gas before passing through the upstream-side catalytic converter 53 and an amount of hydrogen included in the exhaust gas after passing through the upstream-side catalytic converter 53”. Thereafter, the determining apparatus determines that the air-fuel ratio imbalance among cylinders is occurring, when the parameter for imbalance determination becomes equal to or larger than “an abnormality determining threshold” (e.g., when the value which increases and decreases according to increase and decrease of the sub FB learning value becomes a value which corrects the air-fuel ratio of the engine to the richer side in an amount equal to or larger than the abnormality determining threshold").

Figure 9:
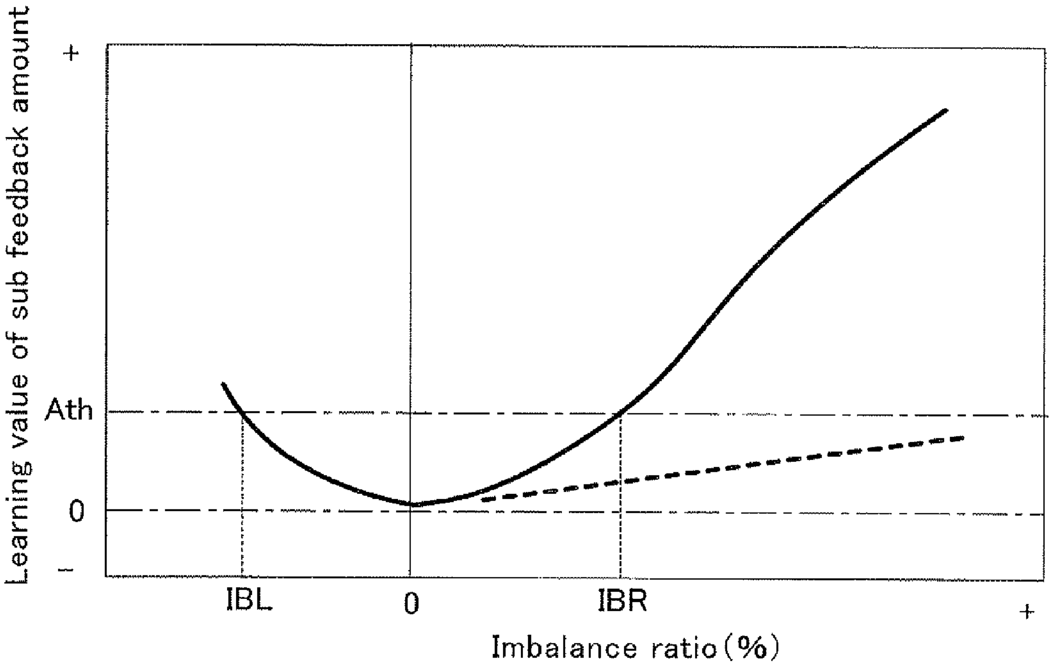
FIG. 9 is a graph showing a relationship between an air-fuel ratio imbalance ratio among cylinders and a learning value of sub feedback amount.

A solid line in FIG. 9 shows the sub FB learning value, when an air-fuel ratio of a certain cylinder deviates to the richer side and to the leaner side from the stoichiometric air-fuel ratio, due to the air-fuel ratio imbalance among cylinders. An abscissa axis of the graph shown in FIG. 9 is "an imbalance ratio". The imbalance ratio is defined as a ratio (Y/X) of a difference Y (=X−af) between "the stoichiometric air-fuel ratio X and the air-fuel ratio af of the cylinder deviating to the richer side" to "the stoichiometric air-fuel ratio X". As described above, an affect due to the preferential diffusion of hydrogen $H_2$ drastically becomes greater, as the imbalance ratio becomes larger. Accordingly, as shown by the solid line in FIG. 9, the sub FB learning value (and therefore, the parameter for imbalance determination) increases in a quadratic function fashion, as the imbalance ratio increases.

It should be noted that, as shown by the solid line in FIG. 9, the sub FB learning value increases as an absolute value of the imbalance ratio increases, when the imbalance ratio is a negative value. That is, for example, in a case in which the air-fuel ratio imbalance among cylinders occurs when an air-fuel ratio of one specific cylinder deviates to the leaner side, the sub FB learning value as the parameter for imbalance determination (the value according to the sub feedback learning value) increases. This state occurs, for example, when the fuel injection characteristic of the fuel injector 39 provided for the specific cylinder becomes "the characteristic that the injector 25 injects the fuel in an amount which is considerable smaller than the instructed fuel injection amount". This type of abnormality of the injector 25 is also referred to as "lean deviation abnormality of the injector".

The reason why the sub FB learning value increases when the air-fuel ratio imbalance among cylinders occurs in which the air-fuel ratio of the single specific cylinder greatly deviates to the leaner side will next be described briefly. In the description below, it is assumed that the intake air amount (weight) introduced into each of the cylinders of the engine 10 is A0. Further, it is assumed that the air-fuel ratio A0/F0 coincides with the stoichiometric air-fuel ratio, when the fuel amount (weight) supplied to each of the cylinders is F0.

In addition, it is assumed that the amount of fuel supplied to one certain specific cylinder (the first cylinder, for convenience) is considerably small in 40% (i.e., 0.6·F0), and an amount of fuel supplied to each of the other three cylinders (the second, the third, and the fourth cylinder) is a fuel amount required to cause the air-fuel ratio of the other three cylinders to coincide with the stoichiometric air-fuel ratio (i.e., F0). It should be noted it is assumed that a misfiring does not occur.

In this case, by the main feedback control, it is further assumed that the amount of the fuel supplied to each of the first to fourth cylinder is increased in the same amount (10%) to each other. At this time, the amount of the fuel supplied to the first cylinder is equal to 0.7·F0, and the amount of the fuel supplied to each of the second to fourth cylinder is equal to 1.1·F0.

Under this assumption, a total amount of the intake air supplied to the engine 10 which is the four cylinder engine (an amount of air supplied to the entire engine 10 during the period in which each and every cylinder completes one combustion stroke) is equal to 4·A0. A total amount of the fuel supplied to the engine 10 (an amount of fuel supplied to the entire engine 10 during the period in which each and every cylinder completes one combustion stroke) is equal to 4.0·F0 (=0.7·F0+1.1·F0+1.1·F0+1.1·F0), as a result of the main feedback control. Consequently, the true average of the air-fuel ratio of the mixture supplied to the entire engine 10 is equal to 4·A0/(4·F0)=A0/F0, that is the stoichiometric air-fuel ratio.

However, "a total amount SH3 of hydrogen $H_2$ included in the exhaust gas" in this case is equal to SH3=H4+H1+H1+H1=H4+3·H1. It should be noted that H4 is an amount of hydrogen generated when the air-fuel ratio is equal to A0/(0.7·F0), which is smaller than H1 and H2, and is roughly equal to H0. Accordingly, the total amount SH3 is at most equal to (H0+3·H1).

In contrast, "a total amount SH4 of hydrogen $H_2$ included in the exhaust gas" when the air-fuel ratio imbalance among cylinders is not occurring and the true average of the air-fuel ratio of the mixture supplied to the entire engine 10 is equal to the stoichiometric air-fuel ratio is SH4=H0+H0+H0+H0=4·H0. As described above, H1 is slightly larger than H0. Accordingly, the total amount SH3(=H0+3·H1) is larger than the total amount SH4 (=4·H0).

Consequently, when the air-fuel ratio imbalance among cylinders is occurring due to "the lean deviation abnormality of the injector", the output value Vabyfs of the upstream air-fuel ratio sensor 67 is affected by the preferential diffusion of hydrogen, even when the true average of the air-fuel ratio of the mixture supplied to the entire engine 10 is shifted to the stoichiometric air-fuel ratio by the main feedback control. That is, the upstream-side air-fuel ratio abyfs obtained by applying the output value Vabyfs to the air-fuel ratio conversion table Mapabyfs becomes "richer (smaller)" than the stoichiometric air-fuel ratio which is the target upstream-side air-fuel ratio abyfr. As a result, the main feedback control is further performed, and the true average of the air-fuel ratio of the mixture supplied to the entire engine 10 is adjusted (corrected) to the leaner side with respect to the stoichiometric air-fuel ratio.

Accordingly, the air-fuel ratio correction amount (the sub feedback amount and the sub FB learning value) calculated according to the sub feedback control becomes larger to compensate for "the excessive correction of the air-fuel ratio to the lean side according to the main feedback control" due to the lean deviation abnormality of the injector 25 (the air-fuel ratio imbalance among cylinders). Therefore, "the parameter for imbalance determination (for example, the sub FB learning value)" obtained based on "the air-fuel ratio correction amount calculated according to the sub feedback control" increases as the imbalance ratio is a negative value and the magnitude of the imbalance ratio increases.

Accordingly, the present determining apparatus determines that the air-fuel ratio imbalance among cylinders is occurring, when the parameter for imbalance determination (for example, the value which increases and decreases according to increase and decrease of the sub FB learning value) becomes equal to or larger than "the abnormality determining threshold Ath", not only in the case in which the air-fuel ratio of the specific cylinder deviates to "the rich side" but also in the case in which the air-fuel ratio of the specific cylinder deviates to "the lean side".

It should be noted that a dotted line in FIG. 9 indicates the sub FB learning value, when the each of the air-fuel ratios of each of the cylinders deviates uniformly to the richer side from the stoichiometric air-fuel ratio, and the main feedback control is terminated. In this case, the abscissa axis is adjusted so as to become the same deviation as "the deviation of the air-fuel ratio of the engine when the air-fuel ratio imbalance among cylinders is occurring". That is, for example, when "the air-fuel ratio imbalance among cylinders" is occurring in which only the air-fuel ratio of the first cylinder deviates by 20%, the imbalance ratio is 20%. In contrast, the actual imbalance ratio is 0%, when each of the air-fuel ratios of each of the cylinders uniformly deviates by 5% (20%/four cylinders), however, the imbalance ratio in this case is treated as 20% in FIG. 9. From a comparison the solid line in FIG. 9 and the dotted line in FIG. 9, it can be understood that "it is possible to determine that "the air-fuel ratio imbalance is occurring, when the sub FB learning value becomes equal to or larger than the abnormality determining threshold Ath". It should be noted that the sub FB learning value does not increase as shown by the dotted line in FIG. 9 in practice, since the main feedback control is performed when the air-fuel ratio imbalance among cylinders is not occurring.

(Avoidance of an Erroneous Determination of an Air-Fuel Ratio Imbalance Among Cylinders)

Meanwhile, an evaporated fuel is generated in the fuel tank 45. The evaporated fuel is adsorbed by the adsorbents 46*d* of the canister 46. However, there is a limit on a maximum amount of adsorption. Accordingly, the electric controller 80 opens the purge control valve 49 when a predetermined purge condition is satisfied, so that the evaporated fuel adsorbed by the adsorbents 46*d* is introduced into the intake passage of the engine as the evaporated fuel gas. That is, a control for supplying the evaporated fuel gas to the combustion chambers 25 (so-called "evapo-purge") is carried out.

However, the present inventors have found that, when the evaporated fuel gas is being introduced into the intake passage (i.e., "during the evapo-purge"), the output value of the downstream air-fuel ratio sensor 68 may sometimes be affected by the evaporated fuel gas, and thus, the parameter for imbalance determination in such a case may not be able to represent/indicate "the degree of the air-fuel ratio imbalance among cylinders" with high accuracy. For example, when a concentration of the evaporated fuel gas is extremely high, such as when the engine is started after a parking in the hot sun, "the output value Voxs of the downstream sensor 68" may easily be affected by the evaporated fuel gas, and therefore, "the parameter for imbalance determination" may not be able to represent/indicate the degree of the air-fuel ratio imbalance among cylinders. This state in which "the output value Voxs of the downstream sensor 68" is affected by the evaporated fuel gas (i.e., the parameter for imbalance determination is affected by the evaporated fuel gas) is referred to as "evaporated fuel gas effect occurrence state" in the present specification and the claims.

Meanwhile, the determining apparatus learns the concentration of the evaporated fuel gas as "an evaporated fuel gas concentration learning value", and corrects the fuel injection amount in accordance with the learned concentration. That is, the determining apparatus decreases the fuel injection amount in accordance with an amount of the evaporated fuel gas flowed into the combustion chambers 25, so as to control the air-fuel ratio of the mixture supplied to the engine 10 in such a manner that the air-fuel ratio of the mixture supplied to the engine 10 is maintained to coincide with the stoichiometric air-fuel ratio. Therefore, if the evaporated fuel gas concentration learning value is an appropriate (proper) value, "the evaporated fuel gas effect occurrence state" rarely occurs. Further, even if the evaporated fuel gas concentration learning value is not the appropriate value, "the evaporated fuel gas effect occurrence state" rarely occurs when the extremely small amount of the evaporated fuel gas is introduced.

In view of the above, the determining apparatus determines whether or not the evaporated fuel gas concentration learning value is in the vicinity of the appropriate value. More specifically, it determines whether or not "the number of times of update opportunity for the evaporated fuel gas concentration learning value after a start of the engine 10 (hereinafter, referred to as "the number of times of update opportunity for concentration learning value") is equal to or larger than the first opportunity number of times threshold. Thereafter, the determining apparatus determines that "the evaporated fuel gas effect occurrence state" does not occur, when the number of times of update opportunity for concentration learning value is equal to or larger than the first opportunity number of times threshold.

In contrast, when the number of times of update opportunity for concentration learning value is smaller than the first opportunity number of times threshold, the determining apparatus determines that "the evaporated fuel gas effect occurrence state" is occurring since the evaporated fuel gas concentration learning value deviates (is) away from the appropriate value by more than a predetermined value, and thus, prohibits (to perform) the determination of an air-fuel ratio imbalance among cylinders using "the parameter for imbalance determination" obtained based on the output value Voxs of the downstream air-fuel ratio sensor 68. In other words, when the number of times of update opportunity for concentration learning value is equal to or larger than the first opportunity number of times threshold, the determining apparatus determines that the "the evaporated fuel gas effect occurrence state" is not occurring, and therefore, allows (to perform) the determination of an air-fuel ratio imbalance among cylinders using "the parameter for imbalance determination".

Further, when the number of times of update opportunity for concentration learning value after the start of the engine 10 is equal to or smaller than a second threshold of the opportunity number of times (e.g. "0") smaller than the first opportunity number of times threshold, the determining apparatus controls the amount of the evaporated fuel gas to be introduced into the engine in such manner that the amount is extremely small (substantially "0"). Accordingly, if the number of times of update opportunity for concentration learning value is equal to or smaller than the second threshold of the opportunity number of times, "the evaporated fuel gas effect occurrence state" does not occur even when the evaporated fuel gas concentration learning value deviates (is) away from the appropriate value.

In view of the above, the determining apparatus determines whether or not the number of times of update opportunity for concentration learning value after the start of the engine 10 is equal to or smaller than the second threshold of the opportunity number of times. Thereafter, the determining apparatus allows (to perform) the determination of an air-fuel ratio imbalance among cylinders using "the parameter for imbalance determination" obtained based on the output value Voxs of the downstream air-fuel ratio sensor 68.

(Actual Operation)

The actual operation of the present determining apparatus will next be described.

<Fuel Injection Amount Control>

The CPU 81 repeatedly executes a routine shown in FIG. 10, to calculate a final fuel injection amount Fi and instruct a fuel injection, every time the crank angle of any one of the cylinders reaches a predetermined crank angle before its intake top dead center (e.g., BTDC 90° CA), for the cylinder (hereinafter, referred to as "a fuel injection cylinder") whose crank angle has reached the predetermined crank angle.

Accordingly, at an appropriate timing, the CPU 81 starts a process from step 1000, and performs processes from step 1010 to step 1060 in this order, and thereafter, proceeds to step 1095 to end the present routine tentatively.

Step 1010: The CPU 81 obtains "a cylinder intake air amount Mc(k)" at the present time, by applying "the intake air flow rate Ga measured by the air flowmeter 61, and the engine rotational speed NE" to a look-up table MapMc. The table MapMc defines in advance a relationship between "the intake air flow rate Ga, and the engine rotational speed NE" and "the cylinder intake air amount Mc". That is, step 1010 constitutes means for obtaining a cylinder intake air amount.

Step 1020: The CPU 81 reads out (fetches) a learning value of main feedback amount (main FB learning value) KG from the backup RAM 84. The main FB learning value KG is separately obtained by a main feedback learning routine shown in FIG. 12 described later, and is stored in the backup RAM 84.

Step 1030: The CPU 81 obtains a base fuel injection amount Fb(k) according to a formula (1) described below. That is, the CPU 81 obtains the base fuel injection amount Fb by dividing the cylinder intake air amount Mc(k) by the target upstream-side air-fuel ratio abyfr. The target upstream-side air-fuel ratio abyfr is set to (at) the stoichiometric air-fuel ratio, with the exception of special cases such as a warming-up period of the engine, a period of increasing of fuel after fuel cut control, and a period of increasing of fuel for preventing catalytic converter overheat. It should be noted that, in the present example, the target upstream-side air-fuel ratio abyfr is always set to (at) the stoichiometric air-fuel ratio. The base fuel injection amount Fb(k) is stored in the RAM 83 with information indicating the each corresponding intake stroke.

$$Fb(k)=Mc(k)/abyfr \tag{1}$$

Step 1040: The CPU 81 obtains a purge correction coefficient FPG according to a formula (2) described below. In the formula (2), PGT is a target purge rate PGT. The target purge rate PGT is obtained, at step 1330 in FIG. 13 described later, based on "a parameter indicative of an operating state (condition) of the engine 10" and "the number of times CFGPG of update opportunity for an evaporated fuel gas concentration learning value FGPG (the number of times of update opportunity for concentration learning value CFGPG)" described later. The evaporated fuel gas concentration learning value FGPG is obtained in a routine shown in FIG. 14 described later.

$$FPG=1+PGT(FGPG-1) \tag{2}$$

Step 1050: The CPU 81 obtains a final fuel injection amount (an instructed injection amount) Fi by correcting the base fuel injection amount Fb(k) according to a formula (3) described below. A main feedback coefficient FAF in the formula (3) is obtained in a routine shown in FIG. 11 described later.

$$Fi=KG\cdot FPG\cdot FAF\cdot Fb(k) \tag{3}$$

As is apparent from the formula (3), when the main feedback coefficient FAF serving as a main feedback amount is equal to "1", the main feedback coefficient FAF does not correct the base fuel injection amount (Fb(k)). That is, a reference (base) value of the main feedback coefficient FAF is "1".

Step 1060: The CPU 81 sends an instruction signal to the fuel injector 39 disposed so as to correspond to the fuel injection cylinder in order for a fuel of the final fuel injection amount Fi to be injected from the fuel injector 39.

In this way, the final fuel injection amount Fi is calculated by correcting the base fuel injection amount Fb by the main feedback coefficient FAF, and so on, and the fuel whose amount is equal to the final fuel injection amount Fi is injected for the fuel injection cylinder, when the fuel injector 39 is normal.

<Main Feedback Control>

Figure 10:
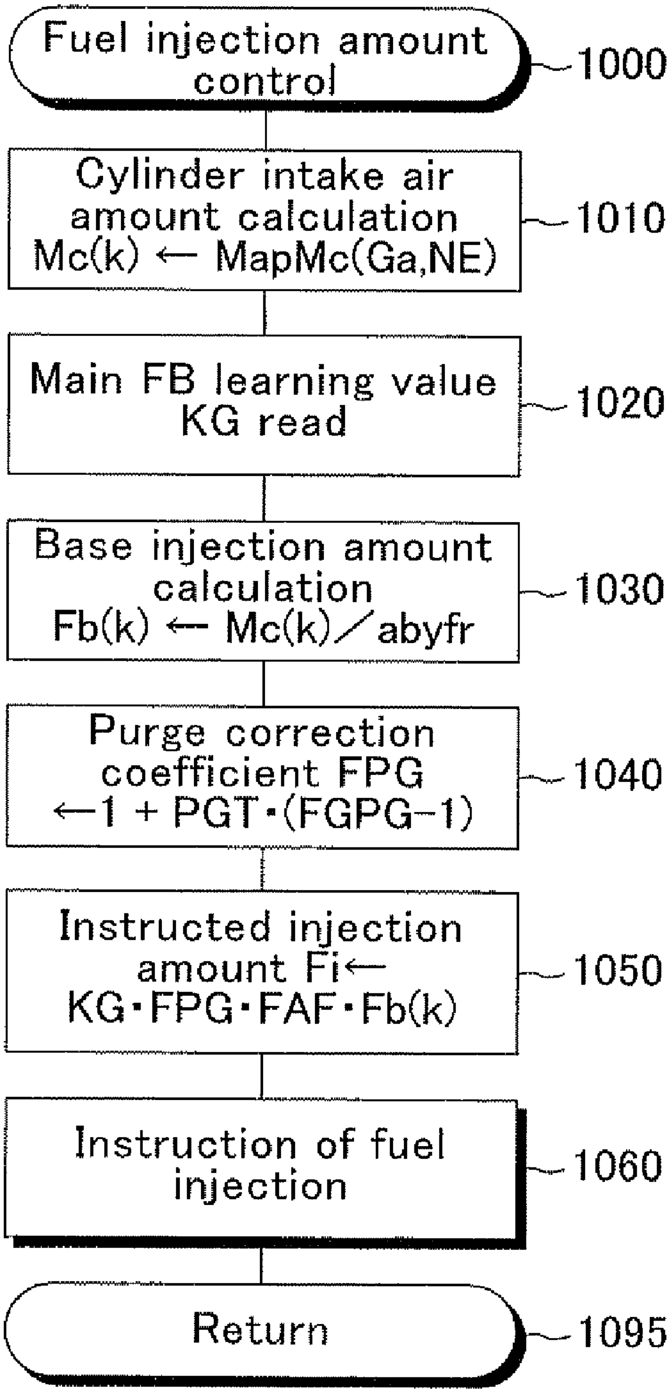
FIG. 10 is a flowchart showing a routine executed by a CPU of an electric controller shown in FIG. 1.
Figure 11:
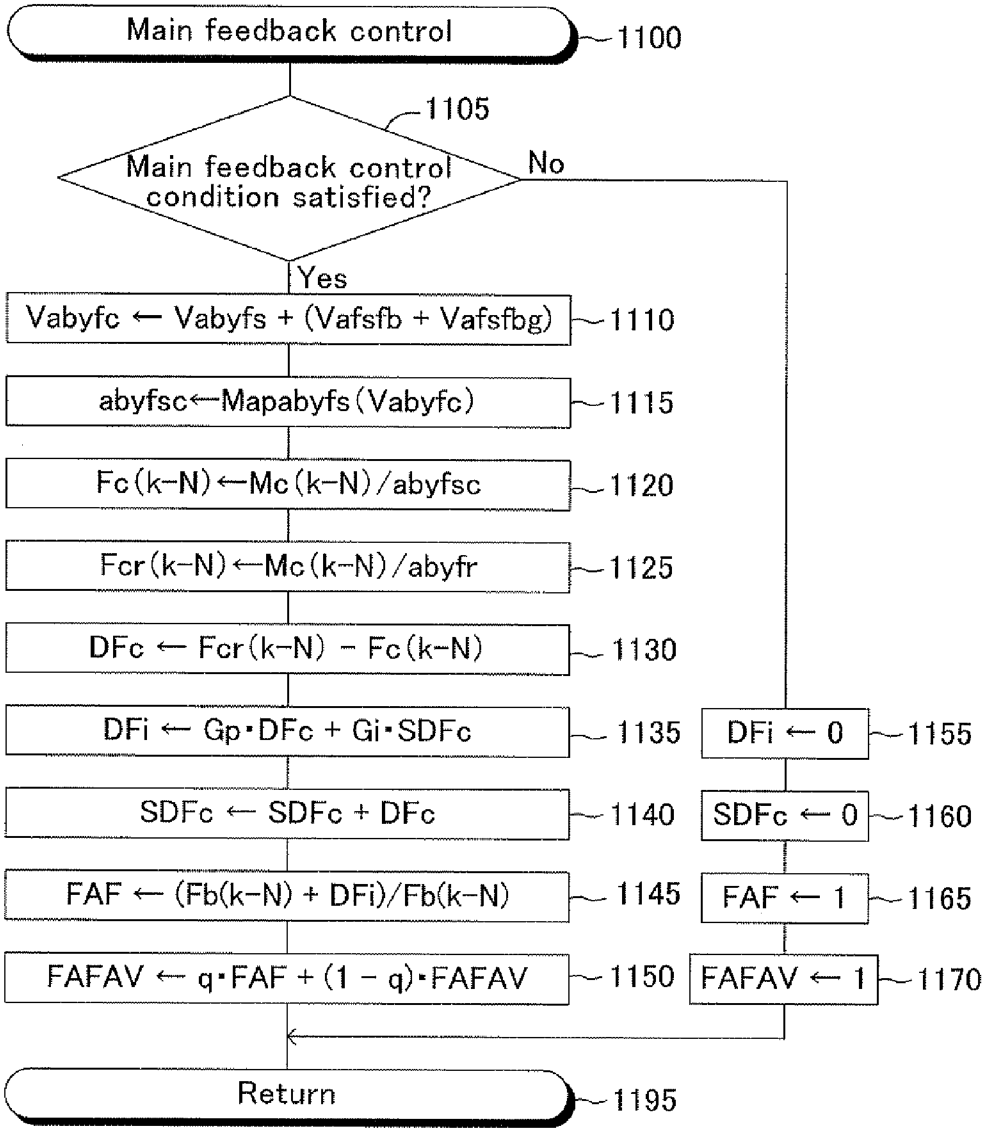
FIG. 11 is a flowchart showing a routine executed by the CPU of the electric controller shown in FIG. 1 for performing a main feedback control.

The CPU 81 repeatedly executes a routine, shown by a flowchart in FIG. 11, for the calculation of the main feedback amount (a routine for the main feedback control), every time a predetermined time period elapses (or, alternatively, following to the routine shown in FIG. 10). Accordingly, at an appropriate predetermined timing, the CPU 81 starts the process from step 1100 to proceed to step 1105 at which CPU 81 determines whether or not a main feedback control condition (an upstream-side air-fuel ratio feedback control condition) is satisfied. The main feedback control condition is satisfied, when, for example, the fuel cut operation is not performed, the cooling water temperature THW is equal to or higher than a first determined temperature, a load KL is equal to or smaller than a predetermined value, and the upstream air-fuel ratio sensor 67 has been activated.

It should be noted that the load KL is a loading rate (filling rate) KL, and is obtained based on the following formula (4). In the formula (4), ρ is an air density (unit is (g/l), L is a displacement of the engine 10 (unit is (l)), and "4" is the number of cylinders of the engine 10. It should be noted that the load KL may be the cylinder intake air amount Mc, the throttle valve opening angle TA, the accelerator pedal operation amount Accp, or the like.

$$KL=(Mc(k)/(\rho\cdot L/4))\cdot 100(\%) \tag{4}$$

The description continues assuming that the main feedback control condition is satisfied. In this case, the CPU 81 makes a "Yes" determination at step 1105 to execute processes from steps 1110 to 1150 described below in this order, and then proceed to step 1195 to end the present routine tentatively.

Step 1110: The CPU 81 obtains an output value Vabyfc for a feedback control, according to a formula (5) described below. In the formula (5), Vabyfs is the output value of the upstream air-fuel ratio sensor 67, Vafsfb is a sub feedback amount calculated based on the output value Voxs of the downstream air-fuel ratio sensor 68, and Vafsfbg is a learning value (sub FB learning value) of the sub feedback amount. These values are values obtained at the present time. The way by which the sub feedback amount Vafsfb and the sub FB learning value Vafsfbg are calculated will be described later.

$$Vabyfc=Vabyfs+(Vafsfb+Vafsfbg) \tag{5}$$

Step 1115: The CPU 81 obtains, as shown by a formula (6) described below, an air-fuel ratio abyfsc for a feedback control by applying the output value Vabyfc for a feedback control to the air-fuel ratio conversion table Mapabyfs shown in FIG. 6.

$$abyfsc=Mapabyfs(Vabyfc) \tag{6}$$

Step 1120: According to a formula (7) described below, the CPU 81 obtains "a cylinder fuel supply amount Fc(k−N)" which is "an amount of the fuel actually supplied to the combustion chamber 25 for a cycle at a timing N cycles before the present time". That is, the CPU 81 obtains the cylinder fuel supply amount Fc(k−N) through dividing "the cylinder intake air amount Mc(k−N) which is the cylinder intake air amount for the cycle the N cycles (i.e., N·720° crank angle) before the present time" by "the air-fuel ratio abyfsc for a feedback control".

$$Fc(k-N)=Mc(k-N)/abyfsc \tag{7}$$

The reason why the cylinder intake air amount Mc(k−N) for the cycle N cycles before the present time is divided by the air-fuel ratio abyfsc for a feedback control in order to obtain the cylinder fuel supply amount Fc(k−N) is because "the exhaust gas generated by the combustion of the mixture in the combustion chamber 25" requires time "corresponding to the N cycles" to reach the upstream air-fuel ratio sensor 67. It should be noted that, in practical, a gas formed by mixing the exhaust gases from the cylinders in some degree reaches the upstream air-fuel ratio sensor 67.

Step 1125: The CPU 81 obtains "a target cylinder fuel supply amount Fcr(k−N)" which is "a fuel amount which was supposed to be supplied to the combustion chamber 25 for the cycle the N cycles before the present time", according to a formula (8) described below. That is, the CPU 81 obtains the target cylinder fuel supply amount Fcr(k−N) by dividing the cylinder intake air amount Mc(k−N) for the cycle the N cycles before the present time by the target upstream-side air-fuel ratio abyfr (i.e., the stoichiometric air-fuel ratio).

$$Fcr(k-N)=Mc(k-N)/abyfr \quad (8)$$

As described before, the target upstream-side air-fuel ratio abyfr is set at the stoichiometric air-fuel ratio during a normal operating state. On the other hand, the target upstream-side air-fuel ratio abyfr may be set at a predetermined air-fuel ratio leaner (in the lean side) than the stoichiometric air-fuel ratio when a lean air-fuel ratio setting condition is satisfied for the purpose of avoiding a generation of an emission odor due to sulfur and so on. In addition, the target upstream-side air-fuel ratio abyfr may be set at an air-fuel ratio richer (in the rich side) than the stoichiometric air-fuel ratio when one of following conditions is satisfied.

when the present time is within a predetermined period after a stoppage (completion) of the fuel cut control (stoppage of the fuel supply), and when an operating condition is in an operating state (high load operating state) in which an overheat of the upstream-side catalytic converter 53 should be prevented.

Step 1130: The CPU 81 obtains "an error DFc of the cylinder fuel supply amount", according to a formula (9) described below. That is, the CPU 81 obtains the error DFc of the cylinder fuel supply amount by subtracting the cylinder fuel supply amount Fc(k−N) from the target cylinder fuel supply amount Fcr(k−N). The error DFc of the cylinder fuel supply amount represents excess and deficiency of the fuel supplied to the cylinder the N cycle before the present time.

$$DFc=Fcr(k-N)-Fc(k-N) \quad (9)$$

Step 1135: The CPU 81 obtains the main feedback value DFi, according to a formula (10) described below. In the formula (10) below, Gp is a predetermined proportion gain, and Gi is a predetermined integration gain. Further, "a value SDFc" in the formula (10) is "a temporal integrated value of the error DFc of the cylinder fuel supply amount". That is, the CPU 81 calculates "the main feedback value DFi" based on a proportional-integral control to have the air-fuel ratio abyfsc for a feedback control coincide with the target upstream-side air-fuel ratio abyfr.

$$DFi=Gp\cdot DFc+Gi\cdot SDFc \quad (10)$$

"A sum of the sub feedback amount Vafsfb and the sub FB learning value Vafsfbg" in the right-hand side of the formula (5) above is small and is limited to a small value, compared to the output value Vabyfs of the upstream-side air-fuel ratio 67. Accordingly, as described later, "the sum of the sub feedback amount Vafsfb and the sub FB learning value Vafsfbg" may be considered as "a supplement correction amount" to have "the output value Voxs of the downstream air-fuel sensor 68" coincide with "the target downstream-side value Voxsref which is a value corresponding to the stoichiometric air-fuel ratio". The air-fuel ratio abyfsc for a feedback control is therefore said to be a value substantially based on the output value Vabyfs of the upstream air-fuel ratio sensor 67. That is, the main feedback value DFi can be said to be a correction amount to have "the air-fuel ratio of the engine represented by the output value Vabyfs of the upstream air-fuel ratio sensor 67" coincide with "the target upstream-side air-fuel ratio (the stoichiometric air-fuel ratio)".

Step 1140: The CPU 81 obtains a new integrated value SDFc of the error DFc of the cylinder fuel supply amount by adding the error DFc of the cylinder fuel supply amount obtained at the step 1130 to the current integrated value SDFc of the error DFc of the cylinder fuel supply amount.

Step 1145: The CPU 81 applies the main feedback value DFi and the base fuel injection amount Fb(k−N) to a formula (11) described below to thereby obtain the main feedback coefficient FAF. That is, the main feedback coefficient FAF is obtained through dividing "a value obtained by adding the main feedback value DFi to the base fuel injection amount Fb(k−N) the N cycles before the present time" by "the base fuel injection amount Fb(k−N)".

$$FAF=(Fb(k-N)+DFi)/Fb(k-N) \quad (11)$$

Step 1150: The CPU 81 obtains a weighted average value of the main feedback coefficient FAF as a main feedback coefficient average FAFAV (hereinafter, referred to as "correction coefficient average FAFAV"), according to a formula (12) described below. In the formula (12), FAFAVnew is renewed (updated) correction coefficient average FAFAV which is stored as a new correction coefficient average FAFAV. In the formula (12), a value q is a constant larger than zero and smaller than 1. The correction coefficient average FAFAV is used when obtaining "the main FB learning value and the evaporated fuel gas concentration learning value FGPG". It should be noted that the correction coefficient average FAFAV may be an average of the main feedback coefficient FAF for a predetermined period.

$$FAFAVnew=q\cdot FAF+(1-q)\cdot FAFAV \quad (12)$$

As described above, the main feedback value DFi is obtained according to the proportional-integral control. The main feedback value DFi is converted into the main feedback coefficient FAF, and is reflected in (onto) the final fuel injection amount Fi by "the process of step 1050 in FIG. 10" described above. Consequently, excess and deficiency of the fuel supply amount is compensated, and thereby, an average of the air-fuel ratio of the engine (thus, the air-fuel ratio of the gas flowing into the upstream-side catalytic converter 53) is coincided with the target upstream-side air-fuel ratio abyfr (which is the stoichiometric air-fuel ratio, with an exception of the special cases).

At the determination of step 1105, if the main feedback control condition is not satisfied, the CPU 81 makes a "No" determination at step 1105 to proceed to step 1155 at which the CPU 81 sets the main feedback value DFi to (at) "0". Subsequently, the CPU 81 sets the integrated value SDFc of the error of the cylinder fuel supply amount to (at) "0" at step 1160, sets the main feedback coefficient FAF to (at) "1" at step 1165, and sets the correction coefficient average FAFAV to (at) "1". Thereafter, the CPU 81 proceeds to step 1195 to end the present routine tentatively.

As described above, when the main feedback control condition is not satisfied, the main feedback value DFi is set to (at) "0", and the main feedback coefficient FAF is set to (at) "1". Accordingly, the base fuel injection amount Fb is not corrected by the main feedback coefficient FAF. However, in such a case, the base fuel injection amount Fb is corrected by the main FB learning value KG.

<Main Feedback Learning (Base Air-Fuel Ratio Learning)>

The determining apparatus renews (updates) the learning value KG of the main feedback coefficient FAF based on the correction coefficient average FAFAV, in such a manner that the main feedback coefficient FAF comes closer to the reference (base) value “1”, during “a purge control valve closing instruction period (the period in which the duty ratio DPG is “0”)” for which an instruction signal to keep the purge control valve 49 at fully/completely closing state is sent to the purge control valve 49. The learning value is referred to as “the main FB learning value KG”.

Figure 12:
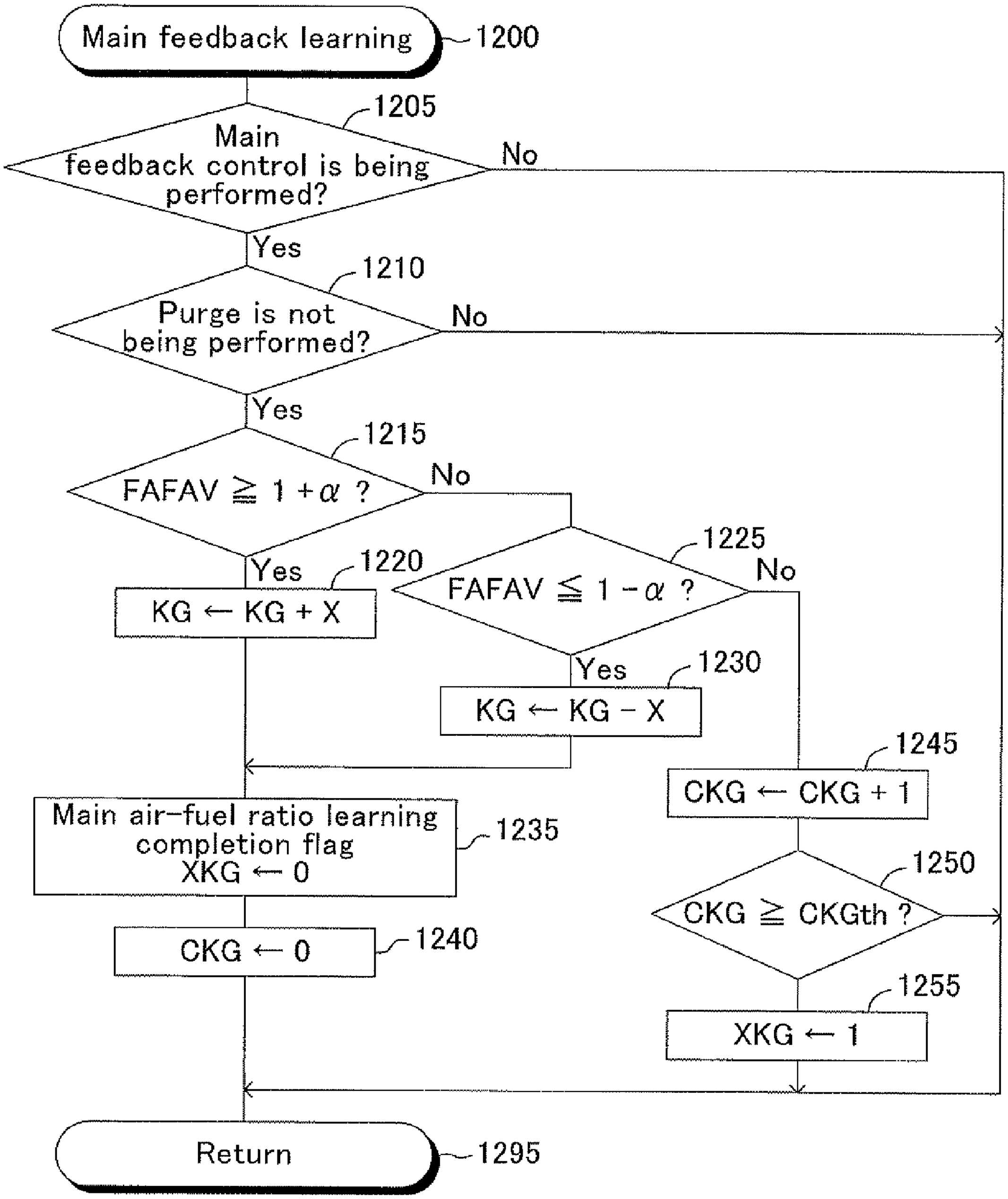
FIG. 12 is a flowchart showing a routine executed by the CPU of the electric controller shown in FIG. 1 for updating a learning value of main feedback amount.

In order to update/change the main FB learning value KG, the CPU 81 executes a main feedback learning routine shown in FIG. 12 every time a predetermined time elapses. Therefore, at an appropriate timing, the CPU 81 starts the process from step 1200 to proceed to step 1205 at which CPU 81 determines whether or not the main feedback control is being performed (i.e., whether or not the main feedback control condition is satisfied). If the main feedback control is not being performed, the CPU 81 makes a “No” determination at step 1205 to proceed to step 1295 to end the present routine tentatively. Consequently, the update of the main FB learning value is not carried out.

Figure 13:
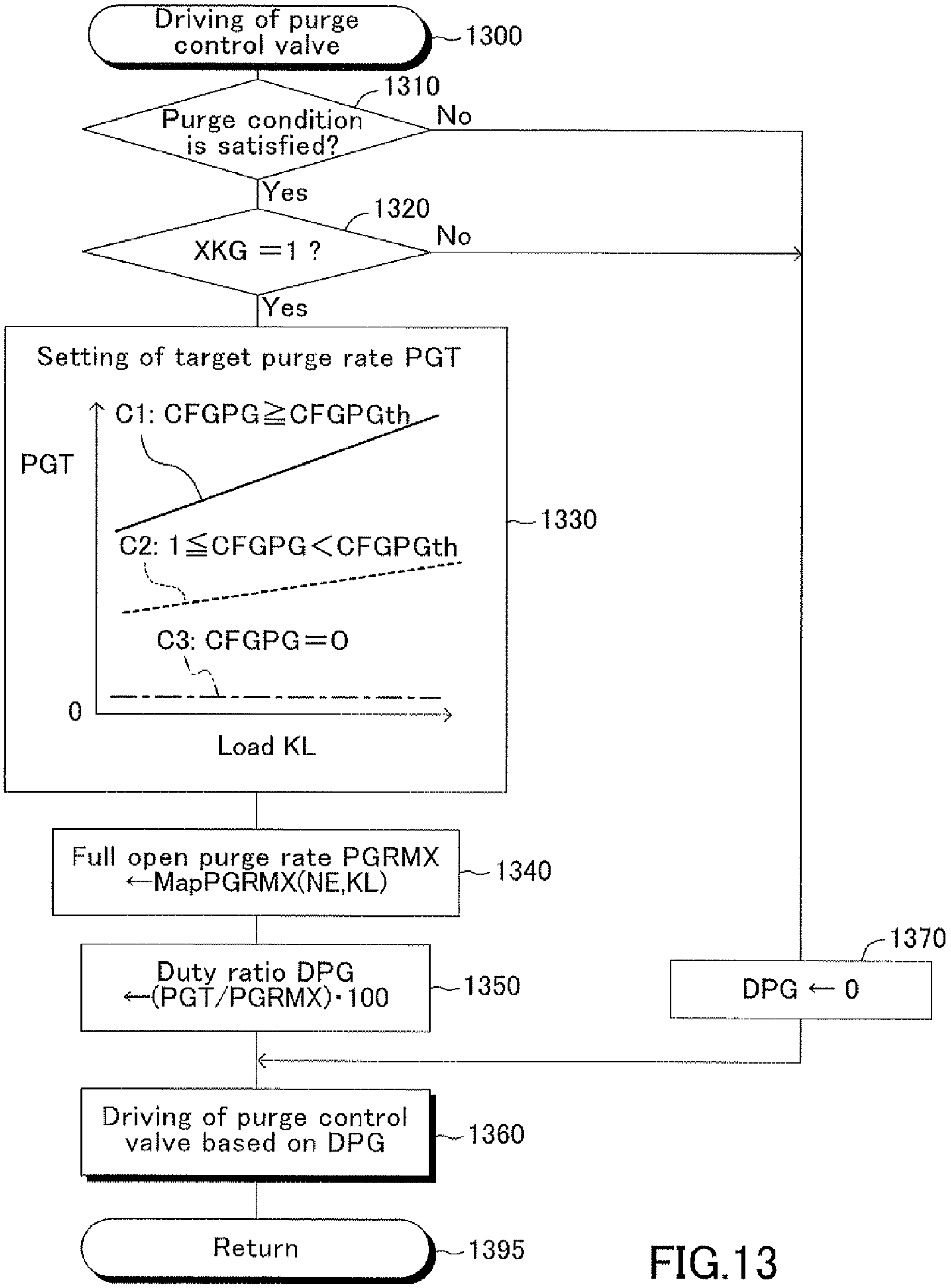
FIG. 13 is a flowchart showing a routine executed by the CPU of the electric controller shown in FIG. 1 for driving a purge control valve.

In contrast, when the main feedback control is being performed, the CPU 81 proceeds to step 1210 to determine whether or not “the evaporated fuel gas purge is not being carried out (more specifically, whether or not the target purge rate PGT obtained by a routine shown in FIG. 13 is “0”)”. When the fuel gas purge is being carried out, the CPU 81 makes a “No” determination at step 1210 to proceed to step 1295 to end the present routine tentatively. Consequently, when the fuel gas purge is being performed, the main FB learning value is not updated/renewed.

In contrast, in a case where the fuel gas purge is not being carried out when the CPU 81 proceeds to step 1210, the CPU 81 makes a “Yes” determination at step 1210 to proceed to step 1215 at which the CPU 81 determines whether or not the correction coefficient average FAFAV is equal to or larger than the value $1+\alpha$ ($\alpha$ is a predetermined minute value larger than 0 and smaller than 1, e.g., 0.02). At this time, if the correction coefficient average FAFAV is equal to or larger than the value $1+\alpha$, the CPU 81 proceeds to step 1220 to increase the main FB learning value KG by a predetermined positive value X. Thereafter, the CPU 81 proceeds to step 1235.

In contrast, if the correction coefficient average FAFAV is smaller than the value $1+\alpha$ when the CPU 81 proceeds to step 1215, the CPU 81 proceeds to step 1225 to determine whether or not the correction coefficient average FAFAV is equal to or smaller than the value $1-\alpha$. At this time, if the correction coefficient average FAFAV is smaller than the value $1-\alpha$, the CPU 81 proceeds to step 1230 to decrease the main FB learning value KG by the predetermined value X. Thereafter, the CPU 81 proceeds to step 1235.

Further, when the CPU 81 proceeds to step 1235, the CPU 81 sets a main feedback learning completion flag (main FB learning completion flag) XKG to (at) “0”. The main FB learning completion flag XKG indicates that the main feedback learning has been completed when its value is equal to “1”, and that the main feedback learning has not been completed yet when its value is equal to “0”.

Subsequently, the CPU 81 proceeds to step 1240 to set a value of a main learning counter CKG to (at) “0”. It should be noted that the value of a main learning counter CKG is also set to (at) “0” by an initialization routine executed when an unillustrated ignition key switch is changed from the off-position to the on-position of a vehicle on which the engine 10 is mounted. Thereafter, the CPU 81 proceeds to step 1295 to end the present routine tentatively.

Further, if the correction coefficient average FAFAV is larger than the value $1-\alpha$ (that is, the correction coefficient average FAFAV is between the value $1-\alpha$ and the value $1+\alpha$) when the CPU 81 proceeds to step 1225, the CPU 81 proceeds to step 1245 to increment the main learning counter CKG by “1”.

Thereafter, the CPU 81 proceeds to step 1250 to determine whether or not the main learning counter CKG is equal to or larger than a predetermined main learning counter threshold CKGth. When the main learning counter CKG is equal to or larger than the predetermined main learning counter threshold CKGth, the CPU 81 proceeds to step 1255 to set the main FB learning completion flag XKG to (at) “1”. That is, it is regarded that the learning of the main feedback learning value KG has been completed, when the number of times (i.e., the value of the counter CKG) of occurrence of “a state in which the value of the correction coefficient average FAFAV is between the value $1-\alpha$ and the value $1+\alpha$ when the process of 1215 shown in FIG. 12 is executed after the start of the engine 10 (i.e., when the main feedback learning is performed)” is equal to or larger than the predetermined main learning counter threshold CKGth. Thereafter, the CPU 81 proceeds to step 1295 to end the present routine tentatively.

In contrast, if the main learning counter CKG is smaller than the predetermined main learning counter threshold CKGth when the CPU 81 proceeds to step 1250, the CPU 81 proceeds directly to step 1295 to end the present routine tentatively.

It should be noted that the main learning counter CKG may be set to (at) “0” when the “No” determination is made at either step 1205 or step 1210. According to the configuration, it is regarded that the learning of the main FB learning value KG has been completed, when the number of times of consecutive occurrence of “a state in which the value of the correction coefficient average FAFAV is between the value $1-\alpha$ and the value $1+\alpha$ in a state in which the CPU 81 proceeds to steps following to step 1215 (that is, in a state in which the main feedback learning is performed)” becomes larger than the main learning counter threshold CKGth.

In this way, the main FB learning value KG is renewed (updated) while the main feedback control is being performed and the evaporated fuel gas purge is not being performed.

<Driving of the Purge Control Valve>

Meanwhile, the CPU 81 executes a “purge control valve driving routine” shown in FIG. 13 every time a predetermined time elapses. Accordingly, at an appropriate timing, the CPU 81 starts the process from step 1300 to proceed to step 1310 at which CPU 81 determines whether or not a purge condition is satisfied. The purge condition is satisfied when, for example, the air-fuel ratio feedback control is being performed, and the engine 10 is operated under a steady state (e.g., a change amount of the throttle valve opening angle TA per unit time is equal to or smaller than a predetermined value).

Here, it is assumed that the purge condition is satisfied. In this case, the CPU 81 makes a “Yes” determination at step 1310 to proceed to step 1320 at which the CPU 81 determines whether or not the main FB learning completion flag XKG is equal to “1” (i.e., whether or not the main feedback learning has been completed). When the main FB learning completion flag XKG is equal to “1”, the CPU 81 makes a “Yes” determination at step 1320 to execute processes from steps 1330 to 1360 described below in this order, and then proceeds to step 1395 to end the present routine tentatively.

Step 1330: The CPU 81 sets/determines the target purge rate PGT based on a parameter (e.g., the load KL of the engine) indicative of an operating state of the engine 10. More specifically, the CPU 81 uses a first purge rate table MapPGT1(KL) having data shown by a solid line C1 in a block of step 1330 shown in FIG. 13, when "the number of times of update opportunity for concentration learning value CFGPG of the evaporated fuel gas concentration learning value FGPG (i.e., the number of times of update opportunity for concentration learning value)" is equal to or larger than "a first opportunity number of times threshold CFGPGth". That is, the CPU 81 obtains the target purge rate PGT by applying the present load KL to the first purge rate table MapPGT1(KL).

In contrast, the CPU 81 uses a second purge rate table MapPGT2(KL) having data shown by a broken line C2, when "the number of times of update opportunity for concentration learning value CFGPG" is equal to or larger than "1" and smaller than "the first opportunity number of times threshold CFGPGth". That is, the CPU 81 obtains the target purge rate PGT by applying the present load KL to the second purge rate table MapPGT2(KL).

Further, the CPU 81 uses a third purge rate table MapPGT3(KL) having data shown by an alternate long and short dash line C3, when "the number of times of update opportunity for concentration learning value CFGPG" is equal to "0", that is, when there has been no update opportunity (opportunity history) of the evaporated fuel gas concentration learning value FGPG after the start of the engine 10. That is, the CPU 81 obtains the target purge rate PGT by applying the present load KL to the third purge rate table MapPGT3(KL).

According to the first purge rate table MapPGT1(KL), the target purge rate PGT is determined so as to be largest. According to the third purge rate table MapPGT3(KL), the target purge rate PGT is determined so as to be smallest (or extremely small). According to the second purge rate table MapPGT2(KL), the target purge rate PGT is determined so as to have a value between the target purge rate PGT obtained according to the first purge rate table MapPGT1(KL) and the target purge rate PGT obtained according to the third purge rate table MapPGT3(KL).

It should be noted that the purge rate is defined as a ratio of a purge flow rate KP to an intake air amount Ga. Alternatively, the purge rate may be defined as a ratio of a purge flow rate KP to "a sum of an intake air amount and the purge flow rate".

Step 1340: The CPU 81 obtains a full open purge rate PGRMX by applying the rotational speed NE and the load KL to a Table (Map) MapPGRMX. The full open purge rate PGRMX is a purge rate when the purge control valve 49 is fully opened. The table MapPGRMX is obtained in advance based on results of experiments or simulations, and is stored in the ROM 82. According to the table MapPGRMX, the full open purge rate PGRMX is determined so as to become smaller as the rotational speed NE becomes higher or the load KL becomes higher.

Step 1350: The CPU 81 calculates the duty ratio DPG by applying the full open purge rate PGRMX obtained at step 1340 and the target purge rate PGT obtained at step 1330 to a formula (13) described below.

$$DPG=(PGT/PGRMX)\cdot 100(\%) \quad (13)$$

Step 1360: The CPU 81 opens or closes the purge control valve 49 based on the duty ratio DPG. Accordingly, the evaporated fuel gas is introduced into the intake passage in such a manner that the purge rate coincides with the target purge rate PGT.

In contrast, when the purge condition is not satisfied, the CPU 81 makes a "No" determination at step 1310 to proceed to step 1370. In addition, when the main FB learning completion flag XKG is "0", the CPU 81 makes a "No" determination at step 1320 to proceed to step 1370. After the CPU 81 sets the duty ratio DPG to (at) "0" at step 1370, the CPU 81 proceeds to step 1360. At this time, since the duty ratio DPG is set at "0", the purge control valve 49 is fully/completely closed. Thereafter, the CPU 81 proceeds to step 1395 to end the present routine tentatively.

<Evaporated Fuel Gas Concentration Learning>

Figure 14:
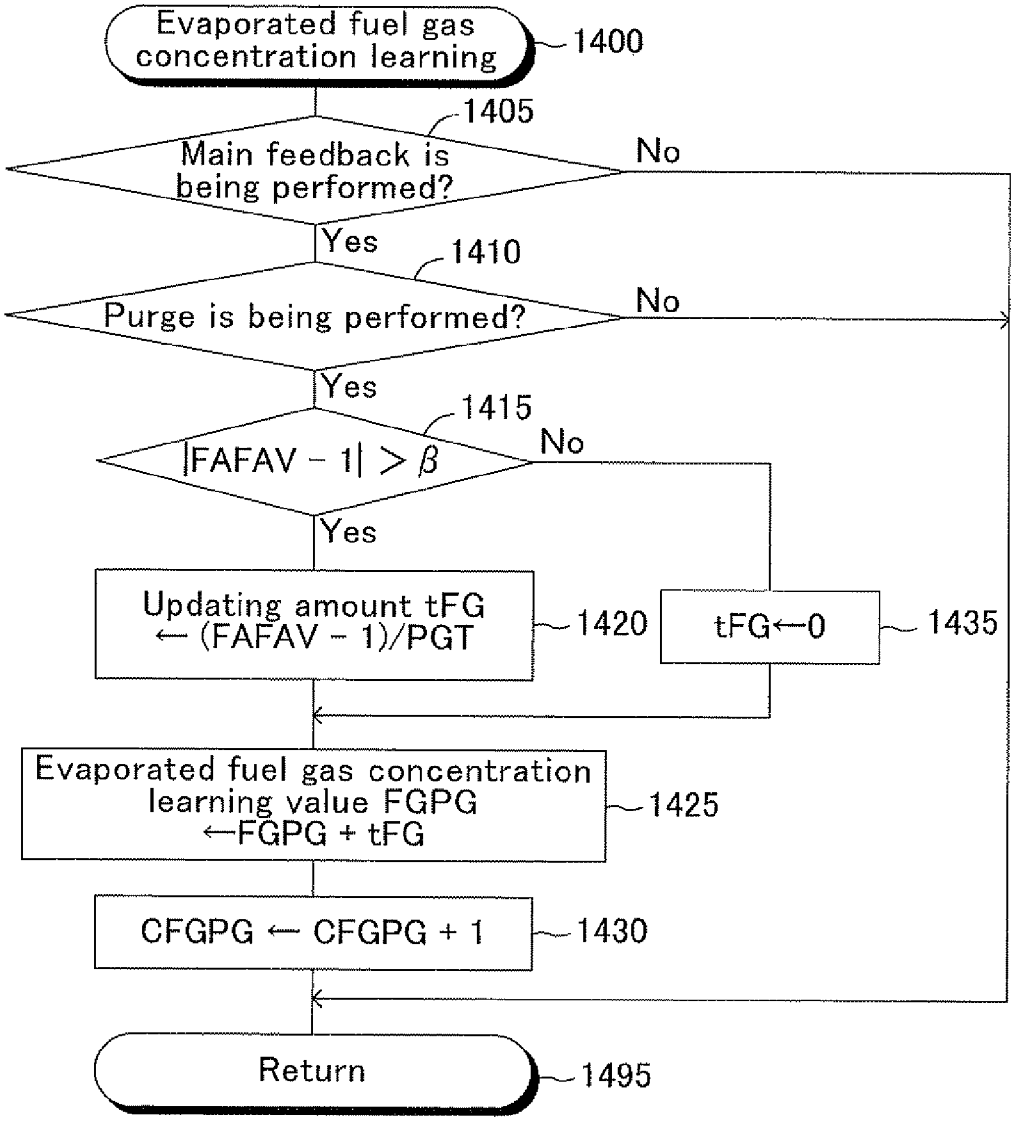
FIG. 14 is a flowchart showing a routine executed by the CPU of the electric controller shown in FIG. 1 for updating an evaporated fuel gas concentration learning value.

Further, the CPU 81 executes "an evaporated fuel gas concentration learning routine" shown in FIG. 14 every time a predetermined time elapses. An execution of the evaporated fuel gas concentration learning routine allows to update/change the evaporated fuel gas concentration learning value FGPG while the evaporated fuel gas purge is being carried out.

That is, at an appropriate timing, the CPU 81 starts the process from step 1400 to proceed to step 1405 at which CPU 81 determines whether or not the main feedback control is being performed (i.e., whether or not the main feedback control condition is satisfied). At this time, if the main feedback control is not being performed, the CPU 81 makes a "No" determination at step 1405 to proceed directly to step 1495 to end the present routine tentatively. Accordingly, the update of the evaporated fuel gas concentration learning value FGPG is not performed.

In contrast, when the main feedback control is being performed, the CPU 81 makes a "Yes" determination at step 1405 to proceed to step 1410 at which the CPU 81 determines whether or not "the evaporated fuel gas purge is being performed (more specifically, whether or not the target purge rate PGT obtained by the routine shown in FIG. 13 is "0")". At this time, if the evaporated fuel gas purge is not being performed, the CPU 81 makes a "No" determination at step 1410 to proceed directly to step 1495 to end the present routine tentatively. Accordingly, the update of the evaporated fuel gas concentration learning value FGPG is not performed.

If the evaporated fuel gas purge is being performed when the CPU 81 proceeds to step 1410, the CPU 81 makes a "Yes" determination at step 1410 to proceed to step 1415 at which the CPU 81 determines whether or not an absolute value $|FAFAV-1|$ of a value obtained by subtracting "1" from the correction coefficient average FAFAV is equal to or larger than a predetermined value $\beta$. $\beta$ is a minute value larger than 0 and smaller than 1, and for example, 0.02.

Meanwhile, the evaporated fuel gas is introduced into the intake passage when the main FB learning completion flag XKG is "1" as shown in step 1320 in FIG. 13 (that is, after the main feedback learning has been completed). Further, the main feedback is performed when the evaporated fuel gas is not being introduced as shown at step 1210 in FIG. 12. Therefore, when the main FB learning completion flag XKG is "1", factors other then the evaporated fuel gas, the factors deviating the air-fuel ratio of the engine from the stoichiometric air-fuel ratio, (more specifically, factors which deviate the absolute value of the correction coefficient average FAFAV from "1" by an amount of the predetermined value $\beta$ or more) are compensated by the main FB learning value KG.

As is apparent from the above, when the absolute value $|FAFAV-1|$ of a value obtained by subtracting "1" from the correction coefficient average FAFAV is determined to be equal to or larger than a predetermined value $\beta$ at step 1415 in FIG. 14, it is regarded (inferred) that the evaporated fuel gas concentration learning value FGPG is inaccurate, and therefore, the value of purge correction coefficient FPG calculated according to the formula (2) at step 1040 deviates (is) away from its appropriate value.

In view of the above, when the absolute value $|FAFAV-1|$ is equal to or larger than the value $\beta$, the CPU 81 makes a "Yes" determination at step 1415 to executes processes of step 1420 and step 1425 to thereby change/update the evaporated fuel gas concentration learning value FGPG. That is, the CPU 81 performs the learning of the evaporated fuel gas concentration learning value FGPG at step 1420 and step 1425.

Step 1420: The CPU 81 obtains an updating amount tFG according to a formula (14) described below. The target purge rate PGT in the formula (14) is set at step 1330 in FIG. 13. As is apparent from the formula (14), the updating amount tFG is "an error ε a (a difference obtained by subtracting 1 from FAFAV, i.e., FAFAV−1)" per 1% of the target purge rate. Thereafter, the CPU 81 proceeds step 1425.

$$tFG=(FAFAV-1)/PGT \quad (14)$$

The upstream air-fuel ratio abyfs becomes smaller with respect to the stoichiometric air-fuel ratio (an air-fuel ratio in a richer side with respect to the stoichiometric air-fuel ratio), as the concentration of the evaporated fuel gas becomes higher. Accordingly, the main feedback coefficient FAF becomes "a smaller value" which is smaller than "1" to decrease the fuel injection amount, and therefore, the correction coefficient average FAFAV becomes "a smaller value" which is smaller than "1". As a result, the value (FAFAV−1) becomes negative, and thus, the updating amount tFG becomes negative. Further, an absolute value of the updating amount tFG becomes larger as the value FAFAV becomes smaller (deviates more from "1"). That is, updating amount tFG becomes a negative value whose absolute value becomes larger, as the concentration of the evaporated fuel gas becomes higher.

Step 1425: The CPU 81 updates/changes the evaporated fuel gas concentration learning value FGPG according to a formula (15) described below. In the formula (15), FGPGnew is renewed (updated) evaporated fuel gas concentration learning value FGPG which the CPU 81 stores into the backup RAM 84 as the evaporated fuel gas concentration learning value FGPG. Consequently the evaporated fuel gas concentration learning value FGPG becomes smaller as the concentration of the evaporated fuel gas becomes higher. It should be noted that an initial value of the evaporated fuel gas concentration learning value FGPG is set at "1".

$$FGPG\text{new}=FGPG+tFG \quad (15)$$

Step 1430: The CPU 81 increments "the number of times of update opportunity for concentration learning value CFGPG of the evaporated fuel gas concentration learning value FGPG (i.e., the number of times of update opportunity for concentration learning value CFGPG)" by "1". The number of times of update opportunity for concentration learning value CFGPG is set at "0" by the initializing routine described above. Thereafter, the CPU proceeds to step 1495 to end the present routine tentatively.

In contrast, if the absolute value |FAFAV−1| is equal to or smaller than a predetermined value β when the CPU 81 proceeds to step 1415, the CPU 81 makes a "No" determination at step 1415 to proceed to step 1435 to set the updating amount tFG to (at) "0". Accordingly, in this case, the evaporated fuel gas concentration learning value FGPG remains unchanged. Subsequently, the CPU 81 proceeds to step 1430. Therefore, even when the evaporated fuel gas concentration learning value FGPG remains unchanged, the number of times of update opportunity for concentration learning value CFGPG is incremented by "1" as long as the process of step 1415 is executed.

<Calculation of the Sub Feedback Amount Vafsfb and the Sub FB Learning Value>

Figure 15:
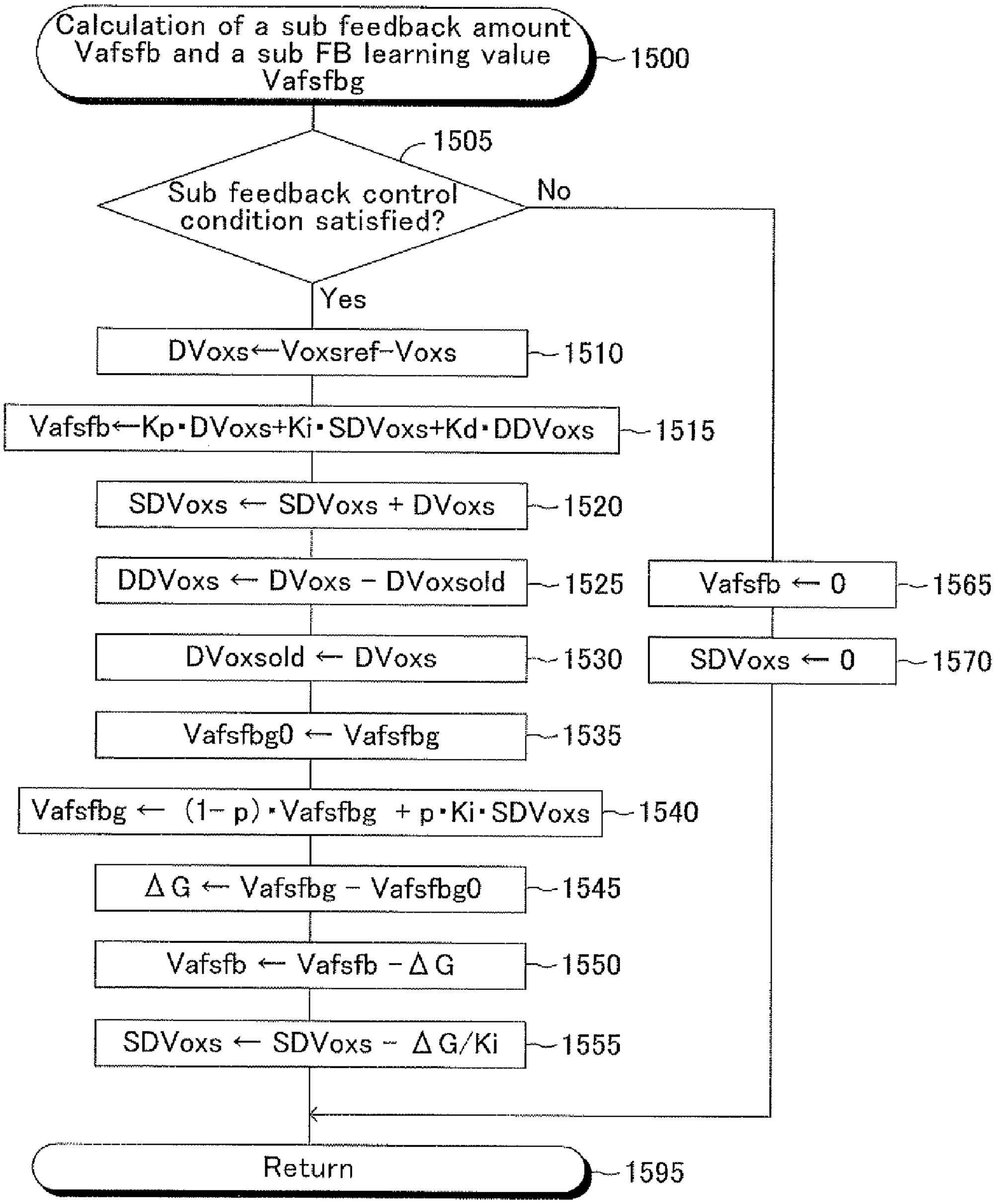
FIG. 15 is a flowchart showing a routine executed by the CPU of the electric controller shown in FIG. 1 for updating a sub feedback amount and a learning value of sub feedback amount.

The CPU 81 executes a routine shown in FIG. 15 every time a predetermined time period elapses in order to calculate the sub feedback amount Vafsfb and the learning value Vafsfbg of the sub feedback amount Vafsfb.

Accordingly, at an appropriate timing, the CPU 81 starts the process from step 1500 to proceed to step 1505 at which CPU determines whether or not a sub feedback control condition is satisfied. The sub feedback control condition is satisfied when, for example, the main feedback control condition is satisfied in step 1105 shown in FIG. 11 described before, the target upstream-side air-fuel ratio is set at the stoichiometric air-fuel ratio, the cooling water temperature THW is equal to or higher than a second determined temperature higher than the first determined temperature, and the downstream air-fuel ratio sensor 68 has been activated.

The description continues assuming that the sub feedback control condition is satisfied. In this case, the CPU 81 makes a "Yes" determination at step 1505 to execute processes from steps 1510 to 1530 described below in this order, to calculate the sub feedback amount Vafsfb.

Step 1510: The CPU 81 obtains an error amount of output DVoxs which is a difference between the target downstream-side value Voxsref (i.e., the stoichiometric air-fuel ratio corresponding value Vst) and the output value Voxs of the downstream air-fuel ratio sensor 68, according to a formula (16) described below. The error amount of output DVoxs is referred to as "a first error".

$$DVoxs=Voxsref-Voxs \quad (16)$$

Step 1515: The CPU 81 obtains the sub feedback amount Vafsfb according to a formula (17) described below. In the formula (17) below, Kp is a predetermined proportion gain (proportional constant), Ki is a predetermined integration gain (integration constant), and Kd is a predetermined differential gain (differential constant). SDVoxs is a integrated value (temporal integrated value) of the error amount of output DVoxs, and DDVOxs is a differential value (temporal differential value) of the error amount of output DVoxs.

$$Vafsfb=Kp\cdot DVoxs+Ki\cdot SDVoxs+Kd\cdot DDVoxs \quad (17)$$

Step 1520: The CPU 81 obtains a new integrated value SDVoxs of the error amount of output by adding "the error amount of output DVoxs obtained at step 1510" to "the current integrated value SDVoxs of the error amount of output"

Step 1525: The CPU 81 obtains a new differential value DDVoxs by subtracting "a previous error amount of the output DVoxsold calculated when the present routine was executed at a previous time" from "the error amount of output DVoxs calculated at the step 1510".

Step 1530: The CPU 81 stores "the error amount of output DVoxs calculated at the step 1510" as "the previous error amount of the output DVoxsold".

As described above, "the sub feedback amount Vafsfb" is calculated according to the proportional-integral-differential (PID) control to have the output value Voxs of the downstream air-fuel ratio sensor 68 coincide with the target downstream-side value Voxsref. As shown in the formula (5) described above, the sub feedback amount Vafsfb is used to calculate the output value Vabyfc for a feedback control.

Subsequently, the CPU 81 executes processes from steps 1535 to 1555 described below in this order, to calculate "the sub FB learning value Vafsfbg", and thereafter proceeds to step 1595 to end the present routine tentatively.

Step 1535: The CPU 81 stores "the current sub FB learning value Vafsfbg" as "a before updated learning value Vafsfbg0".

Step 1540: The CPU 81 updates/changes the sub FB learning value Vafsfbg according to a formula (18) described below. The updated sub FB learning value Vafsfbg (=Vafsfbgnew) is stored in the backup RAM 84. In the formula (18), the Value p is a minute constant larger than 0 and smaller than 1.

$$Vafsfbgnew=(1-p)\cdot Vafsfbg+p\cdot Ki\cdot SDVoxs \quad (18)$$

As is clear from the formula (18), the sub FB learning value Vafsfbg is a value obtained by performing "a filtering process to eliminate noises" on "the integral term Ki·SDVoxs of the sub feedback amount Vafsfb". In other words, the sub FB learning value Vafsfbg is a first order lag amount (blurred amount) of the integral term Ki·SDVoxs, and is a value corresponding to a steady-state component (integral term Ki·SDVoxs) of the sub feedback amount Vafsfb. Thus, the sub FB learning value Vafsfbg is updated/changed so as to come closer to (approach) the steady-state component of the sub feedback amount Vafsfb.

It should be noted that the sub FB learning value Vafsfbg may be updated/changed according to a formula (19) described below. In this case, as is apparent from the formula (19), the sub FB learning value Vafsfbg becomes a value obtained by performing "a filtering process to eliminate noises" on "the sub feedback amount Vafsfb". In other words, the sub FB learning value Vafsfbg may be a first order lag amount (blurred amount) of the sub feedback amount Vafsfb. In the formula (19), the Value p is a constant larger than 0 and smaller than 1.

$$Vafsfbgnew=(1-p)\cdot Vafsfbg+p\cdot Vafsfb \quad (19)$$

In either case, the sub FB learning value Vafsfbg is updated/changed so as to come closer to (approach) the steady-state component of the sub feedback amount Vafsfb. That is, the sub FB learning value Vafsfbg is updated/changed so as to fetch/bring in the steady-state component of the sub feedback amount Vafsfb accordingly.

Step 1545: The CPU 81 calculates a change amount (update amount) ΔG of the sub FB learning value Vafsfbg, according to a formula (20) described below. In the formula (20), Vafsfbg0 is "the sub FB learning value Vafsfbg immediately before the change (update)" which was fetched in (stored) at step 1535. Accordingly, the change amount ΔG can be a positive value and a negative value.

$$\Delta G=Vafsfbg-Vafsfbg0 \quad (20)$$

Step 1550: The CPU 81 corrects the sub feedback amount Vafsfb with the change amount ΔG, according to a formula (21) described below. That is, the CPU 81 decreases the sub feedback amount Vafsfb by the change amount ΔG, when it updates the learning value Vafsfbg so as to increase the learning value Vafsfbg by the change amount ΔG. In the formula (21), Vafsfbnew is a sub feedback amount Vafsfb after renewed/updated.

$$Vafsfbnew=Vafsfb-\Delta G \quad (21)$$

Step 1555: The CPU 81 corrects the integrated value SDVoxs of the error amount of output DVoxs, according to a formula (22) described below, when it updates the sub FB learning value Vafsfbg so as to increase the sub FB learning value Vafsfbg by the change amount ΔG according to the formula (18). In the formula (22), SDVoxsnew is an integrated value SDVoxs of the error amount of output DVoxs after renewed/updated.

$$SDVoxsnew=SDVoxs-\Delta G/Ki \quad (22)$$

It should be noted that step 1555 may be omitted. Further, steps from step 1545 to step 1555 may be omitted.

By the processes described above, the sub feedback amount Vafsfb and the sub FB learning value Vafsfbg are updated every time the predetermined time period elapses.

In contrast, when the sub feedback control condition is not satisfied, the CPU 81 makes a "No" determination at step 1505 in FIG. 15 to execute processes of step 1565 and step 1570 described below, and then proceeds to step 1595 to end the present routine tentatively.

Step 1565: The CPU 81 sets the value of the sub feedback amount Vafsfb at (to) "0".

Step 1570: The CPU 81 sets the value of the integrated value SDVoxs of the error amount of output at (to) "0".

By the processes described above, as is clear from the formula (5) above, the output value Vabyfsc for a feedback control becomes equal to the sum of the output value Vabyfs of the upstream air-fuel ratio sensor 67 and the sub FB learning value Vafsfbg. That is, in this case, "updating the sub feedback amount Vafsfb" and "reflecting the sub feedback amount Vafsfb in (into) the final fuel injection amount Fi" are stopped. It should be noted that at least the sub FB learning value Vafsfbg corresponding to the integral term of the sub feedback amount Vafsfb is reflected in (into) the final fuel injection amount Fi.

<Determination of the Air-Fuel Ratio Imbalance Among Cylinders>

Processes for performing "the determination of the air-fuel ratio imbalance among cylinders" will next be described. The CPU 81 repeatedly executes "a routine for the determination of the air-fuel ratio imbalance among cylinders" shown in FIG. 16, every time a predetermined time period elapses. Accordingly, at a predetermined timing, the CPU 81 starts the process from step 1600 to proceed to step 1605 at which CPU determines whether or not "a precondition (a determination performing condition) of an abnormality determination (determination of the air-fuel ratio imbalance among cylinders) is satisfied. When the precondition is satisfied, "the determination of the air-fuel ratio imbalance among cylinders" described below using "a parameter for imbalance determination calculated based on the sub FB learning value Vafsfbg" is allowed to be performed, on the condition that other condition(s) is(are) satisfied.

In other words, when the precondition is not satisfied, "a prohibiting condition for the determination" of the air-fuel ratio imbalance among cylinders is satisfied. When "the prohibiting condition for the determination" of the air-fuel ratio imbalance among cylinders is satisfied, "the determination of the air-fuel ratio imbalance among cylinders" described below using "the parameter for imbalance determination calculated based on the sub FB learning value Vafsfbg" is prohibited.

The precondition of the abnormality determination (the determination of the air-fuel ratio imbalance among cylinders) may include conditions from (condition 1) to (condition 6) described below, for example. It should be noted that the precondition may be satisfied, when either one of (the condition 1) and (the condition 2) is satisfied, and all of the conditions from (the condition 3) to (the condition 6) are satisfied. In other words, the prohibiting condition for the determination is satisfied, when both of (the condition 1) and (the condition 2) are unsatisfied, or when any one of the conditions from (the condition 3) to (the condition 6) are unsatisfied. Further, any one of combinations of at least one or more of these conditions may be adopted as the precondition of the abnormality determination.

(Condition 1)

The number of times of update opportunity for concentration learning value CFGPG is "0". That is, there has been no opportunity for updating the evaporated fuel gas concentration learning value FGPG since the start of the engine 10. In other words, there is no history indicating the evaporated fuel gas concentration learning value FGPG has been updated.

The reason why the condition 1 is provided is as follows.

As described above, the target purge rate PGT is determined at step 1330 in FIG. 13. The target purge rate PGT is obtained based on the third purge rate table MapPGT3(KL) (refer to the alternate long and short dash line C3 in step 1330 shown in FIG. 13) so as to be an extremely small value, when the number of times of update opportunity for concentration learning value CFGPG is equal to "0 (equal to or smaller than the second threshold of the opportunity number of times)"

Accordingly, as long as the number of times of update opportunity for concentration learning value CFGPG is equal to "0", "an evaporated fuel gas effect occurrence state", in which the sub FB learning value Vafsfbg is greatly changed due to the evaporated fuel gas, does not occur, even if the evaporated fuel gas concentration learning value FGPG deviates (is) away from the appropriate value. Therefore, when (the condition 1) is satisfied, the determination of an air-fuel ratio imbalance among cylinders is allowed (to be executed).

It should be noted that (the condition 1) may be replaced by a condition which is satisfied when the number of times of update opportunity for concentration learning value CFGPG is equal to or smaller than the second threshold of the opportunity number of times (including "0") in a case in which the target purge rate PGT is determined based on the third purge rate table MapPGT3(KL) when the number of times of update opportunity for concentration learning value CFGPG is equal to or smaller than the second threshold of the opportunity number of times.

(Condition 2)

The number of times of update opportunity for concentration learning value CFGPG is equal to or larger than the first opportunity number of times threshold CFGPGth. The first opportunity number of times threshold is larger than the second threshold of the opportunity number of times.

The reason why the condition 2 is provided is as follows.

When "the number of times of update opportunity for concentration learning value" is equal to or larger than the first opportunity number of times threshold CFGPGth, the evaporated fuel gas concentration learning value FGPG has been updated/changed many times (equal to or larger than the first opportunity number of times threshold CFGPGth) after the start of the engine 10. Therefore, it is determined (regarded) that the evaporated fuel gas concentration learning value FGPG is in the vicinity of the appropriate value, and thus, "the evaporated fuel gas effect occurrence state" does not occur. Accordingly, when (the condition 2) is satisfied, the determination of an air-fuel ratio imbalance among cylinders is allowed (to be executed).

(Condition 3)

A purifying ability to oxidize hydrogen of the upstream-side catalytic converter 53 is larger than a first predetermined ability. In other words, this condition is a condition that "the upstream-side catalytic converter 53 is in the state in which the upstream-side catalytic converter 53 can purify hydrogen flowed into the upstream-side catalytic converter 53 in an amount larger than a predetermined amount (that is, in a state to be able to purify hydrogen)".

The reason why the condition 3 is provided is as follows.

When the purifying ability to oxidize hydrogen of the catalytic converter 53 is equal to or smaller than the first predetermined ability, the hydrogen can not be purified sufficiently in the catalytic converter 53, and therefore, the hydrogen may flow out to the position downstream of the upstream-side catalytic converter 53. Consequently, the output value Voxs of the downstream air-fuel ratio sensor 68 may be affected by the preferential diffusion of hydrogen, or an air-fuel ratio of the gas at the position downstream of the upstream-side catalytic converter 53 may not coincide with "the true average of the air-fuel ratio of the mixture supplied to the entire engine 10". Accordingly, it is likely that the output value Voxs of the downstream air-fuel ratio sensor 68 does not correspond to "the true average of the air-fuel ratio which is excessively corrected by the air-fuel ratio feedback control using the output value Vabyfs of the upstream air-fuel ratio sensor 67". Therefore, if the air-fuel ratio imbalance determination among cylinders is carried out under the state, it is likely that the determination is erroneous.

For example, (the condition 3) may be a condition satisfied when an oxygen storage amount of the upstream-side catalytic converter 53 is neither equal to nor smaller than a first oxygen storage amount threshold. In this case, it is possible to determine that the purifying ability to oxidize hydrogen of the upstream-side catalytic converter 53 is larger than the first predetermined ability.

It should be noted that the oxygen storage amount of the upstream-side catalytic converter 53 can be obtained according to a well-known method separately. For example, the oxygen storage amount OSA of the upstream-side catalytic converter 53 is obtained by adding an amount corresponding to an excessive amount of oxygen flowing into the upstream-side catalytic converter 53 to the oxygen storage amount OSA, and subtracting an amount corresponding to an excessive amount of unburnt substances flowing into the upstream-side catalytic converter 53 from the oxygen storage amount OSA. That is, the oxygen storage amount OSA is obtained by obtaining an excess and deficiency amount ΔO2 of oxygen ($\Delta O2 = k \cdot mfr \cdot (abyfs - stoich)$) based on a difference between the upstream-side air-fuel ratio abyfs and the stoichiometric air-fuel ratio stoichi every time a predetermined time elapses (k is a ratio of oxygen to atmosphere, 0.23; mfr is an amount of fuel supplied for the predetermined time), and by integrating the excess and deficiency amount ΔO2 (refer to Japanese Patent Application Laid-Open No. 2007-239700, Japanese Patent Application Laid-Open No. 2003-336535, and Japanese Patent Application Laid-Open No. 2004-036475, etc.). It should be noted that the thus obtained oxygen storage amount OSA is limited to a value between the maximum oxygen storage amount Cmax of the upstream-side catalytic converter 53 and "0".

(Condition 4)

The purifying ability to oxidize hydrogen of the upstream-side catalytic converter 53 is smaller than a second predetermined ability. The second predetermined ability is larger than the first predetermined ability.

The reason why the condition 4 is provided is as follows.

When the purifying ability to oxidize hydrogen of the upstream-side catalytic converter 53 is equal to or larger than the second predetermined ability, there is a possibility that the average of the air-fuel ratio of the exhaust gas flowing out from the upstream-side catalytic converter 43 does not correspond to "the true average of the air-fuel ratio which is excessively corrected by the air-fuel ratio feedback control". For example, the oxygen storage amount of the upstream-side catalytic converter 53 is considerably large immediately after the fuel cut control, and therefore, the air-fuel ratio of the exhaust gas at the position downstream of the upstream-side catalytic converter 53 does not correspond to "the true average of the air-fuel ratio which is excessively corrected by the air-fuel ratio feedback control". In other words, the parameter for imbalance determination becomes a value indicating the degree of the air-fuel ratio imbalance among cylinders with high accuracy, when the purifying ability to oxidize hydrogen of the upstream-side catalytic converter 53 is between "the first predetermined ability and the second predetermined ability".

For example, the condition 4 may be a condition satisfied when the oxygen storage amount of the upstream-side catalytic converter 53 is neither equal to nor larger than a second oxygen storage amount threshold. When the oxygen storage amount of the upstream-side catalytic converter 53 is equal to or larger than the second oxygen storage amount threshold, it can be determined that the purifying ability to oxidize hydrogen of the upstream-side catalytic converter 53 is equal to or larger than the second predetermined ability. It should be noted that the second oxygen storage amount threshold is larger than the first oxygen storage amount threshold.

(Condition 5)

A flow rate of the exhaust gas discharged from the engine 10 is neither equal to nor larger than a flow rate of the exhaust gas threshold. That is, the flow rate of the exhaust gas discharged from the engine 10 is smaller than the flow rate of the exhaust gas threshold.

The reason why the condition 5 is provided is as follows.

When the flow rate of the exhaust gas discharged from the engine 10 is equal to or larger than the flow rate of the exhaust gas threshold, an amount of hydrogen flowing into the upstream-side catalytic converter 53 exceeds the ability to oxidize hydrogen of the upstream-side catalytic converter 53, and therefore, the hydrogen may flow out to the position downstream of the upstream-side catalytic converter 53. Accordingly, it is likely that the output value Voxs of the downstream air-fuel ratio sensor 68 is affected by the preferential diffusion of hydrogen. Alternatively, an air-fuel ratio at the position downstream of the catalytic converter may not coincide with "the true average of the air-fuel ratio of the mixture supplied to the entire engine". Consequently, even when the air-fuel ratio imbalance among cylinders is occurring, it is likely that the output value Voxs of the downstream air-fuel ratio sensor 68 does not correspond to "the true air-fuel ratio which is excessively corrected by the air-fuel ratio feedback control using the output value Vabyfs of the upstream air-fuel ratio sensor 67". Therefore, if the air-fuel ratio imbalance determination among cylinders is carried out under these states, it is likely that the determination is erroneous.

The condition 5 may be a condition which is satisfied, for example, when the load (load rate KL, the throttle valve opening angle TA, the operation amount Accp of the accelerator pedal, and the like) of the engine 10 is neither equal to nor larger than a load threshold. Alternatively, the condition 5 may be a condition which is satisfied when an intake air amount Ga of the engine 10 per unit time is neither equal to nor larger than an intake air amount threshold.

(Condition 6)

The target upstream-side air-fuel ratio is set at the stoichiometric air-fuel ratio.

It is assumed that the precondition of the abnormality determination described above (either the condition 1 or the condition 2, and all of conditions from the condition 3-the condition 6) is satisfied. In this case, the CPU 81 makes a "Yes" determination at step 1605 to proceed to step 1610 to determine "whether or not the sub feedback control condition described above is satisfied". When the sub feedback control condition is satisfied, the CPU 81 executes processes steps from step 1615. The processes steps from step 1615 are a portion for the abnormality determination (the determination of the air-fuel ratio imbalance among cylinders). It can therefore be said that the sub feedback control condition constitutes a part of "the precondition of the abnormality determination". Further, the sub feedback control condition is satisfied, when the main feedback control condition is satisfied. It can therefore be said that the main feedback control condition also constitutes a part of "the precondition of the abnormality determination".

The description continues assuming that the sub feedback control condition is satisfied. In this case, the CPU 81 executes appropriate processes from steps 1615 to 1660 described below.

Step 1615: The CPU 81 determines whether or not the present time is "immediately after a timing (immediate after timing of sub FB learning value update) at which the sub FB learning value Vafsfbg is changed (updated)". When the present time is the time immediately after the timing of sub FB learning value update, the CPU 81 proceeds to step 1620. When the present time is not the time immediately after the timing of sub FB learning value update, the CPU 81 proceeds to step 1695 to end the present routine tentatively.

Step 1620: The CPU 81 increments a value of a learning value cumulative counter Cexe by "1".

Step 1625: The CPU 81 reads (fetches) the sub FB learning value Vafsfbg calculated by the routine shown in FIG. 15.

Step 1630: The CPU 81 updates a cumulative value Svafsfbg of the sub FB learning value Vafsfbg. That is, the CPU 81 adds "the sub FB learning value Vafsfbg read at step 1625" to "the present cumulative value Svafsfbg" in order to obtain a new cumulative value Svafsfbg.

The cumulative value Svafsfbg is set to (at) "0" in the initialization routine described above. Further, the cumulative value Svafsfbg is set to (at) "0" by a process of step 1660 described later. The process of the step 1660 is executed when the abnormality determination (the determination of the air-fuel ratio imbalance among cylinders, steps 1645-1655) is carried out. Accordingly, the cumulative value Svafsfbg is an integrated value of the sub FB learning value Vafsfbg in a period in which "the precondition of an abnormality determination is satisfied" after "the start of the engine or the last execution of the abnormality determination", and in which "the sub feedback control condition is satisfied".

Step 1635: The CPU 81 determines whether or not the value of the learning value cumulative counter Cexe is equal to or larger than a counter threshold Cth. When the value of the learning value cumulative counter Cexe is smaller than the counter threshold Cth, the CPU 81 makes a "No" determination at step 1635 to directly proceed to step 1695 to end the present routine tentatively. In contrast, when the value of the learning value cumulative counter Cexe is equal to or larger than the counter threshold Cth, the CPU 81 makes a "Yes" determination to proceed to step 1640.

Step 1640: The CPU 81 obtains a sub FB learning value average Avesfbg by dividing "the cumulative value Svafsfbg of the sub FB learning value Vafsfbg" by "the learning value cumulative counter Cexe". As described above, the sub FB learning value average Avesfbg is the parameter for imbalance determination which increases as the difference between the amount of hydrogen included in the exhaust gas which has not passed through the upstream-side catalytic converter 53 and the amount of hydrogen included in the exhaust gas which has passed through the upstream-side catalytic converter 53 increases.

Step 1645: The CPU 81 determines whether or not the sub FB learning value average Avesfbg is equal to or larger than an abnormality determining threshold Ath. As described above, when the air-fuel ratio non-uniformity (imbalance) among cylinders becomes excessively large, and "the air-fuel ratio imbalance among cylinder" is therefore occurring, the sub feedback amount Vafsfb changes to "the value to correct the air-fuel ratio of the mixture supplied to the engine 10 to the richer side in a great amount, and accordingly, the sub FB learning value average Avesfbg which is the average value of the sub FB learning value Vafsfbg also changes to "the value to correct the air-fuel ratio of the mixture supplied to the engine 10 to the richer side in a great amount (a value equal to or larger than the threshold value Ath)".

Accordingly, when the sub FB learning value average Avesfbg is equal to or larger than the abnormality determining threshold value Ath, the CPU 81 makes a "Yes" determination at step 1645 to proceed to step 1650 at which the CPU 81 sets a value of an abnormality occurring flag XIJO to (at) "1". That is, when the value of the abnormality occurring flag XIJO is "1", it is indicated that the air-fuel ratio imbalance among cylinders is occurring. It should be noted that the value of the abnormality occurring flag XIJO is stored in the backup RAM 84. When the value of the abnormality occurring flag XIJO is set to (at) "1", the CPU may turn on a warning light which is not shown.

On the other hand, when the sub FB learning value average Avesfbg is smaller than the abnormality determining threshold value Ath, the CPU 81 makes a "No" determination at step 1645 to proceed to step 1655. At step 1655, the CPU 81 sets the value of the abnormality occurring flag XIJO to (at) "0" in order to indicate that the air-fuel ratio imbalance among cylinders is not occurring.

Step 1660: The CPU 81 proceeds to step 1660 from either step 1650 or step 1655 to set (reset) the value of the learning value cumulative counter Cexe to (at) "0" and set (reset) the cumulative value Svafsfbg of the sub FB learning value to (at) "0".

It should be noted that, when the CPU 81 executes the process of step 1605 and the precondition of the abnormal determination is not satisfied, the CPU 81 directly proceeds to step 1695 to end the present routine tentatively. Further, when the CPU 81 executes the process of step 1605 and the precondition of the abnormal determination is not satisfied, the CPU 81 may proceed to step 1695 through step 1660 to end the present routine tentatively. Furthermore, when the CPU 81 executes the process of step 1610 and the sub feedback control condition is not satisfied, the CPU 81 directly proceeds to step 1695 to end the present routine tentatively.

As described above, the determining apparatus according to the embodiment of the present invention uses the condition 1 and the condition 2 as the condition for executing/performing the determination of the air-fuel ratio imbalance among cylinders, and therefore, is the apparatus for determining an air-fuel ratio imbalance among cylinders, which is practical, and which is unlikely to make an erroneous determination that "the air-fuel ratio imbalance among cylinders is excessive" due to the evaporated fuel gas.

Figure 16:
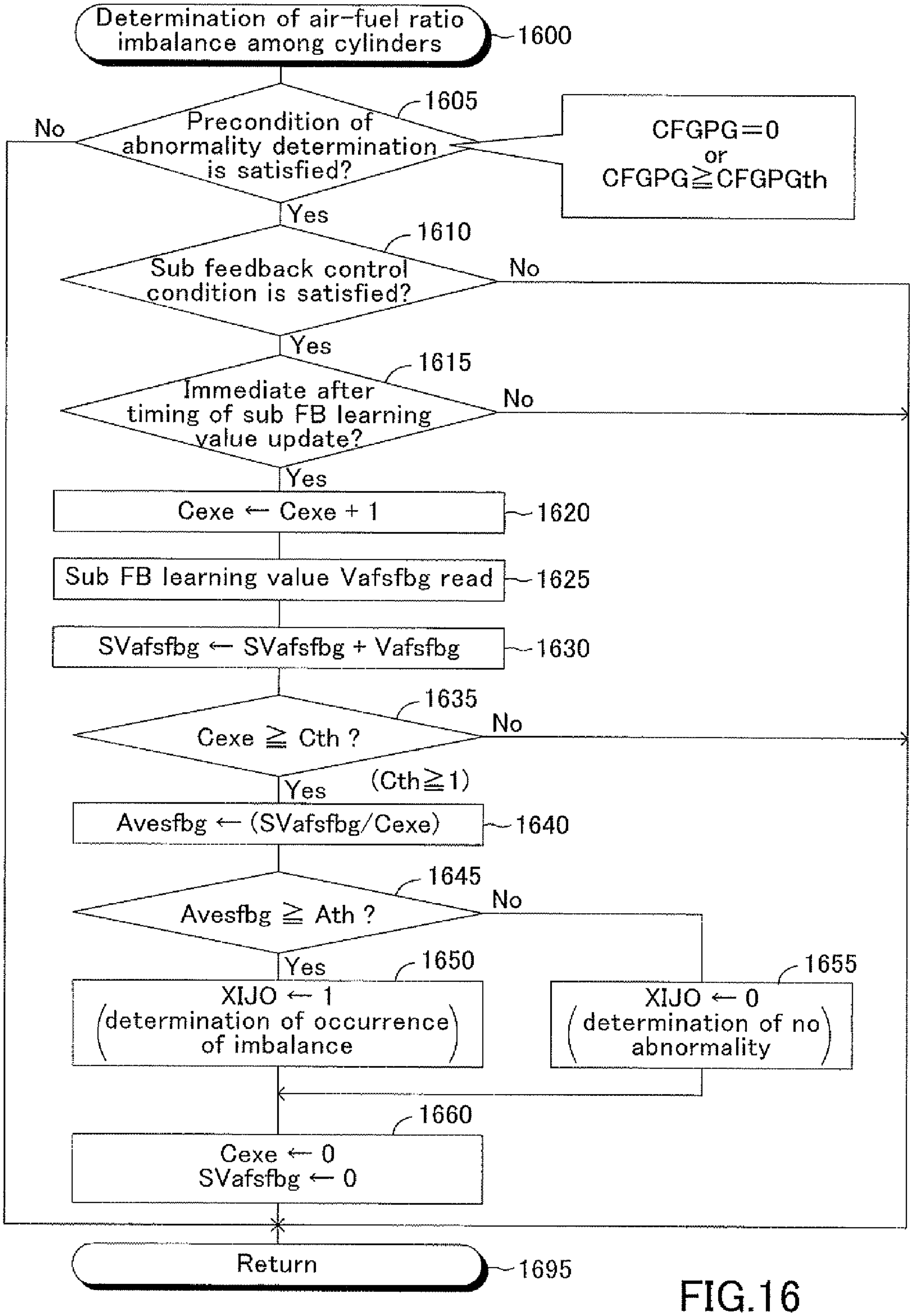
FIG. 16 is a flowchart showing a routine executed by the CPU of the electric controller shown in FIG. 1 for performing a determination of an air-fuel ratio imbalance among cylinders.

The determining apparatus according to the embodiment of the present invention is applied to the multi-cylinder internal combustion engine 10 having a plurality of cylinders, comprises:

the catalytic converter (the upstream-side catalytic converter 53) disposed in the exhaust passage at the position downstream of the exhaust gas aggregated portion (the exhaust gas aggregated portion of the exhaust manifold 51) into which gases discharged from the combustion chambers (25) of at least two or more of a plurality of the cylinders merge;

the fuel injectors (39), each of them disposed so as to correspond to each of the at least two or more of the cylinders, and each of them injecting the fuel to be contained in the mixture supplied to each of the combustion chambers (25) of the two or more of the cylinders;

purge passage section forming the passage which allows the evaporated fuel gas generated in the fuel tank (45) storing the fuel supplied to the fuel injectors to be introduced into the intake passage of the engine;

purge amount control means for controlling an evaporated fuel gas purge amount which is an amount of said evaporated fuel gas introduced/flowed into the intake passage (the surge tank 41*b*, the intake passage at a position downstream of the throttle valve 44) of the engine through the purge passage section (refer to the purge control valve 49, the routine shown in FIG. 13);

an upstream air-fuel ratio sensor (67), disposed at the exhaust gas aggregated portion, or disposed between the exhaust gas aggregated portion and the catalytic converter in the exhaust passage, and the upstream air-fuel ratio sensor including the diffusion resistance layer (67*d*) with which the exhaust gas which has not passed through the catalytic converter contacts, and the air-fuel ratio detecting element (67*a*, 67*b*, 67*c*) which is covered with said diffusion resistance layer and outputs the output value according to the air-fuel ratio of the exhaust gas which has reached the air-fuel ratio detecting element after passing through said diffusion resistance layer;

the downstream air-fuel ratio sensor (68) which outputs an output value according to the air-fuel ratio of the exhaust gas which has passed through the catalytic converter;

air-fuel ratio feedback control means for performing a feedback control on the fuel injection amount which is an injection amount of the fuel injected from each of the fuel injectors in such a manner that the air-fuel ratio abyfs (the upstream-side air-fuel ratio abyfs) represented by the output value Vabyfs of the upstream air-fuel ratio sensor (67) coincides with the stoichiometric air-fuel ratio (refer to FIG. 10, especially step 1050, and the routine shown in FIG. 11); and imbalance determining means for executing the determination of an air-fuel ratio imbalance among cylinders as to whether or not the imbalance among individual cylinder air-fuel ratios, each of which is the air-fuel ratio of the mixture supplied to each of the at least two or more of the cylinders, is occurring (refer to the routine shown in FIG. 16).

The imbalance determining means includes, parameter for determination obtaining means for obtaining, based on the output value of the downstream air-fuel ratio sensor while the feedback control is being performed, the parameter for imbalance determination which increases as a difference between an amount of hydrogen included in the exhaust gas which has not passed through the catalytic converter and an amount of hydrogen included in the exhaust gas which has passed through the catalytic converter becomes larger (refer to step 1620 and step 1640 of FIG. 16);

determination executing means for determining whether or not the obtained parameter for imbalance determination is equal to or larger than the abnormality determination threshold (refer to step 1645 in FIG. 16), and for determining that the air-fuel ratio imbalance among cylinders is occurring when it is determined that the parameter for imbalance determination is equal to or larger than the abnormality determination threshold (refer to steps from step 1645 to step 1655);

evaporated fuel gas effect occurrence determination means for determining whether or not the evaporated fuel gas effect occurrence state in which the evaporated fuel gas introduced/flowed into the intake passage varies/affects the parameter for imbalance determination is occurring (the condition 1 and the condition 2 of step 1605 in FIG. 16); and determination prohibiting means for prohibiting to execute said determination of said air-fuel ratio imbalance among cylinders based on said parameter for imbalance determination by the determination executing means (refer to the "No" determination at step 1605 in FIG. 16) when it is determined that the evaporated fuel gas effect occurrence state is occurring by the evaporated fuel gas effect occurrence determination means (i.e., both of the condition 1 and the condition 2 are unsatisfied).

Further, the air-fuel ratio feedback control means is configured so as to update a value relating to the concentration of the evaporated fuel gas as the evaporated fuel gas concentration learning value FGPG (refer to the routine shown in FIG. 14) based on at least the output value of the upstream air-fuel ratio sensor (in actuality, the main feedback coefficient FAF obtained based on the output value Vabyfs of the upstream air-fuel ratio sensor 67, and the correction coefficient average FAFAV) every time a predetermined evaporated fuel gas concentration learning value updating condition including a condition that the evaporated fuel gas purge amount is not zero is satisfied (i.e., every time the timing at which the routine shown in FIG. 14 is executed arrives, and the conditions at step 1405 and step 1410 in FIG. 14 are satisfied), and so as to control the injection amount of the fuel further based on the evaporated fuel gas concentration learning value FGPG (step 1040 and step 1050 shown in FIG. 10).

The evaporated fuel gas effect occurrence determination means is configured so as to determine whether or not the number of times of update opportunity for concentration learning value CFGPG (i.e., the number of times the evaporated fuel gas concentration learning value updating condition is satisfied) is smaller than a first threshold of the opportunity number of times, and so as to determine that the evaporated fuel gas effect occurrence state is occurring when it is determined that the number of times of update opportunity for concentration learning value CFGPG is smaller than the first threshold of the opportunity number of times (refer to the condition 2 at step 1605 in FIG. 16).

The purge amount control means is configured so as to control the evaporated fuel gas purge amount in such a manner that the evaporated fuel gas purge amount when the number of times of update opportunity for concentration learning value CFGPG is equal to or smaller than a second threshold of the opportunity number of times smaller than the first threshold of the opportunity number of times is smaller than the evaporated fuel gas purge amount when the number of times of update opportunity for concentration learning value CFGPG is equal to or larger than the first threshold of the opportunity number of times (step 1330 shown in FIG. 13).

Further, the evaporated fuel gas effect occurrence determination means is configured so as to determine whether or not the number of times of update opportunity for concentration learning value CFGPG is equal to or smaller than the second threshold of the opportunity number of times, and so as to determine that the evaporated fuel gas effect occurrence state is not occurring when it is determined that the number of times of update opportunity for concentration learning value CFGPG is equal to or smaller than the second threshold of the opportunity number of times (refer to the condition 1 at step 1605 shown in FIG. 14).

The determination prohibiting means is configured so as to allow to execute the determination based on the parameter for imbalance determination by the determination executing means when it is determined that the evaporated fuel gas effect occurrence state is not occurring by the evaporated fuel gas effect occurrence determination means (refer to the case in which the condition 1 is satisfied at step 1605 shown in FIG. 16).

In addition, the air-fuel ratio feedback control means includes:

sub feedback amount updating means (refer to steps from step 1505 to step 1530 shown in FIG. 15) for updating/changing the sub feedback amount Vafsfb to have the output value Voxs of the downstream air-fuel ratio sensor 68 coincide with the value corresponding to the stoichiometric air-fuel ratio based on the output value Voxs of the downstream air-fuel ratio sensor 68 every time a first updating timing (i.e., the timing at which the routine shown in FIG. 15 is executed) arrives; and fuel injection amount control means for determining the base fuel injection amount (Fb(k)) to have the air-fuel ratio of the mixture supplied to the combustion chambers of the at least two or more of the cylinders coincide with the stoichiometric air-fuel ratio based on the cylinder intake air amount (Mc(k)) which is an amount of air introduced into each of the combustion chambers of the cylinders every time a second updating timing (i.e., the timing at which the routine shown in FIG. 10 is executed) arrives (refer to step 1010 and step 1030 shown in FIG. 10); for updating/changing the main feedback amount to correct the base fuel injection amount based on at least the output value Vabyfs of the upstream air-fuel ratio sensor 67 and the sub feedback amount Vafsfb (refer to the routine shown in FIG. 11); and for having the injectors inject the injection amount of the fuel obtained by correcting the base fuel injection amount by the main feedback amount from the injectors (step 1050 and step 1060 shown in FIG. 10).

The imbalance parameter for determination obtaining means includes:

learning value of sub feedback amount learning means for updating/changing the learning value Vafsfbg of the sub feedback amount based on the sub feedback amount Vafsfb every time a third timing (the timing at which the routine shown in FIG. 15 is executed) arrives in such a manner that the learning value of the sub feedback amount comes closer to the steady-state component of the sub feedback amount (refer to steps from step 1535 to step 1555 shown in FIG. 15); and parameter calculating means for calculating the parameter for imbalance determination (the sub FB learning value average Avesfbg) based on the learning value of the sub feedback amount Vafsfbg (steps from step 1615 to step 1640 shown in FIG. 16).

The air-fuel ratio feedback control means is configured so as to update the evaporated fuel gas concentration learning value FGPG (refer to steps from step 1415 to step 1425 shown in FIG. 14), when a value (correction coefficient average FAFAV) according to the main feedback amount (the main feedback coefficient FAF) while the evaporated fuel gas purge amount is not set at 0 (zero) by the purge amount control means is equal to or smaller than a first threshold (1−β) which is smaller than the reference value ("1") which does not correct the base fuel injection amount (Fb(k)); and when the value according to the main feedback amount while the evaporated fuel gas purge amount is not set at zero by the purge amount control means is equal to or larger than a second threshold (1+β) which is larger than the reference value.

The present invention is not limited to the embodiment described above, but various modifications may be adopted without departing from the scope of the invention. Examples (hereinafter referred to as "the present apparatus") of the modifications of the embodiment according to the present invention will next be described.

The present apparatus stores into the backup RAM 84, as the sub feedback learning value Vafsfbg, "the value SDVoxs based on the integrated value of the error amount of output DVoxs" obtained when the sub feedback amount Vafsfb is calculated.

In this case, the value Ki·Vafsfbg may be used as the sub feedback amount Vafsfb while the sub feedback control is terminated. In this case, Vafsfb in the formula (5) is set to (at) "0". Further, the sub FB learning value Vafsfbg may be adopted as an initial value of the integrated value SDVoxs of the error amount of output when the sub feedback is started.

The present apparatus may be configured so as to update the sub FB learning value Vafsfbg immediately after a timing at which the output value Voxs of the downstream air-fuel ratio sensor 68 crosses (pass over) the stoichiometric air-fuel ratio corresponding value Vst (0.5 V), (i.e., rich-lean reverse timing).

The purge control valve 49 of the present apparatus may be a DC motor type whose opening degree is adjusted by a duty signal, or may be a valve whose opening degree is adjusted by a stepper motor, or the like.

The present apparatus can be applied to, for example, a V-type engine. In this case, the V-type engine may comprise, a right bank upstream-side catalytic converter disposed at a position downstream of an exhaust-gas-aggregated-portion of two or more of the cylinders belonging to a right bank (a catalyst disposed in the exhaust passage of the engine and at a position downstream of the exhaust-gas-aggregated-portion into which the exhaust gases merge, the exhaust gases discharged from chambers of at least two or more of the cylinders among a plurality of the cylinders), a left bank upstream-side catalytic converter disposed at a position downstream of an exhaust-gas-aggregated-portion of two or more cylinders belonging to a left bank (a catalyst disposed in the exhaust passage of the engine and at a position downstream of the exhaust-gas-aggregated-portion into which the exhaust gases merge, the exhaust gases discharged from chambers of two or more of the cylinders among the rest of the at least two or more of the cylinders).

Further, the V-type engine may comprise an upstream air-fuel ratio sensor for the right bank and a downstream air-fuel ratio sensor for the right bank disposed upstream and downstream of the right bank upstream-side catalyst, respectively, and may comprise upstream side air-fuel ratio sensor for the left bank and a downstream side air-fuel ratio sensor for the left bank disposed upstream and downstream of the left bank upstream-side catalyst, respectively. In this case, a main feedback control for the right bank and a sub feedback for the right bank are performed, and a main feedback control for the left bank and a sub feedback control for the left bank are performed independently.

The invention claimed is:

1. An apparatus for determining an air-fuel ratio imbalance among cylinders of an internal combustion engine, applied to a multi-cylinder internal combustion engine having a plurality of cylinders, comprising:

a catalytic converter disposed in an exhaust passage at a position downstream of an exhaust gas aggregated portion into which gases discharged from combustion chambers of at least two or more of a plurality of said cylinders merge;

fuel injectors, each disposed so as to correspond to each of said at least two or more of said cylinders, and each injecting a fuel to be contained in a mixture supplied to each of said combustion chambers of said two or more of said cylinders;

purge passage section forming a passage which allows an evaporated fuel gas generated in a fuel tank storing said fuel supplied to said fuel injectors to be introduced into an intake passage of said engine;

purge amount control means for controlling an evaporated fuel gas amount which is an amount of said evaporated fuel gas introduced into said intake passage of said engine through said purge passage section;

an upstream air-fuel ratio sensor, disposed at said exhaust gas aggregated portion in said exhaust passage, or between said exhaust gas aggregated portion and said catalytic converter in said exhaust passage, and said upstream air-fuel ratio sensor including a diffusion resistance layer with which an exhaust gas which has not passed through said catalytic converter contacts, and an air-fuel ratio detecting element which is covered with said diffusion resistance layer and outputs an output value according to an air-fuel ratio of said exhaust gas which has reached said air-fuel ratio detecting element after passing through said diffusion resistance layer;

a downstream air-fuel ratio sensor which outputs an output value according to an air-fuel ratio of said exhaust gas which has passed through said catalytic converter;

air-fuel ratio feedback control means for performing a feedback control on an injection amount of said fuel injected from each of said fuel injectors in such a manner that an air-fuel ratio represented by said output value of said upstream air-fuel ratio sensor coincides with a stoichiometric air-fuel ratio;

imbalance determining means for executing a determination of an air-fuel ratio imbalance among cylinders as to whether or not an imbalance among individual cylinder air-fuel ratios, each of which is an air-fuel ratio of a mixture supplied to each of said at least two or more of said cylinders, is occurring; wherein said imbalance determining means includes, parameter for determination obtaining means for obtaining, based on said output value of said downstream air-fuel ratio sensor while said feedback control is being performed, a parameter for imbalance determination which increases as a difference between an amount of hydrogen included in said exhaust gas which has not passed through said catalytic converter and an amount of hydrogen included in said exhaust gas which has passed through said catalytic converter becomes larger;

determination executing means for determining whether or not said obtained parameter for imbalance determination is equal to or larger than an abnormality determination threshold, and for determining that the air-fuel ratio imbalance among cylinders is occurring when it is determined that said parameter for imbalance determination is equal to or larger than said abnormality determination threshold;

evaporated fuel gas effect occurrence determination means for determining whether or not an evaporated fuel gas effect occurrence state in which said evaporated fuel gas introduced into said intake passage varies said parameter for imbalance determination is occurring; and determination prohibiting means for prohibiting said determination executing means to execute said determination of said air-fuel ratio imbalance among cylinders based on said parameter for imbalance determination when it is determined that said evaporated fuel gas effect occurrence state is occurring by said evaporated fuel gas effect occurrence determination means.

2. The apparatus for determining an air-fuel ratio imbalance among cylinders of an internal combustion engine according to claim 1, wherein, said air-fuel ratio feedback control means is configured so as to update a value relating to a concentration of said evaporated fuel gas as an evaporated fuel gas concentration learning value based on at least said output value of said upstream air-fuel ratio sensor every time a predetermined evaporated fuel gas concentration learning value updating condition including a condition that said evaporated fuel gas purge amount is not zero is satisfied, and so as to control said injection amount of said fuel further based on said evaporated fuel gas concentration learning value; and said evaporated fuel gas effect occurrence determination means is configured so as to determine whether or not the number of times of update opportunity for concentration learning value, said number of times being the number of times said evaporated fuel gas concentration learning value updating condition is satisfied, is smaller than a first threshold of the opportunity number of times, and so as to determine that said evaporated fuel gas effect occurrence state is occurring when the number of times of update opportunity for concentration learning value is determined to be smaller than said first threshold of the opportunity number of times.

3. The apparatus for determining an air-fuel ratio imbalance among cylinders of an internal combustion engine according to claim 2, wherein, said purge amount control means is configured so as to control said evaporated fuel gas purge amount in such a manner that said evaporated fuel gas purge amount when the number of times of update opportunity for concentration learning value is equal to or smaller than a second threshold of the opportunity number of times smaller than said first threshold of the opportunity number of times is smaller than said evaporated fuel gas purge amount when the number of times of update opportunity for concentration learning value is equal to or larger than said first threshold of the opportunity number of times;

said evaporated fuel gas effect occurrence determination means is configured so as to determine whether or not the number of times of update opportunity for concentration learning value is equal to or smaller than said second threshold of the opportunity number of times, and so as to determine that said evaporated fuel gas effect occurrence state is not occurring when it is determined that the number of times of update opportunity for concentration learning value is equal to or smaller than said second threshold of the opportunity number of times; and said determination prohibiting means is configured so as to allow the determination executing means to execute the determination based on the parameter for imbalance determination when it is determined that said evaporated fuel gas effect occurrence state is not occurring by said evaporated fuel gas effect occurrence determination means.

4. The apparatus for determining an air-fuel ratio imbalance among cylinders of an internal combustion engine according to claim 3, wherein, said air-fuel ratio feedback control means includes:

sub feedback amount updating means for updating a sub feedback amount to have said output value of said downstream air-fuel ratio sensor coincide with a value corresponding to the stoichiometric air-fuel ratio based on said output value of said downstream air-fuel ratio sensor every time a first updating timing arrives; and fuel injection amount control means for determining a base fuel injection amount to have said air-fuel ratio of said mixture supplied to said combustion chambers of said at least two or more of said cylinders coincide with the stoichiometric air-fuel ratio based on a cylinder intake air amount which is an amount of air introduced into each of said combustion chambers of said cylinders every time a second updating timing arrives, for updating a main feedback amount to correct said base fuel injection amount based on at least said output value of said upstream air-fuel ratio sensor and said sub feedback amount, and for having said injectors inject said injection amount of said fuel obtained by correcting said base fuel injection amount by said main feedback amount from said injectors; and said imbalance parameter for determination obtaining means includes:

learning value of sub feedback amount learning means for updating a learning value of said sub feedback amount based on said sub feedback amount every time a third timing arrives in such a manner that said learning value of said sub feedback amount comes close to a steady-state component of said sub feedback amount; and parameter calculating means for calculating said parameter for imbalance determination based on said learning value of said sub feedback amount.

5. The apparatus for determining an air-fuel ratio imbalance among cylinders of an internal combustion engine according to claim 4, wherein, said air-fuel ratio feedback control means is configured so as to update said evaporated fuel gas concentration learning value, when an average of said main feedback amount while said evaporated fuel gas purge amount is not set at zero by said purge amount control means is equal to or smaller than a first threshold which is smaller than a reference value which does not correct said base fuel injection amount; and when said average of said main feedback amount while said evaporated fuel gas purge amount is not set at zero by said purge amount control means is equal to or larger than a second threshold which is larger than said reference value.

6. The apparatus for determining an air-fuel ratio imbalance among cylinders of an internal combustion engine according to claim 2, wherein, said air-fuel ratio feedback control means includes:

sub feedback amount updating means for updating a sub feedback amount to have said output value of said downstream air-fuel ratio sensor coincide with a value corresponding to the stoichiometric air-fuel ratio based on said output value of said downstream air-fuel ratio sensor every time a first updating timing arrives; and fuel injection amount control means for determining a base fuel injection amount to have said air-fuel ratio of said mixture supplied to said combustion chambers of said at least two or more of said cylinders coincide with the stoichiometric air-fuel ratio based on a cylinder intake air amount which is an amount of air introduced into each of said combustion chambers of said cylinders every time a second updating timing arrives, for updating a main feedback amount to correct said base fuel injection amount based on at least said output value of said upstream air-fuel ratio sensor and said sub feedback amount, and for having said injectors inject said injection amount of said fuel obtained by correcting said base fuel injection amount by said main feedback amount from said injectors; and said imbalance parameter for determination obtaining means includes:

learning value of sub feedback amount learning means for updating a learning value of said sub feedback amount based on said sub feedback amount every time a third timing arrives in such a manner that said learning value of said sub feedback amount comes close to a steady-state component of said sub feedback amount; and parameter calculating means for calculating said parameter for imbalance determination based on said learning value of said sub feedback amount.

7. The apparatus for determining an air-fuel ratio imbalance among cylinders of an internal combustion engine according to claim 6, wherein, said air-fuel ratio feedback control means is configured so as to update said evaporated fuel gas concentration learning value, when an average of said main feedback amount while said evaporated fuel gas purge amount is not set at zero by said purge amount control means is equal to or smaller than a first threshold which is smaller than a reference value which does not correct said base fuel injection amount; and when said average of said main feedback amount while said evaporated fuel gas purge amount is not set at zero by said purge amount control means is equal to or larger than a second threshold which is larger than said reference value.

* * * * *